United States Patent [19]

Filipski

[11] Patent Number: 4,975,975

[45] Date of Patent: Dec. 4, 1990

[54] HIERARCHICAL PARAMETRIC APPARATUS AND METHOD FOR RECOGNIZING DRAWN CHARACTERS

[75] Inventor: Alan Filipski, Tempe, Ariz.

[73] Assignee: GTX Corporation

[21] Appl. No.: 199,361

[22] Filed: May 26, 1988

[51] Int. Cl.$^5$ ............................................. G06K 9/00
[52] U.S. Cl. ........................................ 382/38; 382/37
[58] Field of Search ........................ 382/14, 15, 38, 36

[56] References Cited

U.S. PATENT DOCUMENTS

| | | | |
|---|---|---|---|
| 3,484,746 | 1/1965 | Fralick et al. | 382/14 |
| 3,832,682 | 8/1974 | Brok et al. | 382/38 |
| 4,177,448 | 12/1979 | Brayton | 382/14 |
| 4,499,596 | 2/1985 | Casey et al. | 382/15 |
| 4,521,909 | 6/1985 | Wang | 382/38 |
| 4,589,142 | 5/1986 | Bednar | 382/38 |

OTHER PUBLICATIONS

"Isoetrp–An Interactive Clustering Algorithm with New Objectives", by C. Y. Suen and Q. R. Wang, Pattern Recognition, vol. 17, No. 2, pp. 211–219, 1984.
"Chinese Character Classification by Globally Trained Tree Classifier and Fourier Descriptors of Condensed Patterns", by Y. Y. Tang, C. Y. Suen and Q. R. Wang, First International Conference on Computers and Applications, Beijing, China, 1984.
"Analysis and Design of a Decision Tree Based on Entropy Reduction and its Application to Large Character Set Recognition", by Q. R. Wang and C. Y. Suen, IEEE Transactions on Pattern Analysis and Machine Intelligence, vol. PAMI-6, No. 4, Jul., '84, pp. 406–417.
"Application of a Multilayer Decision Tree in Computer Recognition of Chinese Characters"–by Y. X. Gu, Q. R. Wang, and C. Y. Suen, IEEE Transactions on Pattern Analysis and Machine Intelligence, vol. 5, No. 1, Jan. 1983, pp. 83–89.
"Large Tree Classifier with Heuristic Search and Global Training", by Q. R. Wang and C. Y. Suen, IEEE Transactions on Pattern Analysis and Machine Intelligence, vol. 9, No. 1, Jan. 1987, pp. 91–102.

Primary Examiner—David K. Moore
Assistant Examiner—Yon Jung

[57] ABSTRACT

A pattern recognition system includes a hierarchical network of parametric pattern recognition components or algorithms of different types. During a "training" phase, distinctions among character types are gathered from a set of correctly labelled training samples. The structure of the component hierarchy is established by recursive training of various subsets of the original training set and, for each component, generation of a "decision function" that either (1) indicates a final classification by the present component the characters of the training, or (2) points to a component lower in the hierarchy, thereby establishing connectivity between components of the hierarchy. The training process continues, generating successively lower components in the hierarchy, until perfect classification is obtained on the training set. The hierarchy of components then is utilized to recognize characters or patterns from a set of unknown patterns or characters, by making successive "passes", if necessary, on features extracted from each unknown character until the unknown character is classified.

13 Claims, 8 Drawing Sheets

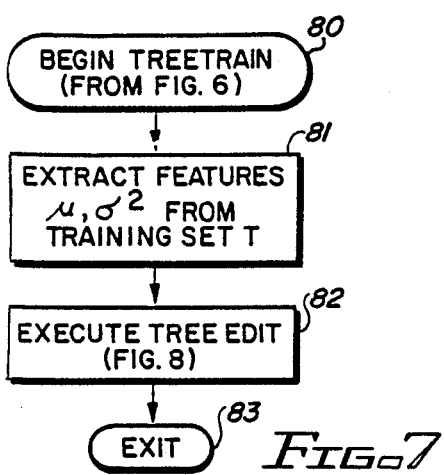
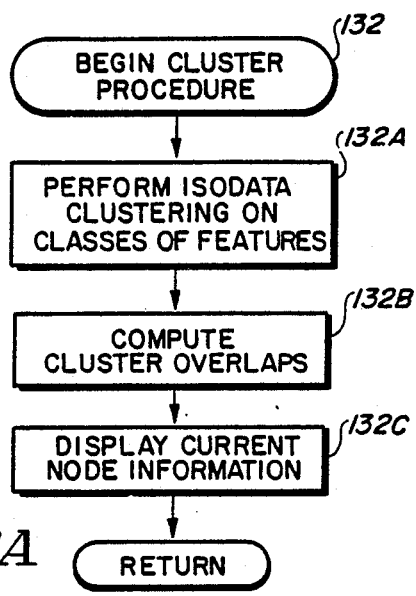
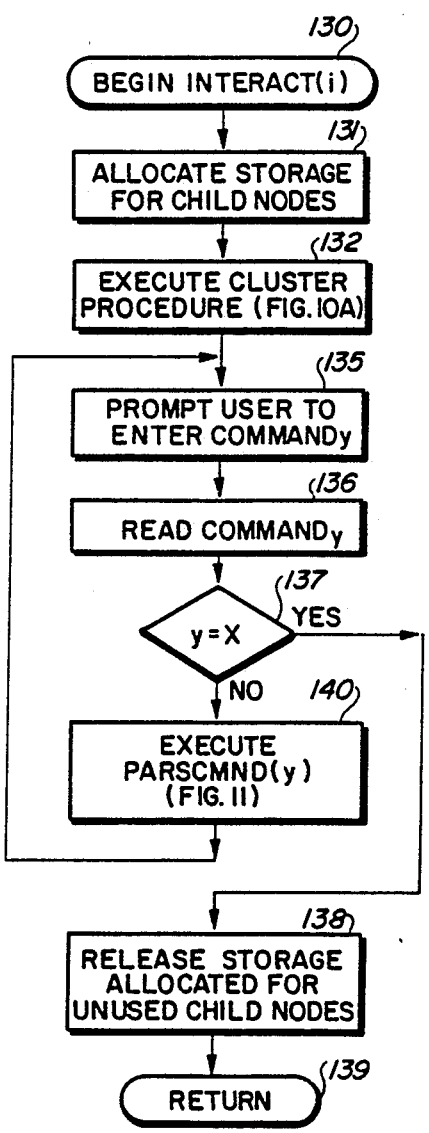
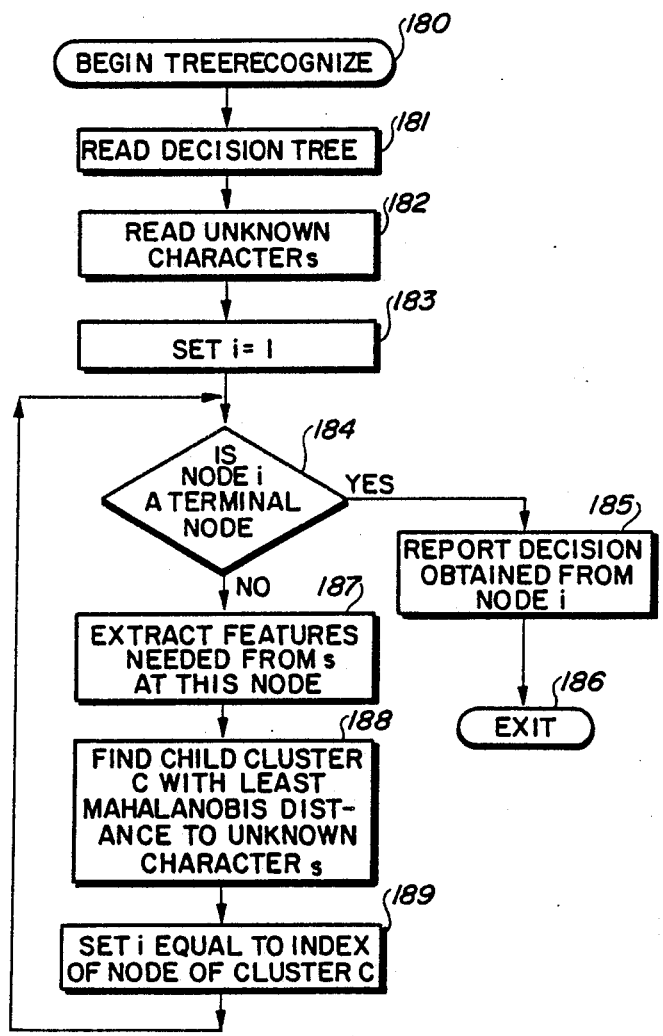

HIERARCHIAL PARAMETRIC APPARATUS AND METHOD FOR RECOGNIZING DRAWN CHARACTERS

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to commonly assigned patent application "Method and Apparatus for Generating Size and Orientation Invariant Shape Features" by Steven L. Borowitz, Ser. No. 026,672, filed Mar. 13, 1987, now U.S. Pat. No. 4,802,230, issued Jan. 31, 1989 incorporated herein by reference.

BACKGROUND OF THE INVENTION

The invention relates to systems for pattern recognition which consist of a hierarchical network of parametric pattern recognition components to produce the efficiency of prior parametric pattern recognition systems and the power and flexibility of prior non-parametric recognition systems.

The statistical approach to character recognition involves extraction of "features" from pixel data obtained by scanning of a character and then feeding the extracted features into a statistical decision tree, which compares them to extracted features of preselected samples of various predefined character classes, and recognizes or rejects the character. The first step in the operation of a -parametric pattern recognition technique is feature extraction. Various techniques are known. Also, the technique developed by the assignee, described in the above Horowitz application, can be used. Typical pattern recognition systems utilize a "training" phase and a "recognition" phase. During the training phase, information representative of distinctions among character types is gathered from a set of correctly labeled "training samples" of characters and stored in a computer's memory in the form of numerical parameters and data structures. During the recognition phase, an unknown character, such as a hand written character, is assigned a classification based on information stored during the training phase. Training phases of parametric pattern recognition systems are well known, and may be found in such texts as "Pattern Classification and Scene Analysis", Duda and Hart, John Wiley & Sons, New York, 1973, and "Pattern Recognition Principles", by Tou and Gonzalez, Addison-Wesley, Reading, Mass., 1974. Various pattern recognition techniques have been described, as in "Computer-Oriented Approach to Pattern Recognition", W. S. Maisel, Academic Press, New York & London, 1972. Utilization of decision tree components in character recognition is described in "Isoetrp--An Interactive Clustering Algorithm With New Objectives", by C. Y. Suen, Pattern Recognition, Vol. 17, No. 2, p. 211-19, 1984, and "Chinese Character Classification by Globally Trained Tree Classifier and Fourier Descriptors of Condensed Patterns", by Tang, Suen & Wang, First International Conference on Computers and Applications, Beijing, China, 1984. Gaussian Discriminant Techniques for Parametric Pattern Recognition are very well known, and are described in the above Duda and Hart reference and the Tou and Gonzalez reference.

A significant problem of prior pattern recognition techniques is that they operate on the underlying assumption that class-conditional probability distributions of the extracted features have a Gaussian distribution. Although these prior parametric pattern recognition techniques have the major advantage that an arbitrarily large training set may be reduced to a tractable set of parameters by simple statistical estimation formulas, the assumptions of normality, class conditional independence, etc., of the probability distributions of features are often very incorrect. For example, a small percentage of people might, when writing, produce enough momentum in their hands to create a "new" feature in a particular letter. Also, some writers may write a particular letter in various ways, depending on what letter was last written. This results in substantially greater error rates than would be expected if the feature probability distribution data conforms to a Gaussian distribution.

Other prior pattern recognition techniques, referred to as non-parametric methods, such as the "nearest-neighbor" rule or the "method of potential functions", are not constrained by the assumption that the probability distributions of extracted features are Gaussian. However, these techniques require far more computation and storage space for the data. The size of the data structure that summarizes the decision rules is proportional to the size of the training set, rather than independent of it as in parametric pattern recognition techniques.

Thus, there is an unmet need for an improved character recognition technique that provides the accuracy and flexibility of prior non-parametric pattern recognition strategies, the convenience and computational ease of prior parametric pattern recognition techniques, and the capability to operate on any size of character set.

SUMMARY OF THE INVENTION

It is an object of the invention to provide a pattern recognition system with increased accuracy over prior parametric pattern recognition techniques.

It is another object of the invention to provide a pattern recognition system which substantially increases accuracy over that of prior parametric pattern recognition techniques, yet avoids the computational complexity, cost, and large data storage capacity required of prior non-parametric pattern recognition systems.

It is another object of the invention to provide a pattern recognition system of the type described above wherein the size of the data structure representing the decision rule is independent of the size of the training set.

It is another object of the invention to provide a pattern recognition system wherein time and computational resources required during a training process are spent where they are most needed, on particularly difficult areas of the training process.

It is another object of the invention to provide a pattern recognition system of the type referred to above which achieves the benefits of both decision tree classification and Gaussian discriminant classification.

Briefly described, and in accordance with one embodiment thereof, the invention provides a system for statistical pattern or character recognition which reads an unknown pattern or character, extracts features from the unknown pattern or character, operates on the extracted features with a first classifier component and makes a decision whether the unknown pattern or character is within a first class, then determines if the first decision is a final decision that the unknown pattern or character is within the first class and, if so, reports that the unknown pattern is in the first class, and if it is not, selects a second classifier component; if the first decision is not a final decision, the system operates on the extracted features of the unknown pattern or character with the second classifier component and makes a second decision as to whether the unknown pattern or character is within the first class. The statistical pattern or character recognition system then repeats this process as many times as is needed to make a final decision as to whether the unknown pattern or character is within the first class; each decision that the unknown pattern or character is not within the first class results in selecting another classifier component lower in a hierarchy of classifier components. The system trains the first and second classifier components and any subsequent classifier components in the hierarchy with a training set of patterns or characters by selecting the first, second and other classifier components, extracting features from elements of the training set, and operating on the extracted features of the training set with the first classifier component to determine classes in which elements of the training set are classified, producing a first set of training elements of the training set which the first classifier component classifies into the first class, determines whether all of the first set of training elements are labelled as being included in the first class, and sets a decision indicator in the first classifier component to indicate that it can make a final decision that any other training component of the first set is in the first class. The training system recursively repeats the foregoing procedure for the second classifier component and any other classifier components lower in the hierarchy. The entire training procedure then is repeated for other sets of training elements and other classes. The components selected can be Gaussian discriminant components of decision tree components.

BRIEF DESCRIPTION OF THE DRAWINGS

FIG. 7 is a flow chart of a subroutine TREETRAIN called by the program of FIG. 6.

FIG. 10 is a flow chart of a subroutine INTERACT(i) called by the subroutine of FIG. 9.

FIG. 10A is a flow chart of a subroutine CLUSTER PROCEDURE called by the subroutines of FIGS. 10 and 11.

FIG. 12 is a flow chart of a subroutine TREERECOGNIZE called by the program of FIG. 5.

DESCRIPTION OF THE PREFERRED EMBODIMENT

Figure 18:
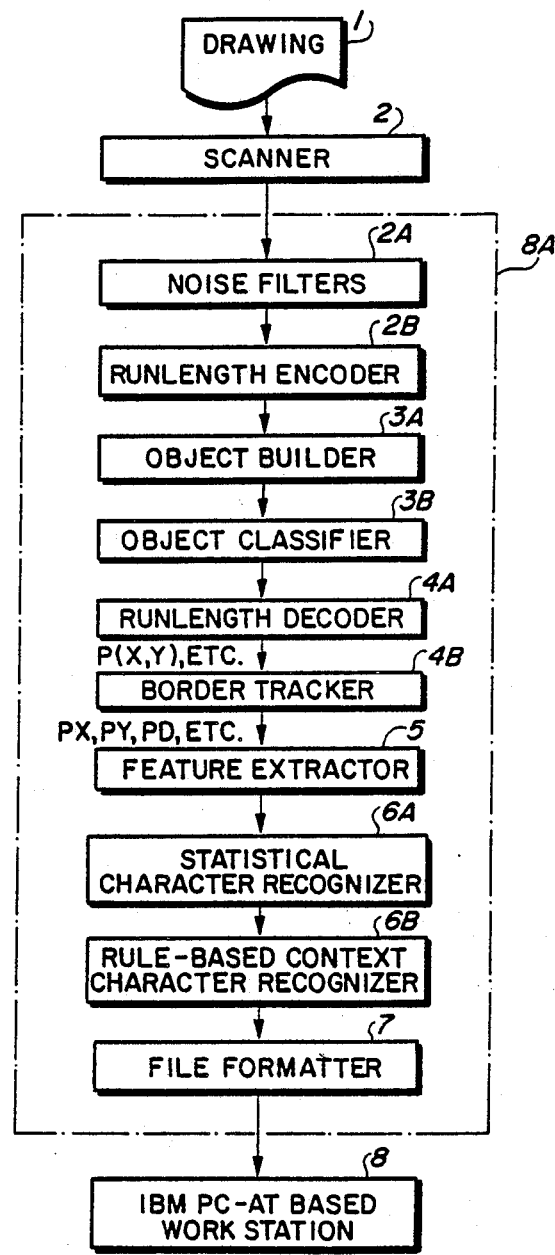
FIG. 18 is a diagram of a system in which the character recognition system of the present invention can be incorporated.

The pattern recognition technique of the present invention is implemented in computer programs that run on the system shown in FIG. 18. In FIG. 18 a scanner 2 scans a hand drawn document 1 producing serial pixels which are filtered by noise filter 2A, the output of which is fed into a runlength encoder 2B. The runlength encoder 2B produces raw runlengths that are assembled or "built" into "objects" consisting of raw runlengths or horizontal slices arranged in a manner corresponding to the configuration of objects scanned on drawing 1, as described in commonly assigned patent application "Method and Apparatus for Simplifying Run Length Data From Scanning of Images" by John M. Roye, filed Feb. 19, 1987, now U.S. Pat. No. 4,821,336, issued Apr. 11, 1989 assigned to the present assignee, and incorporated herein by reference. An object classifier 3B determines from size and other geometric properties whether an object is small enough to be classified as a character, and if it is, feeds raw runlengths of the object into a runlength decoder 4A that converts the object runlengths back into the pixel image, i.e., to P(x,y) and computes certain parameters of the object. A border tracker 4D then operates upon P(x,y) to produce various input variables that are used in extracting features. A feature extraction system 5 produces intermediate computed variables and extracted features described in the above referenced Horowitz application. The extracted features are fed into the statistical character recognizer 6A, which is the subject of the present invention. The output of the statistical character recognizer 6A is fed through a rule based character context routine 6B, the output of which is fed from there into a file formatter 7, the output of which is loaded for editing into a work station 8. Work station 8 includes an IBM PC-AT computer, a keyboard, a high resolution graphics monitor, a high resolution plotter, a hard disc, and other suitable hardware.

Figure 17:
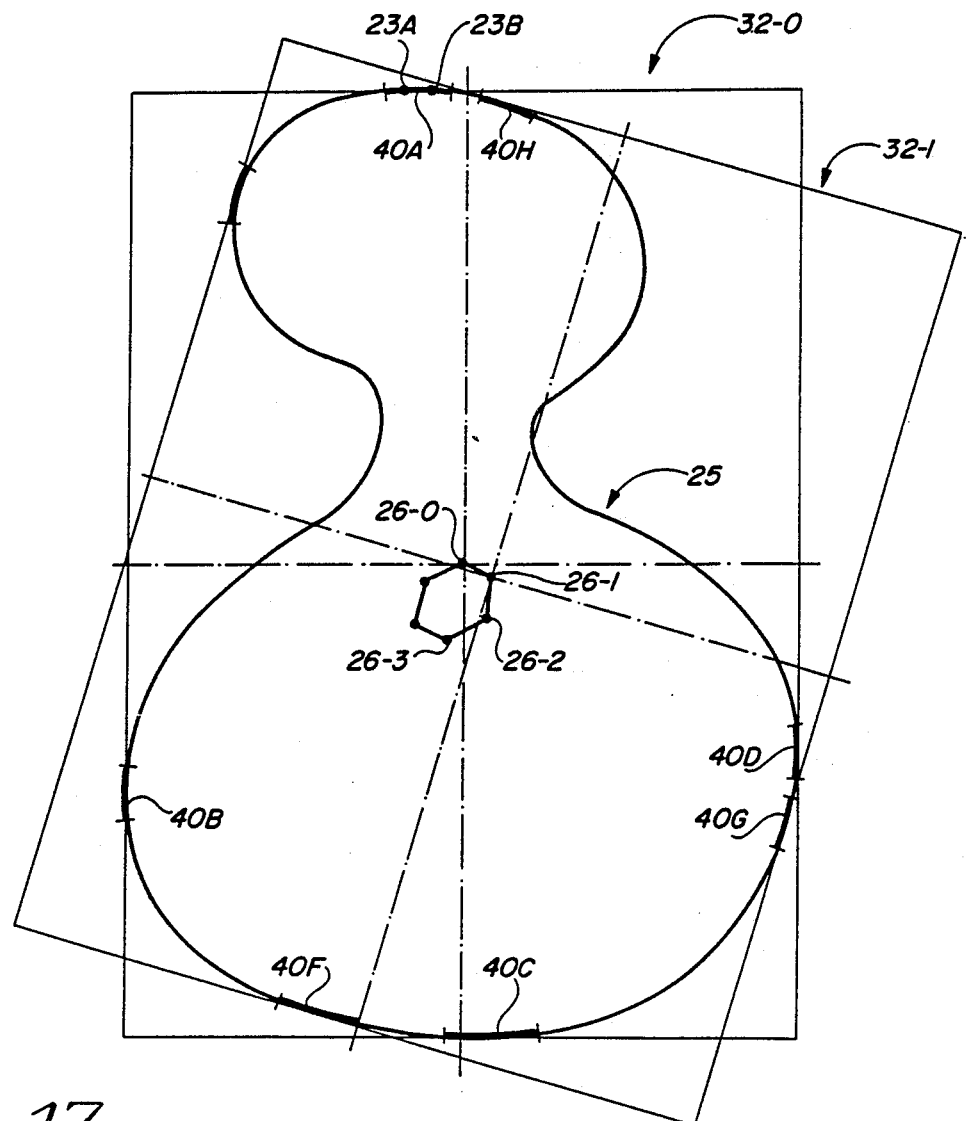
FIG. 17 is a diagram useful in explaining basic feature extraction concepts.

Before describing the hierarchical parametric character recognition technique of the present invention, it would be helpful to refer to the example of FIG. 17 in order to more clearly understand the extracted features of characters upon which the character recognition system of the present invention operates. In the example of FIG. 17, numeral 32-0 represents a first minimum bounding rectangle of a character 32. A second minimum bounding rectangle 32-1 also can be drawn, rotated 15 degrees relative to the original x and y axes. Four further minimum bounding rectangles (not shown) each rotated 15 degrees clockwise (or counter clockwise) relative to the next also can be drawn. Each of the six minimum bounding rectangles may have a different center, a different height, and a different width. A variable clen(0) represents the height of the first minimum bounding rectangle 32-0, clen(7) is the width of that minimum bounding rectangle, clen(2) is the height of the first rotated minimum bounding rectangle 32-1, clen(8) is the width of rectangle 32-1, and so forth, so that a set of variables clen(0), . . . clen(11) represents the lengths of the two perpendicular sides of all six rotated minimum bounding rectangles of P(x,y), the function which represents all of the perimeter points of character 25. Similarly, another set of features cprd(0), cprd(5) can be extracted which are the areas of the six above minimum bounding rectangles. Other features that can be extracted including the height-to-width aspect ratios of each of the minimum bounding rectangles. The geometrical centers 26-0, 26-1, etc., of the six minimum bounding rectangles, the sum of the distances between the six minimum bounding rectangle center points, and numerous other geometric features and their statistical means and variances can be computed for the character 25. These, suitably normalized, and/or Fourier coefficients thereof are examples of the many features that can be used as extracted features which then are operated upon by the character recognition technique of the present invention to classify or recognize the character.

Figure 1:
FIG. 1 is a block diagram useful in describing the training phase of a parametric pattern recognition component.

Referring now to FIG. 1, block 40A contains a parametric pattern recognition component or algorithm $\alpha_k$ which can be used in a training procedure that must be performed before any pattern recognition of a sample character can be achieved. k is an arbitrary index used to distinguish one particular pattern recognition component from another. Component $\alpha_k$ in FIG. 1 must be "trained" before it is capable of classifying unknown objects or samples $s_1, s_2, s_3$, etc.

In order to train a component $\alpha_k$ to classify samples, that component must be trained by having it operate on a set of training samples $S=[s_1, s_2, \ldots s_n]$. L is a function giving the true label (i.e., classification) of each sample s in the set S. Block 41A in FIG. 1 means that the set S of training samples $s_1, s_2, \ldots s_n$ is provided as an input to component $\alpha_k$. Each training sample $s_i$ is properly labeled as to which class it should be classified into. (For example, a handwritten B would be labeled as class 2, in the set $[\omega_1, \omega_2, \ldots \omega_{26}]$ which represents the upper case alphabet [A, B, ... Z].)

The output of $\alpha_k$ in FIG. 1 is indicated in block 42A, which contains a compact statistical representation $R_k$ of the differences of extracted features from the training set S, including the mean and standard deviation for each feature extracted from the training set. L labels the correct class (i.e., A, B, M, Q, etc.) of each training sample s.

In a general sense, $R_k$ may be anything that suitably describes the extracted features. For example, it can be a set of statistics or a statistical decision tree. At the end of the training procedure there is produced for each component $\alpha_k$ a data structure $R_k$ which can be used by a recognition component $\alpha_k$ (which is now a "trained" version of the $\alpha_k$ component initially used in the training procedure) to recognize objects or samples scanned by the above mentioned scanner in FIG. 17.

The set $\Omega=[\omega_1, \omega_2, \ldots \omega_m]$ is a set of m possible classes or types of characters, i.e., "A", "B", "F", . . . "Z".

Figure 2:
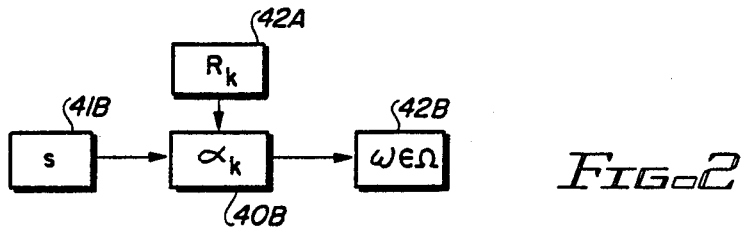
FIG. 2 is a block diagram useful in describing the recognition phase of a parametric pattern recognition component.

In FIG. 2, which shows the recognition phase of parametric pattern recognition by a particular component $\alpha_k$ shown in block 40B, the above mentioned data structure $R_k$ in block 42A is utilized to operate upon an unknown object s to be classified shown in block 41B. The result is a decision as to which $\omega$ of the set $\Omega$ the unknown objects should be assigned. Features are extracted, in accordance with the above referenced commonly assigned Horowitz application or other known feature extraction procedures as described in the Duda and Hart reference. The features extracted from the unknown character s are classified using $R_k$ to enable the component $\alpha_k$ to render the decision.

By way of definition, the term "component" can be understood to encompass a "trained" component including the data structure $R_k$ which results from the training process.

What has been described up to now is known in the prior art. In a feature extraction process, each object $s_i$ is reduced to a vector $V_i$ of real-valued features or measurements. The next step then is the computation of a mean vector $\rho_j$ and a standard deviation vector $\sigma_j$ for each of the m classes. Each vector has as many components as there are features extracted from the object $s_i$. The training set S then is summarized by m mean vectors and m variance vectors.

In accordance with the present invention, a departure is made from the prior art technique of using a single pattern recognition component $\alpha_k$ to perform the entire classification for the entire universe of characters to be recognized. Instead, a "hierarchy" of components is utilized.

Figure 3:
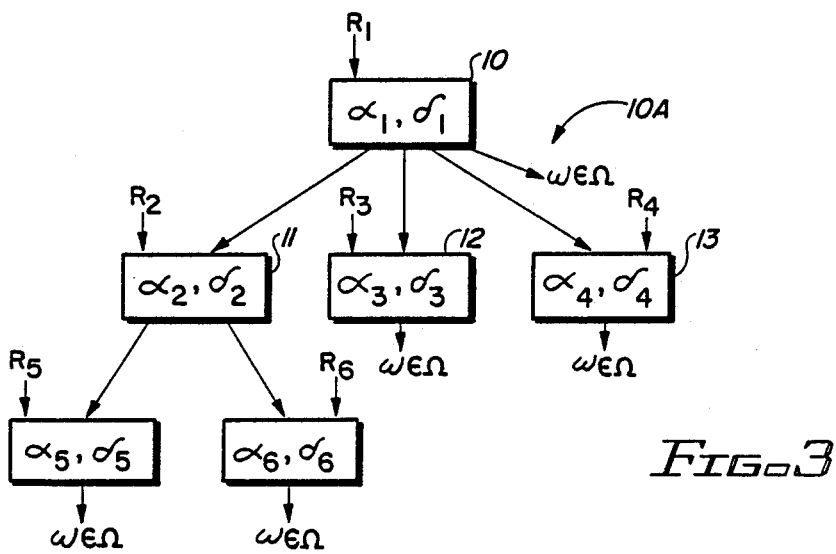
FIG. 3 is a diagram illustrating a hierarchy of parametric pattern recognition components in accordance with the present invention.

In FIG. 3, the extracted feature representation R1 is used by a component $\alpha_1$ to operate upon an unknown character s as indicated in block 10. Associated with component $\alpha_1$ is a delta-function $\delta_1$. In accordance with the present invention, the delta-function $\delta_1$ may indicate that the unknown object s has been recognized or classified as an element $\omega$ of the set $\Omega$ or, if component $\alpha_1$ is incapable of adequately classifying s, $\delta_1$ may point to a lower member of the hierarchy shown in FIG. 3, i.e., to block 11, 12, or 13. Similarly, the component $\alpha_j$ of each of blocks 11, 12, or 13 has associated with it a delta-function $\delta_j$. Some of the components lower in the hierarchy result only in a decision that the unknown object s has been recognized, while for others the delta-function can point to a still lower component in the hierarchy. Each component $\alpha_k$ in the hierarchy below component $\alpha_1$ utilizes a data structure or extracted feature representation $R_k$ obtained during training of the hierarchy, as subsequently described. As indicated above, the trained components $\alpha_1$, $\alpha_{2k}$, etc. can be considered to include the data structures $R_1$, $R_2$, etc., respectively. For example, in block 11, $\alpha_2$ utilizes $R_2$ to operate on s to produce an output which is further operated on by $\delta_2$ to produce a decision, which may be a classification or a reference to a lower component in the hierarchy.

Each delta-function tells us whether the decision of the corresponding component $\alpha_i$ is to be considered final, or whether additional components of the hierarchy need to be invoked for a final decision as to the proper classification of the unknown object s. This can be mathematically stated as: if $\delta_i(\alpha_i(s))=\omega\epsilon\Omega$, then $\omega$ is the final decision of the hierarchy as to the classification of s. If, on the other hand, $\delta_i(\alpha_i(s)) = \alpha_j \epsilon A$, wherein A is the set $[\alpha_1, \alpha_2, -\alpha_r]$ of possible components, then the decision is deferred and s is input to a lower component $\alpha_j$ in the hierarchy. Recognition of the unknown object s thus involves tracing through the hierarchy of pattern recognition components $\alpha_i$ until a decision $\omega$ i $\Omega$ is generated.

Generally, the recognition component $\alpha_k$ in FIG. 2 can be a Gaussian discriminant component of the type described in the Duda and Hart text or the Tou and Gonzalez text. Training of Gaussian discriminant components consists of merely extracting and saving parameters such as the mean and variance of suitable extracted features for each class or type of character to be recognized, as shown in the flow chart of FIG. 13, subsequently described. In this case, after training of a Gaussian discriminant component, recognition proceeds as indicated in the flow chart of FIG. 14. Posterior (after application of Bayes Rule) probabilities $P(\omega_i|s)$ are calculated for each class $\omega_i$ and a decision is made in favor of the class with the greatest $P(\omega_i|s)$.

Alternately, a decision tree recognition technique, subsequently described, can be utilized to implement the recognition component $\alpha_k$ in FIG. 2.

Use of the above hierarchical technique of parametric pattern recognition results in better classification decisions than the prior art, wherein a single level component $\alpha_k$ frequently is incapable of providing a strong decision and frequently requires a "no decision" outcome. The output of $\delta_i$ according to the present invention is either a class, indicating a correct decision or classification of the unknown object s, or $\delta_i$ is a pointer to another component lower in the hierarchy, which then operates on an appropriate extracted feature representation $R_k$ in a more "refined" attempt to classify the present character. $R_k$ will be different for different components at different levels in the hierarchy. The hierarchical parametric pattern recognition component technique allows different use of both decision tree components and Gaussian discriminant components at different levels of the hierarchy to obtain a previously unachieved level of accuracy at a reasonable cost.

It should be noted that a prior technique developed by Wald, known as the "sequential probability ratio test", determines the confidence of the decision of a component operating on certain extracted features, and if the confidence level is below a certain value, more features are extracted from the unknown object and compared to features obtained during a global training process. The present invention distinguishes over Wald's techniques by utilizing separately trained recognition components in a sequential manner.

Figure 4:
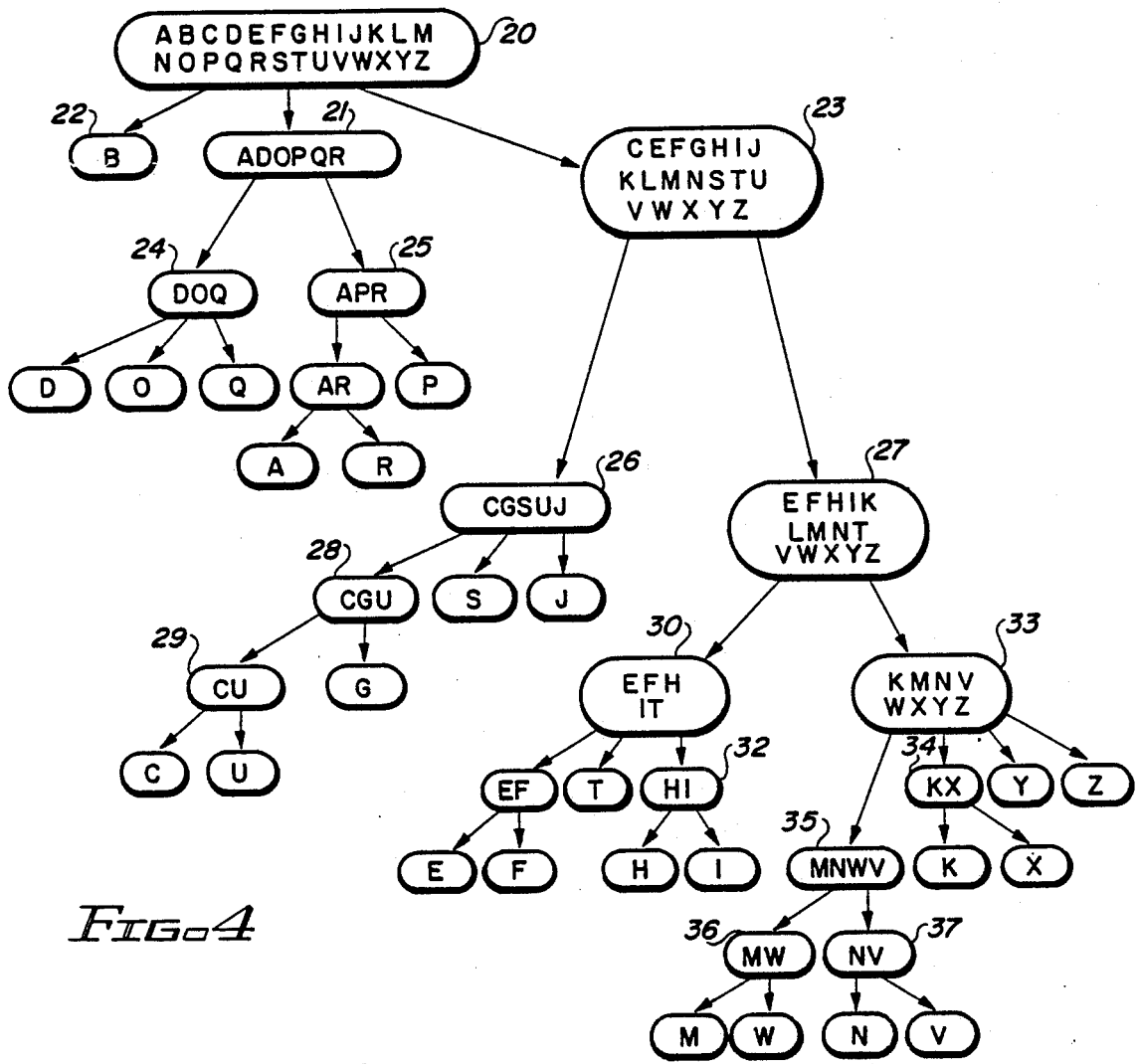
FIG. 4 is a diagram of a typical decision tree classifier.

In the described embodiment of the invention, a parametric character recognition component $\alpha_i$ can be of two different types, the first type being a decision tree having a structure generally as indicated in FIG. 4. This type of decision tree is based on ideas presented in the two references "An Analysis of a Decision Tree Based on Entropy Reduction and its Application to Large Character Set Recognition", by Wang and Suen, "IEEE Transactions on Pattern Analysis and Machine Intelligence", vol. 6 no. 4, July, 1984, pp 406–417 and "Chinese Character Classification by Globally Trained Tree Classifier and Fourier Descriptors of Condensed Patterns", by Tang, Suen & Wang, First International Conference on Computers and Applicators, Beijing, China, 1984, and "Isoetrp—An Interactive Clustering Algorithym With New Objectives", Pattern Recognition, by C. Y. Suen, vol. 17, no. 2, pp 211–219, 1984, all three of which are incorporated herein by reference. The other type of parametric character pattern recognition component is a simple Gaussian discriminant component, which uses Bayes' decision rule, as described in Chapter 2 of the Duda and Hart reference, incorporated herein by reference.

Figure 5:
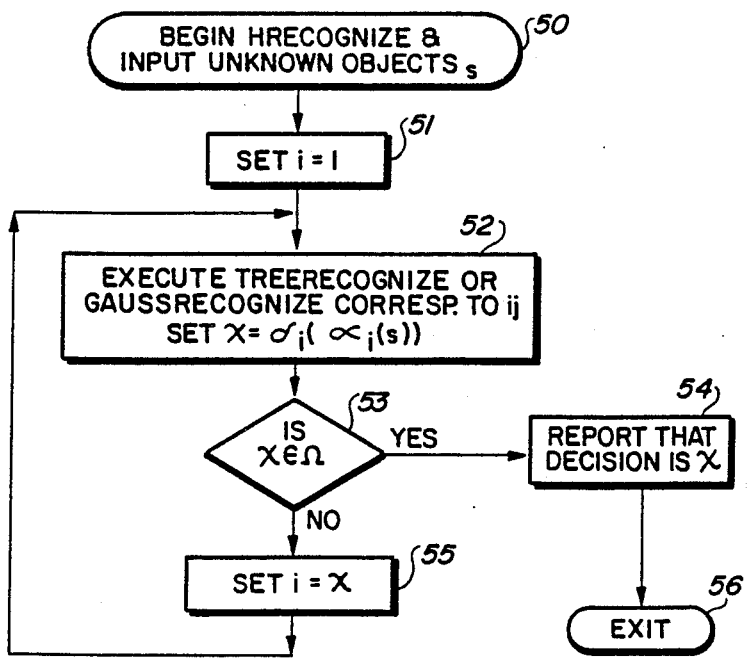
FIG. 5 is a flow chart of a program HRECOGNIZE used in recognizing characters in accordance with the hierarchy shown in FIG. 3.

Referring to FIG. 5, the main program HRECOGNIZE for recognizing an unknown character s is entered at label 50, wherein the unknown object s is provided as an input. The program goes to block 51, and sets the component index i to 1, and goes to block 52. In block 52, the program calls either the TREERECOGNIZE subroutine of FIG. 8, or the GAUSSRECOGNIZE subroutine of FIG. 10, depending upon whether $\alpha_i$ is a decision tree component or a Gaussian discriminant component. These two subroutines will be described subsequently, after the training procedure is described. Once the $\alpha_i(s)$ component has operated upon the unknown objects by extracting the features required and going through the appropriate decision tree classifying procedure or the application of the Bayes rule computations, the HRECOGNIZE program goes to decision block 53 and determines if a deltafunction $\delta_i$ associated with the present component $\alpha_i$ indicates that the unknown character s has been recognized, or if $\delta_i$ instead designates the index of a component lower in the hierarchy of FIG. 3. If $\chi$, the value of $\delta_i$, has a value that is within the set of possible classes, i.e., within the set $\Omega = [A, B, \ldots Z]$, decision block 53 produces an affirmative decision, and reports that the class of the unknown characters is the present value of $\chi$ in block 54 and exits at label 56.

However, if decision block 53 determines that s has not been adequately classified, the program goes to block 55 and sets i to the value of $\chi$, which indicates the next component to be tried in the hierarchy of FIG. 3. The program then returns to block 52 and calls the appropriate TREERECOGNIZE or GAUSSRECOGNIZE subroutine, and computes a new corresponding value of $\delta_i$. This procedure continues until an end point $\omega \epsilon \Omega$ (FIG. 3) of the parametric recognition component hierarchy, is reached, at which point the appropriate decision is reported in block 54 and the HRECOGNIZE program is exited by label 56, and recognition of the unknown character s has been accomplished.

Before describing the TREERECOGNIZE and GAUSSRECOGNIZE subroutines called by HRECOGNIZE, it will be helpful to first understand the procedure for "training" the parametric pattern recognition components $\alpha_i$. This is accomplished in the HTRAIN subroutine of FIG. 6.

Figure 6:
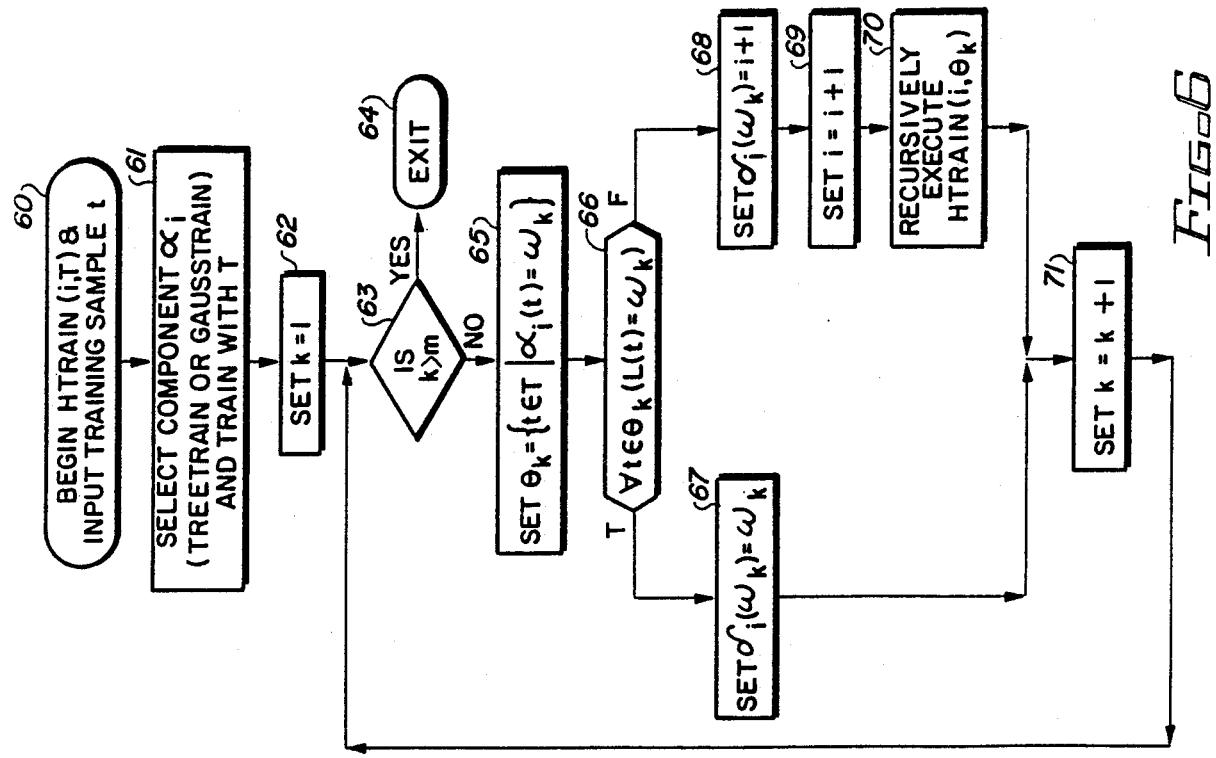
FIG. 6 is a flow chart of a program HTRAIN(i,T) used in training a hierarchical parametric pattern recognition component system as shown in FIG. 3.
Figure 13:
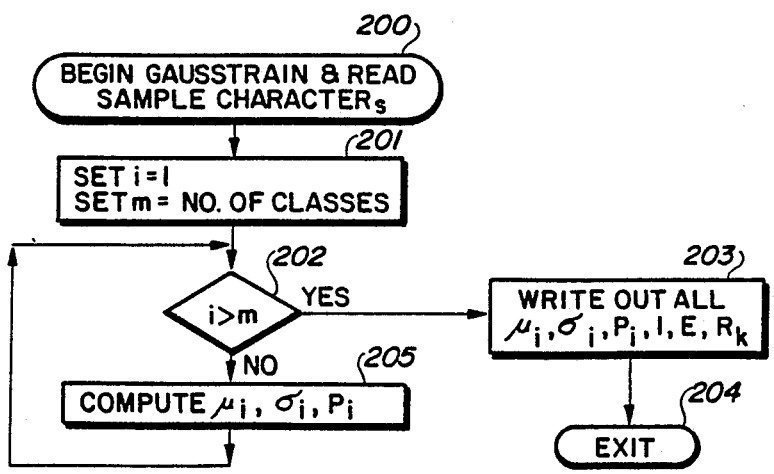
FIG. 13 is a subroutine GAUSSTRAIN called by the program of Fi9. 6.

Referring to FIG. 6, the program HTRAIN(i,T) operates on a training set T[t1, t2 . . .] of training samples to build a component hierarchy similar to the one shown in FIG. 3. The HTRAIN program goes from block 60 to block 61 and, beginning with an initial value of i=1, makes a determination whether this component should be a decision tree component or a Gaussian discriminant component. (Presently, $\alpha_1$ is a decision tree component, and lower levels of $\chi$ are Gaussian discriminant components, as this has produced good results up to now.) If the component $\alpha_i$ is to be a decision tree component, the TREETRAIN subroutine of FIG. 7 is called; otherwise, the GAUSSTRAIN subroutine of FIG. 13 is called. The HTRAIN program then goes to block 62 and sets an initial value of a class counter k equal to 1. The program then goes from block 62 to decision block 63 and determines if k is greater than m, the number of classes ω in Ω. If it is, it means that all of the classes have been trained and all of the components $\alpha_i$ in the hierarchy have been trained and linked together to produce a parametric pattern recognition hierarchy similar to the one shown in FIG. 3. The program in this case exits via label 64. If k is less than or program in this case exits via label 64. If k is less than or equal to m, the program goes to block 65 The loop controlled by decision block 63 thus requires HTRAIN to train a sufficient number of components $\alpha_i$ to classify all of the elements t of the training set T.

If the determination of decision block 63 is negative, the program goes to block 65. In block 65 the program generates a subset $\theta_k$ of the training set T, which the component $\alpha_i(t)$ "thinks" belongs in the present class $\omega_k$. In mathematical notation, the expression within the brackets means that $\theta_k$ is equal to the set of elements t in the training set T such that component $\alpha_i$, when presented with a sample t, decides that t is in the class $\omega_k$.

After producing the subset $\theta_k$, the program goes from block 65 to decision block 66 and determines whether it is true that for all of the t's in the set $\theta_k$ they are in fact labeled by the function L(t) as being in the class $\omega_k$. If this determination is true, it means that the present delta-function $\alpha_i$ should be set equal to $\omega_k$; this is what is done in block 67. The program then goes to block 71, increments the class counter k, and returns to the beginning of decision block 63.

However, if the determination of decision block 66 is false, it means that there are some elements t in the training set T that had been identified as not falling within the present class $\omega_k$, so more processing is required to properly classify those elements. The program in this event goes from decision block 66 to block 68 and sets $\alpha_i(\omega_k)$ to the index of a component lower in the hierarchy, i.e., to i+1. The program then goes to block 69 and accordingly increments i to equal i+1. The program then goes to block 70 and recursively repeats the entire procedure shown in FIG. 6 until an affirmative decision is obtained in decision block 66 and $\alpha_i(\omega_k)$ is set to $\delta_i k$, thereby classifying the present value of t.

Thus, the HTRAIN program generates all of the delta-functions $\delta_i$ associated with the various levels of $\alpha_i$ that are required to classify all members of the training set T.

$\theta_k$ is actually the set of elements t within the training set T that have been provisionally assigned to class $\omega_k$. If they all are definitely in the class $\omega_k$, as determined by referring to their labels L(t), then $\delta_i$ is set equal to $\omega_k$. Otherwise, if further decisions must be made before final classification of members of $\theta_k$, $\delta_i$ is set to i+1, which is the index of a lower component in the hierarchy. Index i is incremented in block 69. (There should be a limit (not shown) on the number of components or depth of the hierarchy to prevent potentially infinite computation in training which might run if the extracted features are inadequate to allow perfect classification.)

Referring next to FIG. 7, the flow chart of the TREETRAIN routine called in block 61 of HTRAIN is entered at label 80. In block 81 the TREETRAIN subroutine uses features extracted from all elements of the training set T and computes the mean $\mu$ and the variance $\sigma^2$ each of the classes k in the training set T for some set of features for that class. HTRAIN then calls the TREE EDIT subroutine of FIG. 8 in block 82, which is an interactive subroutine that enables the user to build a decision tree similar to the one shown in FIG. 4. TREETRAIN then is exited via label 83.

In the TREE EDIT program, the person doing the editing is able to make modifications to a existing decision tree or to create an entirely new decision tree. TREE EDIT has the ability to supply feedback to the user to guide the tree building process, including providing pairwise feature correlations, the Fisher Merit measure of the features under consideration, and cluster overlap information. The Fisher Merit measure is known to those skilled in the art, as indicated in the reference Fisher, R. A., "The Statistical Utilization of Multiple Measurements", *Ann. Eugen.*, 8, 376–386 (1938).

It should be appreciated that a thorough understanding of the above Suen reference is necessary to appreciate how the feedback information is utilized. The basic idea, however, is that each node of the decision tree represents a cluster of character classes. The node at the root of the decision tree corresponds to the cluster containing all possible classes. In FIG. 4, node 20 is the root node. Child nodes such as 21, 22, 23, etc., represent subclusters of the universal cluster. Those subclusters are then further subdivided by their own child nodes, until each cluster contains only a single class $\omega_k$.

Figure 8:
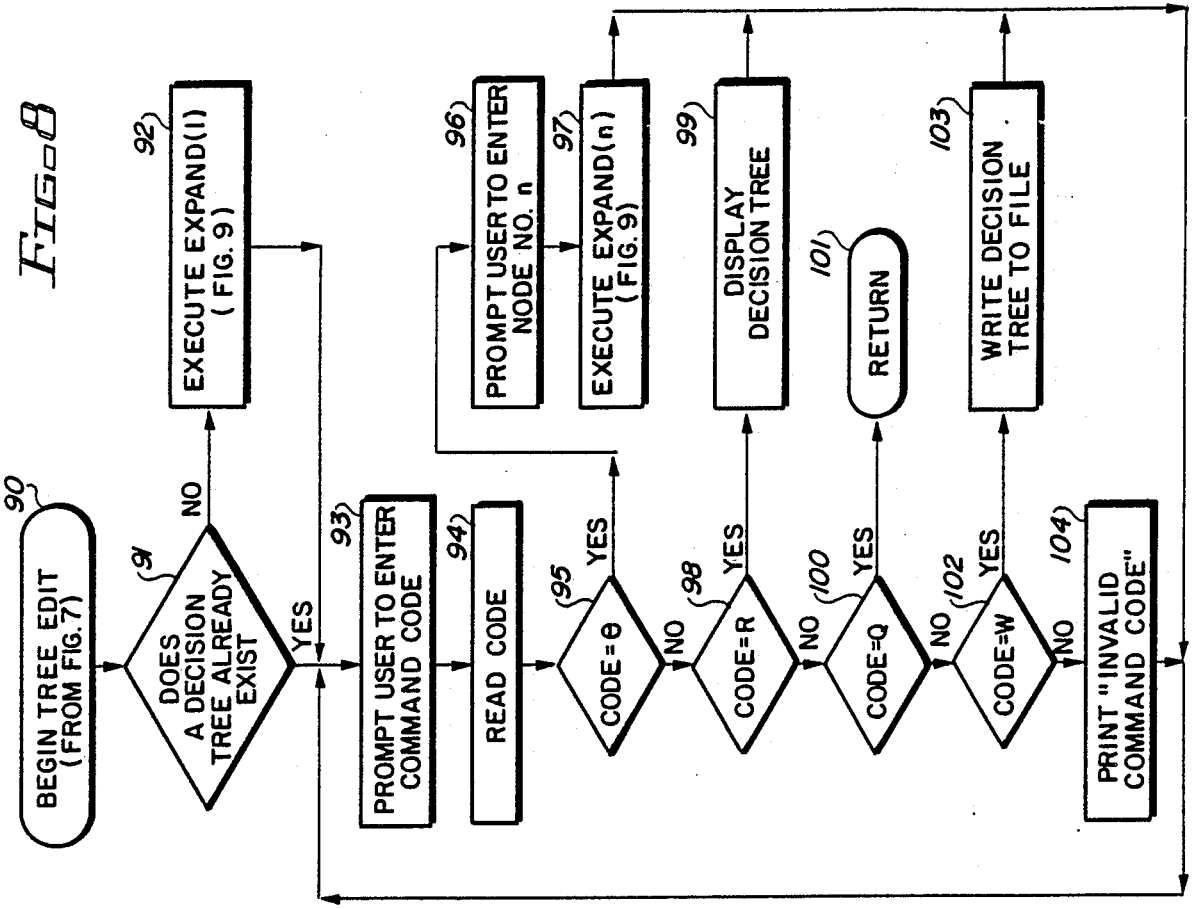
FIG. 8 is a flow chart of a subroutine TREE EDIT called by the subroutine of FIG. 7.

Still referring to FIG. 8, the program TREE EDIT called from block 82 of FIG. 7 is entered at label 90 and goes to decision block 91. Decision block 91 determines if a decision tree already exists, or whether it is necessary to call the EXPAND(i) subroutine of FIG. 9 to allow the user to interactively build a new tree structure. If the determination of block 91 is negative, the program goes to block 92 and calls the EXPAND(i) routine. In block 92, the program sets the index i of the EXPAND(i) subroutine to 1 and prompts the user, as subsequently described, to build a decision tree, starting with a root node i=1.

The program goes from an affirmative determination of block 91 or from block 92 into block 93, once a decision tree exists, and prompts the user to enter a code. The code can be an "e", "R", "Q", or a "W". The TREE EDIT subroutine then goes to block 94, reads the code entered by the user, and decision block 95 determines if the code is an "e". If it is, the program goes to block 96 and prompts the user for a node number n. The number "n" represents the first node that the user wants to edit. The program goes from block 96 to block 97, calls the EXPAND(i) subroutine of FIG. 9 with i=n. The user then makes the desired modifications to the decision tree. The subroutine then returns to block 93.

If the determination of block 95 is negative, the subroutine goes to block 98 and determines if the user entered code is "R". If this determination is affirmative, the subroutine causes the computer to display the tree structure in block 99 on a monitor, and returns to block 93. If a code "Q" is entered, this means that the user is finished editing the decision tree, and returns via label 101. If a code "W" is entered, this means that the decision tree is to be written to a suitable file, as indicated in block 103, and the program returns to block 93.

Finally, if a code not recognized in decision blocks 95, 98, 100, or 102 is entered by the user, the TREE EDIT subroutine causes the computer to print an "invalid code" message and returns via block 93.

Figure 9:
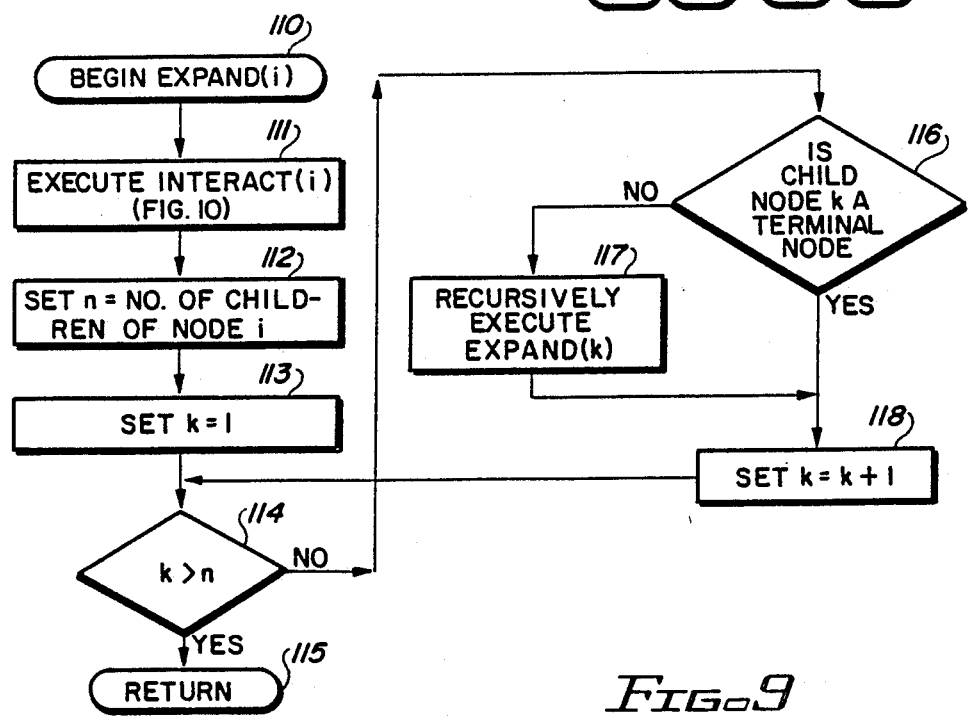
FIG. 9 is a flow chart of a subroutine EXPAND(i) called by the subroutine of FIG. 8.

Referring now to FIG. 9, the EXPAND(i) subroutine is entered via label 110, and first goes to block 111 and calls up the subroutine INTERACT(i) of FIG. 10. It would be helpful to the understanding of the TREE EDIT subroutine to describe the INTERACT(i) program of FIG. 10 next. Note that the EXPAND(i) subroutine deals with building the whole decision tree. The EXPAND(i) subroutine, as it is building the whole decision tree, calls the INTERACT(i) subroutine for each node.

Figure 15:
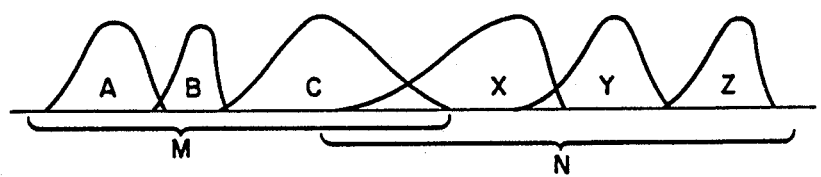
FIG. 15 is a diagram useful in explaining isodata clustering and overlap.
Figure 16:
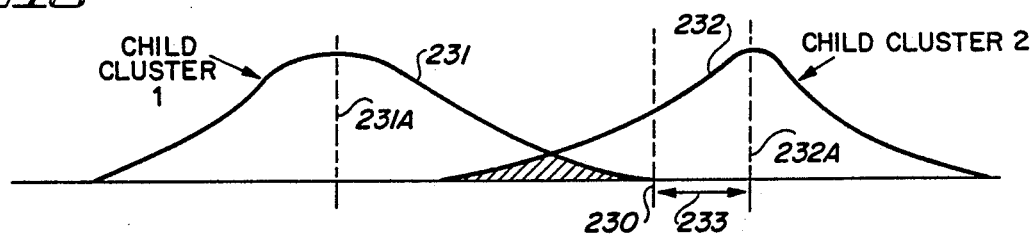
FIG. 16 is a diagram useful in explaining the subroutine of FIG. 12.

Referring to FIG. 10, the INTERACT(i) subroutine is entered via label 130, goes to block 131, and allocates a predetermined amount of storage for the maximum number of child nodes. INTERACT(i) then enters the CLUSTER subroutine of FIG. 10A in block 132. Referring now to FIG. 10A, the CLUSTER subroutine enters block 132A and performs an isodata clustering procedure on the set of classes represented in training set T. For each class, such as A, B, and C in FIG. 15, isodata clustering generates information indicative of whether grouping of these classes allows them to be properly clustered. i.e., M and N are clusters in FIG. 15. The CLUSTER subroutine then goes to block 132B, and computes the amount of cluster overlap. In FIG. 16, the shaded area indicates cluster overlap. In block 132B of FIG. 10A the feature cluster overlaps are computed in order to determine whether the clusters presently selected do in fact effectively partition the data. Then, in block 132C, this information is displayed to the user, who then can determine precisely what the tentative clusters are and how much they overlap. The clustering is performed by conventional statistical computations. See, for example, the reference Tou and Gonzalez, Ch. 3, incorporated herein by reference. In the example shown in FIG. 15, probability distributions A, B, and C form one isodata cluster, and probability distributions X, Y, and Z, which also are relatively close together, form another isodata cluster. The determination of overlap is based on the Bhatacharyya estimate of Bayes error. See the reference *Statistical Pattern Recognition*, Chi-hau Chen, 1973 Spartan Books, Hayden Book Co. ISBN 0-87671-177-8, incorporated herein by reference. Statistical estimators of how much overlap there is between the clusters allow the user to determine how well the data is partitioned and whether to accept the two clusters A, B, C, and X, Y, Z. The CLUSTER subroutine then returns to calling subroutine via label 132D.

In block 135 of FIG. 10, the INTERACT(i) subroutine prompts the user to enter a command. (The command can be any of the commands defined in the PARSECMD(y) subroutine of FIG. 11, described next.) In block 136 the INTERACT(i) subroutine reads the command y entered by the user, and in decision block 137 determines if that command was a "X" If it was, it means that the INTERACT(i) procedure is over for the present child node. In this case, the program releases part of the storage previously allocated in block 131, as indicated in block 138, and returns to block 112 of FIG. 9. If the command is not a "X" the program goes to the PARSECMD(y) in block 140, and then returns to block 135.

Figure 11:
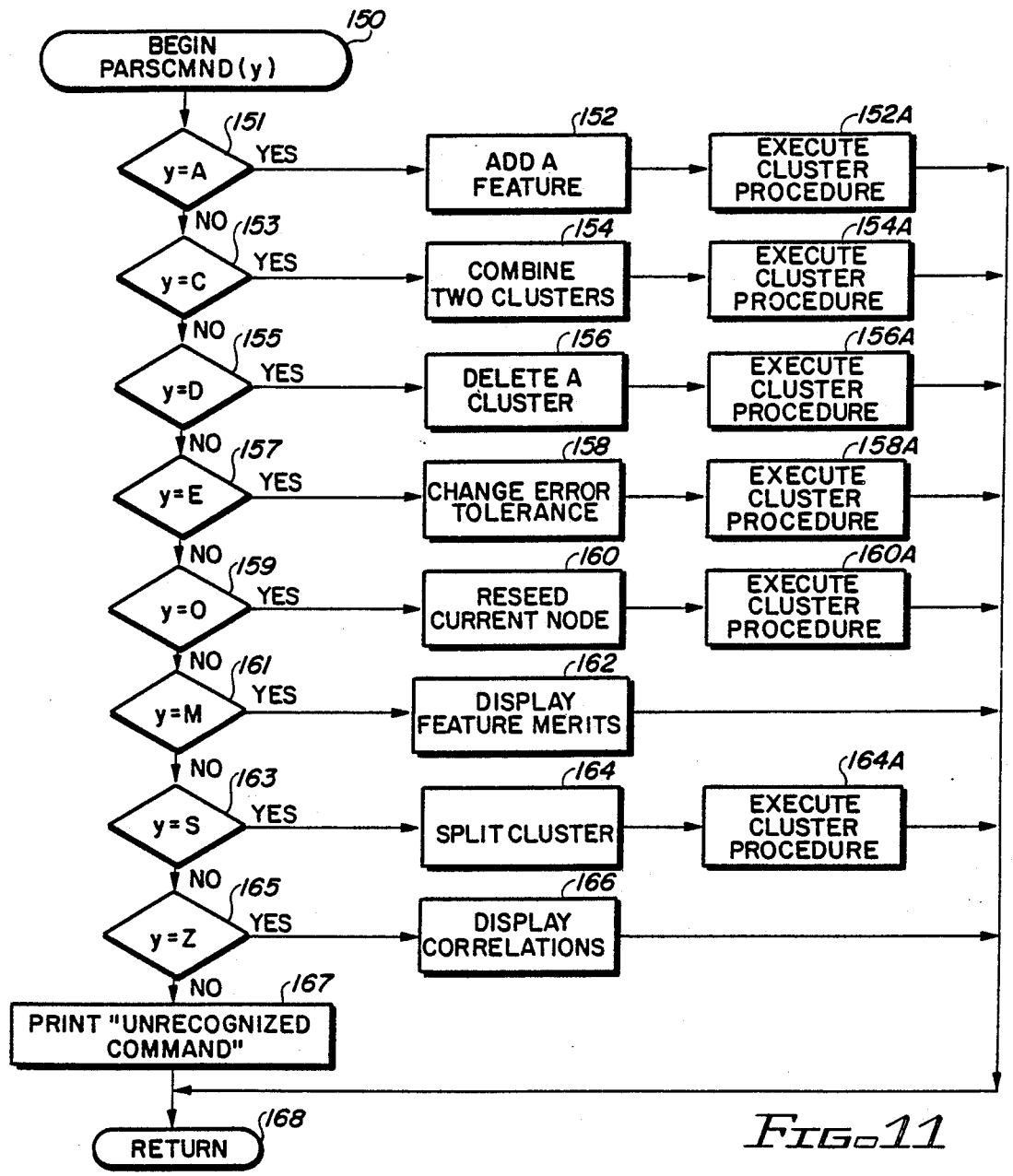
FIG. 11 is a flow chart of a subroutine PARSECMD(y) called by the subroutine of FIG. 10.

At this point, it will be helpful to describe the PARSECMD(y) subroutine of FIG. 11, which is entered via label 150. In decision block 151 the PARSECMD(y) subroutine determines if the user entered command is an "A", and if it is, goes to block 152 and adds a feature from the features previously extracted from T, if the user thinks the displayed clusters are not well enough separated. The subroutine then calls the CLUSTER subroutine of FIG. 10A, and returns to INTERACT(i) via label 168. If the command y is a "C", the subroutine goes to block 154 and combines two clusters. The user is prompted to specify two clusters, on the basis of judging the overlap and Mahalanobis distance between the clusters. The program then calls the CLUSTER subroutine, as indicated in block 154A, and returns. If the command is a "D", the subroutine deletes a cluster, as indicated in block 56. After calling CLUSTER in block 156A, PARSECMD(y) returns via label 168. If the user command is "E", PARSECMD(y) enters block 158 and changes an error tolerance, calls CLUSTER in block 158A, and returns. (Error tolerance is a threshold that specifies when the classes with two clusters overlap.) In block 159, an affirmative determination that the user command is a "O" causes PARSECMD(y) to enter block 160 and reseed the current node. (The isodata clustering algorithym requires inputs called "seeds", which are initial cluster centers in the feature space. These serve as starting points for aggregating the classes into clusters. The clustering can yield different results depending on how seed points are selected.)

The subroutine then calls CLUSTER in block 160A, and returns. If the user command is determined in block 161 to be "M", the subroutine goes to block 162 and displays the Fisher Feature Merit Measure. The Fisher Merit indicates how well a particular feature separates the classes under consideration. The subroutine then returns via label 168. If the user command is an "S", the subroutine goes to block 164 and splits a cluster. (i.e., an existing cluster center is replaced by a pair of points in the feature space to test if the present cluster ought to be split into two clusters.)

After calling CLUSTER in block 164A the subroutine returns via label 168. If decision block 165 determines that the user command is a "Z", the subroutine goes to block 160 and displays a routine of the pairwise correlations between pairs of features. The subroutine then returns via label 168. Finally, if none of the above indicated user commands were entered, the subroutine prints an "unrecognized command" message in block 167 and returns via label 168.

Returning to FIG. 9, after block 111, the EXPAND(i) subroutine goes from block 111 to block 112 and sets n equal to the number of children of the present node i in the decision tree being constructed. The value of n is determined by the isodata clustering procedure of FIG. 10A.

The EXPAND(i) subroutine then goes from block 112 to block 113, sets k=1, goes to decision block 114 and determines if k exceeds n, and if it does, returns via label 115 to the calling routine. A negative determination by block 114 causes the EXPAND(i) subroutine to go to block 116 and determine if the present child node k is a "terminal" node that represents a decision. If this determination is negative, the subroutine goes to block 117, and recursively repeats the EXPAND(i) subroutine of FIG. 9 with i=k. Either an affirmative determination from decision block 116 that the present node k is terminal or completion of recursive execution of EXPAND(k) in block 117, causes k to be incremented, as indicated in block 118. The subroutine then returns to decision block 114. This procedure is repeated until either a new decision tree is completely constructed in block 92 of FIG. 8 or until editing of an existing tree is completed in block 97 of FIG. 8.

Thus, the EXPAND(i) subroutine recursively goes down the decision tree being constructed or edited, calling the INTERACT(i) subroutine at each node, allocating storage for the maximum number of child nodes that each node can have, and performs the cluster procedure on all of the classes at each node to separate the classes or partition them into different sets. For example, at the root node 20 in FIG. 4 the entire set of classes is partitioned into three clusters: a cluster 22 which contains a single class, namely the class "B", containing characters which have two holes in them; cluster 21 which consists of this class of characters each of which has only a single hole in it; and cluster 23 which consists of the classes of characters which have no holes. The child node 21 then is determined to have two child nodes, one being node 24 the characters of which have the characteristic that the hole is not in the upper portion of the character, and node 25 the characters of which have the characteristic that the single hole is in the upper portion of each character. The procedure is continued in order to expand each child node into a further cluster until finally the child node contains only a single character.

Figure 14:
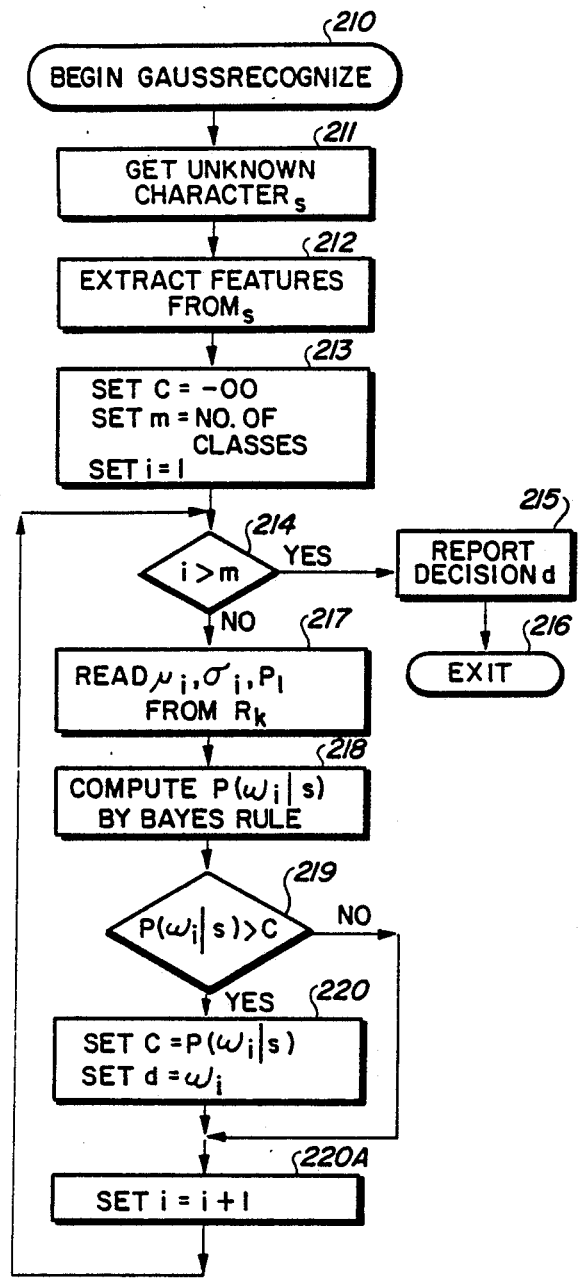
FIG. 14 is a flow chart of a subroutine GAUSSRECOGNIZE called by the program of FIG. 5.

After the HTRAIN program of FIG. 6 has been executed by constructing a hierarchy of parametric pattern recognition components $\alpha_i$ appropriate to the hand drawn characters s to be recognized, the HRECOGNIZE program of FIG. 5, which calls the TREERECOGNIZE program of FIG. 12 and the GAUSSRECOGNIZE program of FIG. 14, can be executed to recognize an unknown character s.

The procedure for the Gaussian discriminant method is indicated in the flow chart of FIG. 13, wherein the subroutine GAUSSTRAIN called by block 61 of HTRAIN (FIG. 6) if a Gaussian discriminant component is desired. GAUSTRAIN is entered at label 200, goes to block 201, and sets an index i with an initial value of 1 and sets m to the number of classes in the set $\Omega$. GAUSSTRAIN then goes to decision block 202 and determines if i is greater than m, and if it is, produces a list of all of the means $\mu_i$, the variances $\sigma_i^2$, and the prior probabilities $P_i$ in block 203, and exits via label 204. If i is not less than m, the subroutine goes to block 205, and applies the standard statistical formulas to compute $\mu_i$, $\sigma_i^2$, and $P_i$. (See for example, Duda and Hart.) Thus, GAUSSTRAIN simply loops through all of the classes, and computes the mean, variance, and prior probability for the extracted features for each class $\omega_i$. The use of the prior probabilities $P_i$ is important because this may indicate that the sample characters in the training set corresponding to the present class have a very lopsided distribution: for example, there may be ninety A's and two H's in it. The prior probability then informs the classifier that the present character is more likely to be an A.

Referring to FIG. 12, if the HRECOGNIZE program calls TREERECOGNIZE from block 52, the TREERECOGNIZE subroutine is entered via label 180, and first loads the decision tree computed by TREE EDIT in block 181. The TREERECOGNIZE subroutine then goes to block 182 and reads the unknown character s.

The subroutine goes from block 182 to block 183 and sets an initial value of i=1, the root node of the decision tree. The subroutine then goes to decision block 184 and determines if the node of the present index i is a terminal node, i.e., if it is a node that has no child nodes depending therefrom. If this is the case, it means that the TREERECOGNIZE subroutine has passed entirely through the decision tree. The subroutine therefore goes to block 185 and reports the decision or class $\omega_k$ which the unknown character s is recognized to be. For example, if the present value of i corresponds to terminal node E in FIG. 4, the decision reported in block 185 is that the character s is a "E". The TREERECOGNIZE subroutine then is exited via label 186.

If the current node i (as TREERECOGNIZE traverses the decision tree) is not terminal, the subroutine goes to block 187 and extracts the features of the present character s needed at node i of the decision tree, in order to meaningfully compare it with corresponding features of various clusters of the present node. For example, in FIG. 4, if the present node is node 21, features are extracted from the current value of the unknown character s that enable it to be meaningfully compared with the children of cluster 21. The TREERECOGNIZE subroutine then goes to block 188 and finds which of the child clusters of the present node has the least Mahalanobis distance from its cluster center to the position of the unknown character s in the present feature space. For example, in FIG. 16, reference numeral 230 indicates the position of the unknown character s in the feature space, 231A designates the cluster center of a first child cluster having a probability distribution 231, and 232A designates that cluster center of a second child cluster having a probability distribution 232. The Mahalanobis distance can be visualized as the distance 233 from position 230 to the center of child cluster 232. Since that distance 233 is shorter than the corresponding distance to the center 231A of the first child cluster 231, cluster 232 would be the one chosen in block 188. This technique is described in standard references, such as the above mentioned Duda and Hart reference. The center of each child cluster is its mean $\mu$. The Mahalanobis distance is a quantity analogous to the Euclidian distance between the position of the unknown characters and the mean of a particular child cluster, modified by the covariance matrix values of the child cluster under consideration.

Next, TREERECOGNIZE goes to block 189 and assigns to index i the index of the node associated with the cluster C having the least Mahalanobis distance to the position of the unknown character s. If that node is a terminal node, an affirmative decision is obtained in decision block 184, and the character represented by the node i is reported as the decision of the tree.

The GAUSSRECOGNIZE subroutine of FIG. 14, when called by block 52 of HRECOGNIZE (FIG. 5), is entered via label 210 and goes to block 211 and reads the unknown character s. The subroutine then goes to block 212 and extracts the needed features from s, goes to block 213, and sets an initial value of C to a large negative number, sets m to the number of classes in $\Omega$, and sets the index i to an initial value of 1. The subroutine then goes to decision block 214, which reports the decision of GAUSSRECOGNIZE, if i exceeds m, in block 215 and exits via label 216. If GAUSSRECOGNIZE has not operated on all of the m classes, a negative determination is obtained from block 214, and the subroutine goes to block 217 and reads the values of $\mu_i$, $\sigma_i^2$ and $R_i$ from the extracted feature representation $R_k$ that corresponds to the present value of i. Then, using a conventional Bayes rule technique in block 218, the subroutine computes the posterior probability $P(\omega_i|s)$ that tells how likely it is that s is truly a member of class $\omega_i$, in accordance with standard techniques, as disclosed in the Duda and Hart reference. The subroutine then goes to block 219 and determines whether $P(\omega_i|s)$ exceeds C, and if it does, it goes to block 220 and sets C equal to the present value of $P(\omega_i|s)$, which is the probability that $\omega_i$ is the classification of s. In block 220 the subroutine also sets a decision parameter d to $\omega_i$, the highest probability class encountered so far by GAUSS-RECOGNIZE. The subroutine increments i in block 220A and then returns to decision block 214. If the determination of block 219 is negative, the subroutine increments i and then goes to decision block 214. Thus, the highest probability decision is the one reported in block 215.

The above described technique is an adaptive compromise between the computational tractability of prior parametric methods and the power of prior non-parametric methods. At the root of the hierarchy of parametric pattern recognition components, the original training set T is summarized by the usual set of parameters. If these parameters are adequate for perfect classification of all training samples, then recognition is complete. It usually happens, however, that there are certain class distinctions (for example, a "q" versus a "9") that are not handled adequately by the initial parameterization. The training technique described above identifies these problem areas and takes additional passes through the same training data, concentrating only on those unknown samples that are misclassified by the original classifier (i.e., the root component $\alpha_1$). This process is continued recursively until classification is accomplished. The benefit is that the time and computational resources during the training process are spent where most needed, on the problem areas. The "easy" distinctions are made quickly, on the first parameterization. If all distinctions are "easy" the process is equivalent to simple parametric pattern recognition. If the distinctions are not "easy", the process is much more accurate than simple parametric pattern recognition, but not nearly as expensive and computationally tractable as the traditional non-parametric methods.

Appendix A attached hereto is a printout containing the program of FIGS. 5–11, written in the language C.

While the invention has been described with reference to a particular embodiment thereof, those skilled in the art will be able to make various modifications to the described embodiment of the invention without departing from the true spirit and scope thereof.

EXHIBIT "A"

```
                 11
                  1
                  1
    aaaa          1
       a          1
    aaaaa         1
   a     a        1
   a    aa        1
    aaaa a      .111 x     x
       x   x
        x x
        xx
       x   x
      x     x i              i
                                  /
    ssss       ii     r rrr    ii     u    u    ssss
    s   s      i      rr   r   i      u    u    s   s
    ss         i      r        i      u    u     ss
       ss      i      r        i      u    u       ss
    s    s     i      r        i      u   uu    s    s
    ssss      iii     r       iii     uuu  u    ssss
```

Job: x
Date: Mon May 23 09:20:48 1988 crtarget.c

```
/************************************************************************
 *
 * Character Recognition
 *      Version 1.0
 *
 * (C) Copyright 1986 GTX Corporation
 *
 ************************************************************************/
static char sccsid[] = "@(#)crtarget.c  2.17   Copyright 1986 GTX Corp";
/************************************************************************
     crtarget.c This file contains routines unique to the program crtarget.  Other
     routines used by crtarget are extracted during make from the files crflib0.c
            crflib1.c
            crflib2.c
            crflib3.c
            crflib4.c
            crflib5.c
            crclassify.c
            crnorm.c
            cridlib.c crtarget is a version of the classification program that runs on
     the target system(TGT), or on the system 1000 (VME),
     or on the Sun computer(SUN).  In the latter two cases, crtarget is
     intended to be an approximation of the verson running on the target
     system.  crtarget extracts features from and classifies a single
     character.

SUN:
        On the Sun system, crtarget has a main program and the routines
             get1char()- called by getdata to read in 1 char matrix
             getdata()- parses command line and reads in data from files
        crtarget is invoked as follows:

crtarget -i ifn -l lfn -t tfn [-p pfn] -r rej [-d] [-a angle]
             where
                    ifn is the name of a file containing 1 ASCII character matrix
                        with no labeling.
                    lfn is the name of a file containing normalization coeffs from
                        program crnorm.
                    tfn is the name of a file containing tree info from the
                        program crbuild.
                    pfn is the name of a file containing prior prob info from the
                        program crstat.(optional)
                    rej is a rejection threshold.
                    -d is the debug flag.
                    -n is the non-alpha tree flag.
                    angle is the orientation angle (default 0)

************************************************************************/
include "crdefs.h"
static char sccsid2[] = SCCSSTR;        /* from crdefs.h*/ int reject;             /* nonzero if character is a reject */
    short choice;           /* class no. chosen */
    short choice2;          /* second choice class */
    short choice3;          /* third choice class */
    char id;                /* chosen id */
    char id2;               /* second choice id */
    char id3;               /* third choice id */
    int oconf, oconf2, oconf3; /* overall confidence of classification */
    short orient;           /* orientation from workstation */
```

```
short rejectc;
short width, height, lowlx, lowly, lowrx, lowry;      /* for crbox */
extern void crbox();

#ifndef STANDALONE
#define EXTERN extern
extern short nbord;
#else
#define EXTERN
short nbord = -1;
extern void exit();
endif /* if slave mode, the following are defined in interface module */
EXTERN int nonalpha;                    /* non-alpha tree flag */
EXTERN short npix;                      /* current ON pixel count */
EXTERN short wx, wy;                    /* current pixel window dimensions */
EXTERN char p[MAXWX+1][MAXWY+1];        /* pixel window, ON pixels are !=0 */

/* if slave mode, there must be a separate module linked in with either
            short debug = 1;
     or
            short debug = 0;
*/ ifdef DEBUG
EXTERN short debug;                     /* nonzero for debug option on (-d) */
short chars;
endif if (defined(SUN) && defined(STANDALONE))

/* under UNIX, comes from .1 file: */
double scaleterm[NFEAT], scalefactor[NFEAT];    /* norm scale data */ else long *stermadr, *sfactadr; /* ptrs to scaling info */ endif ifdef STANDALONE
float prior[MAXCLASS];
endif extern char complete, confs;
 /* must fill at tinitl time */
extern struct confstruct confstat[2][CONFTYPES];

#if (defined(SUN) && defined(STANDALONE))
/* under UNIX, comes from .t file; declns in crclassify.c */
extern struct noderec tree[MAXNODE];    /* main tree */
extern char featused[NFEAT+(NFEAT&0x1)];        /* feature use table; even size */
extern struct classrec cl[MAXCLASS];    /* class decsriptor array */
endif /* the arrays  tree, featused and cl should only be referenced through
   the pointers below.  This is because, on the target system, the
   data is an external segment whose address is determined dynamically.
   the declarations are in crclassify.c   */ extern struct noderec *tadr;    /* adr of tree */
extern struct classrec *cadr;   /* adr of cl */
extern char *fadr;              /* adr of featused */ extern void adrinit();          /* initializes above adrs; in crclassify.c */
extern short getfeat();
```

```
extern long nfeatused;          /* from crclassify.c */
extern FLOAT extract();         /* from crflib0.c */
extern void extinit();          /* from crflib1.c */
extern void tinitl();           /* from crflib5.c */
extern void tinitg();
extern void linit();            /* from crclassify.c */
extern int doclassify();        /* from crclassify.c */
extern short scale();           /* from crnorm.c  */
extern struct clmaptype classmap[]; /* from cridlib.c */

/* misc globals */ struct noderec *node;
struct noderec *childp;
FLOAT ndist;                    /* distance to nearest cluster */
char* optarg;                   /* set by local getopt */ ifdef VME
struct bufstruct {
   int fildes;
   int nleft;
   char *nextp;
   char buff[512];
} bufa, *bufaptr;
#define FBUFR struct bufstruct
#else
#define FBUFR FILE
endif define FILENO 1      /* for use by ierror */

/* the following buffer is used for setjmp/longjmp state information */
extern long jmpbuf[18];

#ifndef TGT
/************************************************************************
 fopen1(fname)
    opens a file for buffered input.  Under Alcyon/Vdos, always uses the same
    buffer, so only one of these files can be open simultaneously.
    This functionality is only needed for temporary debugging on the
    System 1000. Under UNIX, it is the same as fopen()for read.
    fclose1() is used to close a file opened with fopen1().

************************************************************************/

FBUFR *fopen1(fname)
char *fname;
{
#ifdef VME
   int rtn;

rtn=fopen(fname, &bufa,0);
   if(rtn < 0)
      return(NULL);
   else
      return(&bufa);
#else
   return(fopen(fname, "r"));
#endif
}
/************************************************************************
 fclose1(fp)
    counterpart to fopen1().
************************************************************************/ int fclose1(fp)
FBUFR *fp;
{
```

```c
#ifdef VME
    return(close(fp->fildes));
#else
    return(fclose(fp));
#endif
}
endif /* ifndef TGT */ ifdef STANDALONE
/************************************************************************
  lerror(message) - local error handler
************************************************************************/ void lerror(msg)
char *msg;
{
    fprintf(STDERR, "\ncrtarget: %s\n", msg);
    exit(1);

}
endif ifdef STANDALONE

/************************************************************************
fgets().
    from K&R p155 except that iop is declared a ptr to FBUFR (=FILE on unix).
************************************************************************/
char *fgets(s, n, iop)
char *s;
int n;
FBUFR *iop;
{
    register int c;
    register char *cs;

cs = s;
    while(--n > 0 && (c = getc(iop)) != EOF)
        if ((*cs++ = c) == '\n')
            break;
    *cs = '\0';
    return((c ==EOF && cs == s) ? NULL : s);
}

/************************************************************************
get1char(fp, &m, &n, &np)

Gets next sample object from file.  Returns dimensions of pixel
    array in m,n and pixel count in np.  The pixels of the object are
    placed in the global array p[][].
    called only by getdata();
************************************************************************/ get1char(fp, rx, ry, np)
short *rx, *ry, *np;
FBUFR *fp;
{
    char cb[MAXLINE+1];           /* line buffer */
    short twx, maxx, maxy, wxt;
        maxx = maxy = *np = 0;
        while (fgets(cb, MAXLINE, fp)){
                twx = 0;
                while (cb[twx] != '\n') {
                    p[twx][maxy] = (unsigned char)(cb[twx] != ' ');
                    if (p[twx][maxy] > 0) (*np)++;
                    twx++;
```

```c
            }
            for (wxt = twx; wxt < MAXWX; wxt++)      /* zero rest of line */
                p[wxt][maxy] = 0;
            maxy++;                         /* point to next line */
            if (twx-1 > maxx)               /* keep track of widest line */
                maxx = twx - 1;
        }
        maxy--;
        if ((maxx < 2) || (maxy < 2) || (maxx > MAXWX) || (maxy > MAXWY))
            fprintf(STDERR, "WARNING - sample size is out of legal range!!!\n");
        *rx = maxx;
        *ry = maxy;
}

/************************************************************************
int getopt(argc, argv) - simplistic simulation of UNIX library routine
                         getopt for use on System 1000. returns option
                         letter, sets global optarg to option argument.
                         not particularly robust, just for temporary
                         debugging on the System 1000.
************************************************************************/ int getopt(argc, argv)
int argc;
char *argv[];
{
    int i;
    static int argcount; /* no. of arg returned on previous call */
    for(i=argcount+1; i<argc; i++){
        if(argv[i][0] == '-')
            break;
    }
    if(i == argc)
        return(EOF);
    argcount = i;
    optarg = argv[i+1];
    return(argv[i][1]);
}

/************************************************************************
getdata(argc, argv) - get all data from command line and files
************************************************************************/ short getdata(argc, argv)
int argc;
char *argv[];
{
    long nfeat, treesize;
    char datestr[40];
    char copystr[30];
    short i, fe;
    int c, class, n, fd;
    FBUFR *fp;
    short treeform;

/* priors default to 1/MAXCLASS */
    for(i=0; i<MAXCLASS; i++){
        prior[i] = 1.0/(MAXCLASS);
    }
    nonalpha = FALSE;

/* check command line arguments and read files */
    while ((c = getopt(argc, argv, "n:l:t:dcp:r:")) != EOF)
        switch(c) { case 'c':                   /* -c turns characteristics option on */
        case 'C':
```

```
#ifdef DEBUG
        chars = TRUE;
#else .
        printf("Warning: not compiled with debug option\n");
#endif
        break;

case 'n':               /* -c turns characteristics option on */
    case 'N':
        nonalpha = TRUE;
        break;

case 't':               /* tree file */
#if (defined(SUN) && defined(STANDALONE))
        fd = open(optarg, 0);
        if(fd != NULL){
            printf("reading tree from file \n");
            read (fd, &complete, sizeof(complete));
            if(!complete)
                fprintf(stderr, "WARNING: tree contains unexpanded nodes\n");
            read (fd, &confs, sizeof(confs));
            if(!confs)
                fprintf(stderr, "WARNING: tree contains no confidence info\n");
            read (fd, &treeform, sizeof(treeform));
            if(treeform != TREEFORM)
                fprintf(stderr, "WARNING: Inconsistent treeform code!\n");
            read (fd, datestr, sizeof(datestr));
            read (fd, copystr, sizeof(copystr));
            read(fd, &nfeat, sizeof(nfeat));
            if(nfeat != NFEAT)
                fprintf(STDERR, "inconsistent value of nfeat in .t file\n");
            read(fd, &treesize, sizeof(treesize));
            if(treesize ) MAXNODE*sizeof(struct noderec) )
                lerror("tree size exceeds max");
            if(nfeat != NFEAT)
                lerror("inconsistent feature count in tree");

read (fd, featused, sizeof(featused));
            read (fd, cl, sizeof(cl));
            read (fd, confstat, sizeof(confstat));

if ((read(fd, tree, treesize) != treesize))
                lerror("cant read tree input file");
            if (  read(fd, &n, 1) != 0)
                lerror("improper tree input file");
            close(fd);
        }
        else{
            fprintf(STDERR, "can't open t file\n");
        } break;
else
        lerror("t option unimplemented on vme");
        break;
endif case 'd':               /* -d turns debug option on */
    case 'D':
#ifdef DEBUG
        debug = TRUE;
#else
        printf("Warning: not compiled with debug option\n");
#endif
        break;

case 'a':
    case 'A':
```

```
            orient = (atoi(optarg));
            break;

case 'r':
        case 'R':
            rejectc = (atoi(optarg));
            break;

case 'p':                      /* file of prior probs */
        case 'P':
            fp=fopen1(optarg);
            if(fp == NULL){
               fprintf(STDERR, "cant open p file\n");
               break;
            }
            while((fscanf(fp, "%d", &class)!=EOF) &&
                  (fscanf(fp, "%f", &prior[class])!=EOF));
            fclose1(fp);
            break;

#if (defined(SUN) && defined(STANDALONE))
        case 'l':                      /* file of normalization coeffs */
        case 'L':
#ifdef DEBUG
            if(debug)
                fprintf(STDERR, "about to read l-file\n");
#endif
            fp=fopen1(optarg);
            if(fp == NULL){
                fprintf(STDERR, "cant open l file\n");
                break;
            }
            for (i=0; i<NFEAT; i++)
                fscanf(fp, "%lf %lf", &scaleterm[i], &scalefactor[i]);
            fclose1(fp);
#ifdef DEBUG
            if(debug)
                fprintf(STDERR, "finished reading l-file\n");
#endif
            break;
else
            lerror("l option unimplemented on vme");
            break;
endif case 'i':              .       /* data matrix */
        case 'I':
#ifdef DEBUG
            if(debug)
                fprintf(STDERR, "about to read character-file\n");
#endif
            fp=fopen1(optarg);
            if(fp == NULL){
                fprintf(STDERR, "cant open i file\n");
                break;
            }
            get1char(fp, &wx, &wy, &npix);
            fclose1(fp);
#ifdef DEBUG
            if(debug)
                fprintf(STDERR, "finished reading character-file\n");
#endif
            break;

default:
            fprintf(STDERR, "unknown option:%s\n", optarg);
            exit(1);
    }
}
```

```c
endif      /* #ifdef STANDALONE */ if !(defined(SUN) && defined(STANDALONE))

/*************************************************************************
crras() - do minimum functions of cr, to upload raster blobs to ws
*************************************************************************/
crras()
{
    int setjmpval;

if(setjmpval = setjmp(jmpbuf)){
        reject = 1;
        choice = choice2 = 0;
        id = id2 = '?';
        oconf = -500;
        return(setjmpval);
    } extinit(orient);   /* per-char feat extract initializations */
    return(0);
} endif

/*************************************************************************
 main()
*************************************************************************/ ifndef STANDALONE
int xmain()
#else
main(argc, argv)
int argc;
char *argv[];
#endif
{
    int cuttype=0, i, setjmpval;
    float maxd, maxrat;

#ifdef VME
    fout.fd = 6;
endif if(setjmpval = setjmp(jmpbuf)){
ifndef STANDALONE
    reject = 1;
    choice = choice2 = 0;
    id = id2 = '?';
    oconf = -500;
    return(setjmpval);
#else
    exit(setjmpval);
#endif
} ifdef STANDALONE
    getdata(argc, argv);        /* command line args & read data */
endif ifdef DEBUG
    if(debug)
        fprintf(STDERR, "In main about to call adrinit\n");
#endif
    adrinit();                  /* initializes tadr, cadr, fadr */ nfeatused = 0;
    for (i = 0; i < NFEAT; i++)
        if (*(fadr + i)) nfeatused++;
```

```
#ifdef DEBUG
    if (debug){
      fprintf(STDERR, "Number of used features=%d\n",nfeatused);
      fprintf(STDERR, "In main about to call linit\n");
    }
endif
    linit();                    /* local initializations */
#ifdef STANDALONE
#ifdef DEBUG
    if(debug)
        fprintf(STDERR, "In main about to call tinitl and tinitg\n");
#endif
    tinitl();                   /* feat extract initializations */
    tinitg();
endif ifdef DEBUG
    if(debug)
        fprintf(STDERR, "In main about to call extinit\n");
#endif
    extinit(orient);            /* per-char feat extract initializations */ ifdef DEBUG
    if(debug){
        fprintf(STDERR, "\n\n NON-CUT FEATURE VALUES:\n");
        for (i=0; i<NRIFEAT+NRDFEAT; i++){
            fprintf(STDERR, "fno=%d, value = %d  %s\n", i,
                    getfeat(orient, cuttype, i),
                    ( (*(fadr + i)) ? "USED" : "") );
        }
        fprintf(STDERR, "\n\n");
    }
endif node = tadr; /* point to tree */

/* perform the classification and return the chosen class in clchosen */ ifdef DEBUG
    if(debug)
        fprintf(STDERR, "In main about to call doclassify\n");
#endif
    id = doclassify(orient, &oconf, &reject, &choice,
                            &oconf2, &choice2, &id2,
                            &oconf3, &choice3, &id3 );

#ifndef TGT
    fprintf(STDERR,"id is %c, oconf is %d, reject is %d, choice is%d\n",
        id, oconf, reject, choice);
    fprintf(STDERR,"id2 is %c, oconf2 is %d, choice2 is%d\n",
        id2, oconf2, choice2);
    fprintf(STDERR,"id3 is %c, oconf3 is %d, choice3 is%d\n",
        id3, oconf3, choice3);
endif ifndef STANDALONE
    return(0);
#endif
}
```

```
            11
             1
             1
   aaaa      1
      a      1
   aaaaa     1
  a    a     1
  a    aa    1
   aaaa a   111
```

```
  x     x
   x   x
    xx
    xx
   x   x
  x     x
```

```
                    i                 i
  ssss     ii     r rrr      ii     u   u    ssss
 s    s     i     rr   r      i     u   u   s    s
   ss       i     r           i     u   u     ss
     ss     i     r           i     u   u       ss
 s    s     i     r           i     u  uu   s    s
  ssss    iii     r         iii      uuu u   ssss
```

```
                              Job:  x
                              Date: Tue May 17 16:39:49 1988
```

```c
#define SCCSSTR "@(#)crdefs.h   2.53 Copyrignt 1986 GfX Corp"

/************************************************************************
crdefs.h - header file for the character recognition programs
************************************************************************/ include "envdefs.h"
if DEVELOPMENT
#define STANDALONE
endif if SUN
include <stdio.h>
#include <math.h>
#include <string.h>
#include <fcntl.h>
#include <ctype.h>
```

```
#include <sys/types.h>
#include <sys/stat.h>
#define FLOAT   double
define MAXINT  MAXLONG else
include "SYS:0000.&.MATH.HH"
#define FLOAT   float
#define MAXFLOAT (1e17)         /* under UNIX, in math.h */
#define MAXINT  MAXSHORT
#define NULL    0
#define EOF     (-1)
endif define INT                     /* integerizes crflib's */

/* global manifest constants */ define MAXCLASS        100     /* max no. of classes */ define NRIFEAT         157     /* no. of rot-ind. features */
define NRDFEAT         13      /* no. of rot-dep. features */
#define NCUTFEAT        131     /* no. of cut features */
#define MAXCUTS         1       /* max no. of cuts */

/* total no. of uncut features */
#define MFEAT           (NRIFEAT + NRDFEAT)

/* total no. of features */
#define NFEAT           (MFEAT + MAXCUTS * NCUTFEAT)

/* constants only for feature sampling */ define MAXSAMP         1100    /* max no. of samples */
define MAXWX           160     /* max width of pixel window */
#define MAXWY           MAXWX   /* max length of pixel window (= max width!) */
#define MAXBORD         1600    /* max no. of border pixels in sample */
#define MAXHOLE         12      /* max no. of holes in sample */
#define MAXLINE         200     /* max line width for input file */
#define MAXDIST         100     /* max distance = max(cx - mx, cy - my):
                                   cx,cy is the center point and mx,my is
                                   the farthest border point from cx,cy */
#define MAXRAD          (MAXDIST+(MAXDIST/2))
                                /* max distance = max(sqrt((cx - mx)**2 +
                                   (cy - my)**2)): cx,cy is the center
                                   point and mx,my is the farthest border
                                   point from cx,cy */ define CSIZE           6       /* no. of convex hull rotations */
define FSIZE           64      /* no. of normalized fourier samples */
#define FSORT           8       /* no. of perimeter sort elements */
#define FCOEF           8       /* no. of perimeter fourier coefficients */
#define FCOR            4       /* no. of perimeter autocorrelations */
#define RSIZE           8       /* no. of rings in radial sample */
#define SSIZE           24      /* no. of slices in radial sample */
#define SSORT           8       /* no. of slice sort elements */
#define SCOEF           4       /* no. of slice fourier coefficients */
define SCOR            4       /* no. of slice autocorrelations */ define MINHRAT         .05     /* min hrat for non-noise holes */
define MAXTRANS        6       /* max OFF/ON pixel cut transitions */

/* constants only for tree building */ define TREEFORM        3       /* increment when tree format is changed */ define STARTDIM        1       /* starting dimens. of universe */
define STARTNC         8       /* 1...MAXCLUST; deflt # of children to start */
```

```
#define MAXCLUST      12      /* 0...max cluster(child) no. */
#define MAXSUBTREES   4       /* max number of subtrees */
#define MAXMEMB       MAXCLASS /* max # of members of a single cluster */
#define MAXDIM        12      /* max dimensionality */
#define MAXNODE       1000    /* max no. of nodes */
#define MAXSAVE       7       /* max no. of nodes saved while tree building */
#define ITERS         10      /* no. iterations for clustering resolution */
#define SITERS        3       /* no. iterations for seed generation */
#define OFACTOR       1.00    /* 0...1 weighting factor of overlap in gain */
#define DNSTDEVS      3.00    /* default no. of std devs for crclassify */
#define PERR          0.002   /* err prob for overlap determination */
#define NSTDEVS       3.00    /* for gap test merit calculation only */
#define SDTHRESH      ((FVMAX-FVMIN)/2)       /* used by seeds() */
#define MINNSAMP      3   /* 1...min no. of samples for valid class */
#define SPLITND       1.0       /* no. sty.devs. to move center on split */
#define GOODMERIT     10      /* below this is bad feature */
#define CTHRESHM      3.0
#define CTHRESHA      0.06
#define MINSBCNT      2

/* constant for history programs */ define MAXTOTSAMP    20000

/* generic constants */ define FVMIN         0       /* min value on integer feature val num line */
define FVMAX         1000    /* max value on integer feature val num line */ define TRUE          1
define FALSE         0
#define PI            3.14159265358979323846
define SQRT2         1.41421356237309504880 define MAXSHORT      32767
define MAXLONG       2147483647
#define FMAXS1        32767.
#define FMAXS2        65535.
#define F2E16         65536.
#define FMAXL1        2147483647.
#define FMAXL2        4294967295.
#define F2E32         4294967296.

/* generic function macro definitions */ define ABS(x)        ((x) < 0 ? -(x) : (x))
define RND(x)        ((long)((x) < 0 ? ((x)-.5) : ((x)+.5)))
#define SIGN(x)       ((x) < 0 ? -1 : 1)
#define DEG(x)        (180 * (x) / PI)
#define SQR(x)        ((x) * (x))
#define CUB(x)        ((x) * (x) * (x))
#define MIN(x,y)      ((x) < (y) ? (x) : (y))
#define MAX(x,y)      ((x) > (y) ? (x) : (y))
#define LEN(x)        ((x) % 2 == 0 ? 1 : SQRT2)
#define MOD(x,y)      ((x) < (0) ? ((x) + 1) % (y) + (y) - 1 : (x) % (y))
#define SUMSQ(x,y)    ((x) * (x) + (y) * (y))
#define DIFSQ(x,y)    ((x) * (x) - (y) * (y))
#define DIV(x,y,z)    ((ABS(y) < 1e-7) ? (z) : ((x) / (y)))

/* macro definitions for combining two positive values to be 0...1 */ define RAT(x,y)      ((x) < (y) ? (x) / (y) : (y) / (x))
define PRD(x,y)      (2 * lsqrt(ABS((x) * (y))) / ((x) + (y)))
#define DIF(x,y)      (1 - ABS((x) - (y)) / ((x) + (y)))

/* generic procedure macro definitions */ define FAVG(x,i,n,a)  for (i = 0, a = 0; i < (n); a += x[i], i++); a /= (n)
```

```
#define FSUB(x,a,i,n,y)    for (i = 0; i < (n); y[i] = x[i]-(a), i++)
#define FSSQ(y,i,n,s)      for (i = 0, s = 0; i < (n); s += SQR(y[i]), i++);
#define FSSQA(x,a,i,n,s)   for (i = 0, s = 0; i < (n); s += SQR(x[i]-(a)), i++);
#define FRMS(s,n,r)        r = sqrt(s / (n))
#define FVAR(y,i,n,s)      for (i = 0, s = 0; i < (n); s += SQR(y[i]), i++);\
                           s = sqrt(s / (n))
#define FSKEW(y,i,n,c)     for (i = 0, c = 0; i < (n); c += CUB(y[i]), i++);\
                           c = pow(ABS(c) / (n), 1/3.)
#define FKURT(y,i,n,s,q)   for(i = 0, q = 0; i < (n); s = SQR(y[i]),\
                           q += SQR(s), i++); q = pow(q / (n), 1/4.)
#define FVARA(x,a,i,n,s)   for (i = 0, s = 0; i < (n); s += SQR(x[i]-(a)),\
                           i++); s = sqrt(s / (n))
#define FSKEWA(x,a,i,n,c)  for (i = 0, c = 0; i < (n); c += CUB(x[i]-(a)),\
                           i++); c = pow(ABS(c) / (n), 1/3.)
#define FKURTA(x,a,i,n,s,q) for(i = 0, q = 0; i < (n); s = SQR(x[i]-(a)).\
                           q += SQR(s), i++); q = pow(q / (n), 1/4.)
#define FMIN(x,i,n,m)      for (i = 0, m = MAXFLOAT; i < (n);\
                           m = MIN(x[i],m), i++)
#define FMAX(x,i,n,m)      for (i = 0, m = -MAXFLOAT; i < (n);\
                           m = MAX(x[i],m), i++)

/* structure definitions */ struct tables {                         /* tables for fast feature extraction math */
long power[MAXWX+1][4];                 /* for quick powers (see domom()) */
FLOAT CSIN[MAXWX+1][CSIZE];             /* sine table for convex hull rotations */
FLOAT CCOS[MAXWY+1][CSIZE];             /* cosine table for convex hull rotations */
#ifndef INT
FLOAT FSIN[FSIZE],FCOS[FSIZE];          /* sine and cosine tables for fourier coefs */
FLOAT SSIN[SSIZE],SCOS[SSIZE];          /* sine and cosine tables for fourier coefs */
#else
short FSIN[FSIZE],FCOS[FSIZE];          /* sine and cosine tables for fourier coefs */
short SSIN[SSIZE],SCOS[SSIZE];          /* sine and cosine tables for fourier coefs */
#endif
FLOAT RAD[MAXDIST+1][MAXDIST+1];        /* origin to point distance matrix */
#ifdef INT
long DIST[MAXDIST+1][MAXDIST+1];        /* origin to point distance matrix */
#endif
short SECT[MAXDIST+1][MAXDIST+1];       /* origin to point angle matrix */
FLOAT RSX[MAXRAD][SSIZE/8+1];           /* x coordinate for r, slice */
FLOAT RSY[MAXRAD][SSIZE/8+1];           /* y coordinate for r, slice */
};

typedef struct {            /* 64-bit integer for limath.s arithmetic */
        unsigned long low;
        long high;
} longlong;

/* structure for a tree node record */ define FVALUE   short struct noderec {
    short nbrnch;                       /* 0...MAXCLUST-1; no. of child clusters */
    short cdim;                         /* 0...MAXDIM-1; dimensionality of this node */
    short flist[MAXDIM];                /* list of features sorted by number*/
    short topfeat[MAXDIM];              /* feature list sorted by merit */
    FVALUE cmean[MAXDIM];               /* center of this cluster */
    FVALUE csd[MAXDIM];                 /* std dev this cluster */
    short child[MAXCLUST];              /* pointers to child clusters */
    short terminal;                     /* nonzero is class of terminal */
    short parent;                       /* pointer to parent cluster */
    short splitflag;                    /* 1=tree split node, 0=regular node */
    short rotmode;                      /* 0=no rot, 1=rot, 2=cut1, 3=cut2, -1=subterm */
    short cutclass;                     /* cut equivalence class */
    short prob;                         /* probability for this node */
#if (defined(STANDALONE) && defined(SUN))
    float entropy;                      /* entropy at this node */
```

```
    float overlap;              /* overlap at this node */
    float gain;                 /* gain at this node */
    float error;                /* error at this node */
    short nmemb;                /* no. of members in this cluster */
    short label;                /* for node reference */
    short memb[MAXMEMB];        /* class no.s of members of this cluster */
#endif
};

/* tgtnoderec is a structure equal in size to the portion of the above
   node record before the if.  check whenever noderec changes !  */
#define TGTRECSIZE ((4*MAXDIM + MAXCLUST + 8) * 2)

struct tgtnoderec {
    char tgtndummy[TGTRECSIZE];
};
#if !(defined(STANDALONE) && defined(SUN))
#define tree tadr
endif define CHILD(node, clust) (tree[(node)->child[clust]])

/* structure for a savenode record */ struct savenrec {
    struct noderec root;
    struct noderec leaf[MAXCLUST];
    float perr;
    struct savenrec *next;
};

/* structure and constants used in confidence calculation */ define CONFDIM 5
define CONFTYPES 2
struct confstruct{
    long prior;
    long mean[CONFDIM];
    long sd[CONFDIM];
};

/* structure for a class descriptor */ struct classrec {
    short cnt;                   /* no. of samples taken for this class */
    FVALUE mean[NFEAT];          /* means of features */
    FVALUE sd[NFEAT];            /* sdvs of features */
};

struct rotstruct {
    char angle;
    char id;
};

/* structure initialized in cridlib.c */ struct clmaptype {
    char id;           /* ASCII visible class of character */
    char ncuts;        /* no. of possible cuts for this character */
    char cuttype;      /* cut equivalence class */
    short member;      /* packed (16 bits) subtree membership flags */
};

#ifdef VME
/* fout is the file buffer for standard out under Alcyon C.  Under Alcyon,
   we send stderr to stdout (&fout) */ struct iob{
```

```
    int fd;              /* file descriptor */
    int cc;              /* char count */
    char *cp;            /* ptr to next char */
    char cbuf[512];      /* char buffer */
};
extern struct iob fout;
#define STDERR &fout
#else
#define STDERR stderr
endif /* error reporting function define. this is for use in programs running
   under the System 1000 or TGT, but may be used anywhere FILENO
   is defined.  (FILENO is a number unique to each file used to
   identify it.  The list of FILENO's is in ierror in crflib2.c   */ if (defined(STANDALONE) && defined(SUN))
define IERROR(x, l)  ierror(__LINE__, FILENO, x, l)
#else
#define IERROR(x, l)  ierror(__LINE, FILENO, x, l)
endif extern void longjmp();
extern int setjmp();

/* the following structure is used to hold information about the
   four feature groups (rot. ind, rot. dep., first cut, second cut)
   it is used in crbuild.c and cruser.c */ struct fgrouptype{
    short fgbase;        /* first feat. no. in this group */
    short fgcount;       /* no. of features in this group */
    short fgtotal;       /* no. of features in total */
    char *fgname;        /* name of this group */
};

static char sccsid[] = "@(#)crbuild.c   2.31 Copyright 1986 GTX Corp";

/**************************************************************************
*
* Character Recognition
*     Version 1.0
*
* (C) Copyright 1986 GTX Corporation
*
**************************************************************************/

/**************************************************************************
crbuild.c - main program for interactive character tree builder contains routines:

linit()
                lerror()
                lsqrt()
                skipwhite()
                skipcomment()
                nscan()
                cscan()
                fscan()
                readstats()
                readz()
                opfile()
                expand()
                gather()
                nfree()
                nalloc()
                reportnode()
```

```
checktree()
mainmenu()
main()

subordinate files:
        cruser.c
        cridlib.c
        crcluster.c
```
usage:
```
        crbuild -s statfile -t treefile  [-d] [-m<minnumsamp>] [-z zfile]
                [-r<randseed>] [-l logfile] [-p priorprobfile] [-f featurenames
```

The -m option has a default set by the MINNSAMP constant in the crdefs.h
header file. The -m option overrides this default and sets a new minimum
number of samples that must have been taken of a class in order to include
that class in the tree.

The ASCII stat file by convention has a ".s" suffix. It
has mean and standard deviation information for all classes in the training
set. The stat file is in the following format:

- for each class:
    - a line containing the class number, number of samples
      in this class, and visible class id in "%5d%5d %c" format.
    - until all feature means are written out for this sample:
        - a line containing 10 feature means in the format %7d
    - an empty line separating the means from the std devs.
    - until all feature std. devs. are written out for this sample:
        - a line containing 10 feature std. devs. in the format %7d This file is created by the program crstat. If this file is not specified,
the current directory will be searched for a file with a ".s" suffix
and that will be used. If more than one such file is present, it is an error.

the optional "priorprobfile" is a file of prior probabilities for each
class. Each line of this file has a class number and a
probability in %5d %f7.4 format. If this option is not specified,
the current directory will be searched for a file with a ".p" suffix
and that will be used. Again, if more than one such file is present, it
is an error.

The optional ASCII "logfile" is created with the -l option. It
contains a history of commands entered.

the z option reads in a file of pooled within-class correlation data.
Format of the file is:

- for each feature i 0<=i<NFEAT
    - a line containing the feature number i in %5d
    -as many lines as necessary to print out the
      correlations z(i,j)*100, i<j<NFEAT, 16 per line in format %5d.

Like the prior file, if this option is not given, the current directory
will be searched for a ".z" file. If more than one is present, it
is an error.

The result of running crbuild is a classification tree file whose name
is given by the -t option. By convention, the tree file has a suffix ".t"
Contents of the tree file is as follows. (The t-file is a binary file.)

| name | size in bytes |
|---|---|
| complete | 1 |
| confs | 1 |
| treeform | 2 |
| date | 40 |
| copyright | 30 |
| nfeat | 4 |

```
            treesize        4
            featused        NFEAT+(NFEAT & 0x1)
            cl              MAXCLASS * sizeof(struct classrec)
    confstat    2*CONFTYPES*sizeof(struct confstruct)
            tree            treesize
```

The structure of the tree is defined in the source file crdefs.h.
the variables complete and confs are flags telling whether the tree is
complete (has no unexpanded nodes) and whether the tree has been
augmented with distance statistics. Treeform is a number indicating tree
format type; the value of treeform in the tree should agree with the
value of treeform in crdefs.h. treeform should be incremented whenever
the tree format is modified.

*********************************************************************/

```c
#include "crdefs.h"
static char sccsid2[] = SCCSSTR;        /* from crdefs.h*/ extern int interact(); /* from cruser.c */

FILE *fpstat;                           /* input (stat) file */
FILE *fppipe, *fpprior, *fpz;
FILE *fpfeat;                           /* feature name file */
int fdtree;                             /* file des. of tree (output) file */
FILE *fplog;                            /* logfile */
int logflag;                            /* flag to toggle logging option */
int fflag;                              /* feature names in array */
char logfile[40];                       /* log file name */
char datestr[40];
char copystr[30] = "Copyright 1987 GTX Corp";
char ffile[40];                         /* feature name file */
int eflag;                              /* flag to specify tree being edited */
int debug;                              /* nonzero for debug option on (-d) */
int nfeat=NFEAT;
int minnsamp;                           /* local variable of global MINNSAMP */
float perr;                             /* err prob for overlap calc */
float zthresh;      /* threshold on correlation for feature selection */
float totalerr;                         /* error for last node clustered */
float nstdevs;          /* for merit calculation only */
struct classrec cl[MAXCLASS];   /* array of means, stdvs of features/samp */
struct noderec tree[MAXNODE];       /* main tree */
char featused[NFEAT+(NFEAT & 0x1)];             /* 1=used. rounded to even size */
int fmerits[NFEAT];   /* feature merits - see fmerit() */
short sortfeat[NFEAT];/* sorted list of feature numbers */
int randoption=0;                       /* random seeding option set on command line */
extern int rand();
extern void srand();
extern void exit();
short r[NFEAT][NFEAT];   /* feature correlation matrix */
float prior[MAXCLASS];
int sumsd[NFEAT];
int ovlp[MAXCLUST][MAXCLUST];  /* overlap table */
int summean[NFEAT];
int sumsq[NFEAT];
int rootclasses;                        /* no. of classes at root */
int maxnode = -1;                       /* highest node used */
int nfreecount;                         /* no. of nodes on free list */
int nodesused;                          /* used to count nodes used in tree */
char tfile[40];                         /* name of tree file */
int nfreeptr = -1;                      /* next free node */
long treesize;
struct confstruct confstat[2][CONFTYPES];
char featname[NFEAT][20];       /* feature names */
extern struct clmaptype classmap[]; /* from cridlib.c */ struct fgrouptype fgroup[MAXCUTS+2]={
```

```
        (0, NRIFEAT, NRIFEAT, "rotation independent"),
        (NRIFEAT, NRDFEAT, NRIFEAT+NRDFEAT, "rotation dependent"),
        (NRIFEAT+NRDFEAT,NCUTFEAT,NRIFEAT+NRDFEAT+NCUTFEAT,"cut"),
  /*    (NRIFEAT+NRDFEAT+NCUTFEAT, NCUTFEAT, NRIFEAT+NRDFEAT+NCUTFEAT,
                                    "cut"), */
};
static long jmpbuf[18], jmpbuf2[16];
static char usage[] = "usage: crbuild [-d] [-m(minnsamp)] [-r(seed)] [-p pfile] [-z zfile] [-f featurename] [-s statfile] [-l logfile] -t treefile";
/***************************************************************
linit - local initialization of stuff and things
***************************************************************/ void linit()
{
   int i;

setbuf(stdout, (char *)NULL);
   setbuf(stderr, (char *)NULL);
   fprintf (stderr,"\nCharacter Recognition Tree Builder\n");
   fprintf (stderr,"\n(C) Copyright 1966 GTX Corporation\n\n");
   perr = PERR;              /* error prob for overlap determination */
   nstdevs = NSTDEVS;        /* used for merit calculation only */
   minnsamp = MINNSAMP;      /* default - overridden by -m option */
   zthresh = -1.0;           /* calculate threshold, not set */

/* mark all nodes unused for later gathering onto free list */
   for (i = 0; i < MAXNODE; i++)
        tree[i].pprnch = -1;
}

/***************************************************************
lerror(message) - local error handler
***************************************************************/ lerror(msg)
char *msg;
{
   fprintf(stderr, "\ncrbuild: %s\n", msg);
   exit(1);
}

/***************************************************************
lsqrt(x) - local square root
***************************************************************/ double lsqrt(x)
double x;
{
   if(x < 0){
        fprintf(stderr, "attempt to take sqrt of %f ; returned 0\n", x);
        return(0.0);
   }
   else {
        return(sqrt(x));
   }
}

/*****************************************************************************
skipwhite() skips whitespace
*****************************************************************************/
void skipwhite()
{
    char c;

while( (c = getchar()) == ' ' || c == '\n' || c == '\t');
    ungetc(c, stdin);
}

/*****************************************************************************
skipcomment() skips comment (line beginning with #) in input
*****************************************************************************/
void skipcomment()
{
    char c;

skipwhite();
    while( (c=getchar()) == '#') {
        while( getchar() != '\n');
        skipwhite();
    }
    ungetc(c, stdin);

}

/*****************************************************************************
nscan() gets and returns an integer from stdin, skipping non-numeric chars
*****************************************************************************/
```

```
int nscan()
{
   char c;
   int x;

skipcomment();
   while(!isdigit(c=getchar()) && c != '-');
   ungetc(c, stdin);
   scanf("%d", &x);
   if(logflag)
      fprintf(fplog, " %d\n", x);
   return(x);
}

/************************************************************************
cscan() gets and returns a char from stdin, skipping white chars
************************************************************************/
char cscan()
{
   char c;

skipcomment();
   c=getchar();

if(logflag)
      fprintf(fplog, " %c\n", c);
   return(c);
}
/************************************************************************
fscan() gets and returns a float from stdin, skipping non-numeric chars
************************************************************************/
float fscan()
{
   char c;
   float x;

skipcomment();
   while(!isdigit(c=getchar()) && c != '-' && c !='.');
   ungetc(c, stdin);
   scanf("%f", &x);
   if(logflag)
      fprintf(fplog, " %f\n", x);
   return(x);
}

/************************************************************************
 readstats() - read in stat file
************************************************************************/
readstats()
{
   int class,fe, scanfreturn, nfeat;
   char vcl;
   while( fscanf(fpstat, "%d",&class) != EOF) {
      if(class )= MAXCLASS)
         lerror("invalid class number reading stat file");
      fscanf(fpstat, "%hd%*c%c", &cl[class].cnt, &vcl);
      if(vcl != classmap[class].id)
         lerror("inconsistent class/id in stat file");
      if(debug)
         fprintf(stderr, "reading in stats for class %d (%c), count= %d\n", class,
      nfeat = NRIFEAT+NRDFEAT+classmap[class].ncuts*NCUTFEAT;
      for (fe = 0; fe < nfeat; fe++)
         fscanf( fpstat, "%hd", &cl[class].mean[fe]);
      for (fe = 0; fe < nfeat; fe++)
         scanfreturn=fscanf( fpstat, "%hd", &cl[class].sd[fe]);
   }
```

```
      if( scanfreturn(=0)
         lerror("trouble reading stat file ");
}

/************************************************************************
 readz()

routine to readin the correlation file into the array r[][]

*************************************************************************/
readz()
{
    register short fe2, fe;
    short rho;

for (fe = 0; fe < NFEAT-1; fe++) {
        fscanf(fpz, "%*d");
        for (fe2 = fe+1; fe2 < NFEAT; fe2++) {
            fscanf(fpz, "%hd", &rho);
            r[fe][fe2]=r[fe2][fe]=rho;
        }
    }
}

/************************************************************************
opfile - decipher command line arguments etc.
*************************************************************************/ void opfile(argc, argv)
int argc;
char *argv[];
{
    short c, treeform;
    int priorflag=FALSE, zflag=FALSE;
    char confs, complete, priorfile[40], zfile[40], sfile[40];
    extern int optind;
    struct stat buf;
    extern char *optarg;
    char s[200], tempstr[80];
    int fe, n, i, class, sflag=FALSE, tflag=FALSE;

eflag=FALSE;
    fflag=FALSE;
    logflag=FALSE;

while ((c = getopt(argc, argv, "z:p:dm:X:r:f:s:t:l:")) != EOF)
        switch(c) { case 'X':                /* sample */
            c = atoi(argv[optind - 1] + 2);
            break;

case 'd':                /* -d turns debug option on */
            debug = TRUE;
            break;

case 'f':                /* feature name file */
            strncpy(ffile, optarg, 40);
            fflag=TRUE;
            break;

case 'p':                /* file of prior probs */
            strncpy(priorfile, optarg, 40);
            priorflag = TRUE;
            break;
```

```
     case 's':                    /* stat file */
        strncpy(sfile, optarg, 40);
        sflag=TRUE;
        break;

case 'z':                    /* correlation file */
        strncpy(zfile, optarg, 40);
        zflag=TRUE;
        break;

case 'l':                    /* logfile */
        strncpy(logfile, optarg, 40);
        logflag=TRUE;
        fplog = fopen(logfile, "a+");
        setbuf(fplog, (char *)NULL);
        fprintf(fplog, "# ");
        fppipe=popen("date", "r");
        fputs(fgets(tempstr, 80, fppipe), fplog);
        pclose(fppipe);
        fprintf(fplog, "# ");
        for(i=0; i<argc; i++)
           fprintf(fplog, "%s ", argv[i]);
        fprintf(fplog, "\n");
        break;

case 't':                    /* tree file */
        strncpy(tfile, optarg, 39);
        if(stat(tfile, &buf) != -1){
           c = 0;
           while(c != 'e' && c != 'c'){
              printf("File %s exists. edit(e) or clobber(c)?\n", tfile);
              eflag = ((c = cscan()) == 'e');
           }
        }
        tflag=TRUE;
        break;

case 'm':                    /* -m sets new min. no. samples requirem. */
        minnsamp = atoi(argv[optind - 1] + 2);
        break;

case 'r':                    /* -r sets random reseeding flag */
        if( randoption = atoi(argv[optind - 1] + 2))
           srand( (unsigned) randoption);
        break;

default:
        lerror(usage);
        break;
  } if(!tflag)
    lerror(usage);

if (eflag) {
   fdtree = open(tfile, 0);
   if (fdtree != NULL) {
      printf("reading tree from file %s\n", tfile);
      read (fdtree, &complete, sizeof(complete));
      if(!complete)
         fprintf(stderr, "tree contains unexpanded nodes\n");
      read (fdtree, &confs, sizeof(confs));
      read (fdtree, &treeform, sizeof(treeform));
      if(treeform != TREEFORM)
         fprintf(stderr, "WARNING: Inconsistent treeform code!\n");
      read (fdtree, tempstr, sizeof(datestr)+sizeof(copystr));
      read (fdtree, &nfeat, sizeof(nfeat));
      if(nfeat != NFEAT)
```

```
            lerror("inconsistent value of nfeat in treefile");
        read (fdtree, &treesize, sizeof(treesize));
        maxnode = ((treesize / sizeof (struct noderec)) - 1);
        read (fdtree, featused, sizeof(featused));
        read (fdtree, cl, sizeof(cl));
        read (fdtree, confstat, sizeof(confstat));
        if ((read(fdtree, tree, treesize) != treesize))
            lerror("cant read tree input file");
        if (debug) {
            fprintf(stderr,
              "sizeof nfeat=%d,treesize=%d,featused=%d,cl=%d\n",
              sizeof(nfeat),sizeof(treesize),sizeof(featused), sizeof(cl));
            fprintf(stderr,"nfeat=%d treesize=%d \n", nfeat,treesize);
        }
        if (read(fdtree, &n, 1) != 0){
            lerror("improper tree input file");
        }
        close(fdtree);
    }
    else
        lerror("can't open tfile for reading");
}
else {
    fdtree = creat (tfile, 0644);
    if (fdtree < 0)
        lerror("cant open tree output file");
    close(fdtree);
}

/* open ASCII stat file */
if ( (!sflag) && (!eflag) ) {
    if(!system("test -r *.s")) {
        fppipe=popen("echo *.s", "r");
        fscanf(fppipe, "%40s", sfile);
        if(fscanf(fppipe, "%40s", tempstr) ==1)
            lerror("more than one .s file. specify one");
        pclose(fppipe);
        sflag=TRUE;
    }
}
if (sflag){
    fpstat = fopen(sfile, "r");
    if (fpstat == NULL)
        lerror("cant open stat file");
    printf("reading in class statistics from file %s\n", sfile);
    readstats();
    fclose(fpstat);
}
else {
    if (!eflag)
        lerror(usage);
}

/* equal priors unless there is a pfile */
for(i=0; i<MAXCLASS; i++)
    if(cl[i].cnt >= minnsamp)
        rootclasses++;
for(i=0; i<MAXCLASS; i++)
    if(cl[i].cnt)
        prior[i]=1.0/(float)(rootclasses);
    else
        prior[i] = 0;
if(!priorflag) {
    if(!system("test -r *.p")) {
        fppipe=popen("echo *.p", "r");
        fscanf(fppipe, "%40s", priorfile);
        if(fscanf(fppipe, "%40s", tempstr) ==1)
            lerror("more than one .p file. specify one");
        pclose(fppipe);
        priorflag=TRUE;
    }
}
```

```
if(priorflag){
   fpprior=fopen(priorfile, "r");
   if(fpprior != NULL){
      while((fscanf(fpprior, "%d", &class)!=EOF) && (fscanf(fpprior, "%f", &prior[clas
      printf("reading in prior probabilities from file %s\n", priorfile);
      fclose(fpprior);
   }
}
else {
   printf("assuming equal prior class probabilities \n");
}

/* open ASCII file of correlations */
for (fe = 0; fe < NFEAT; fe++)
   r[fe][fe] = 100;
if(!zflag) {
   if(!system("test -r *.z")) {
      fppipe=popen("echo *.z", "r");
      fscanf(fppipe, "%40s", zfile);
      if(fscanf(fppipe, "%40s", tempstr) ==1)
         lerror("more than one .z file. specify one");
      pclose(fppipe);
      zflag=TRUE;
   }
}
if(zflag){
   fpz=fopen(zfile, "r");
   if(fpz != NULL){
      readz();
      printf("reading in correlations from file %s\n", zfile);
      fclose(fpz);
   }
}
else {
   printf("assuming uncorrelated features \n");
}

/* Open and read feature name file */
if (!fflag) {
   strcpy(ffile,"featname");
   fflag=TRUE;
}
fpfeat=fopen(ffile,"r");
if (fpfeat != NULL) {
   printf ("reading feature name file from %s ...\n",ffile);
   while (fscanf(fpfeat,"%3d%s",&fe,s) != EOF) {
      strcpy(featname[fe],s);
   }
   fclose(fpfeat);
}
else {
   printf ("no feature name file available for names\n\n");
   fflag=FALSE;
}

}

/***********************************************************************
 expand(nodeptr) This routine recursively expands the specified node
                 If the node is already expanded, skip to
                 children. Thus expand(tree) will get unfinished nodes.
***********************************************************************/ void expand(node)
struct noderec *node;
{
   int f, clust;

if(node->nbrnch == 0 && !node->terminal){
      if(interact(node))
```

```
            longjmp(jmpbuf); /* 'Q' command */
    } for (clust = 0; clust < node->nbrnch; clust++) {
        if (!CHILD(node, clust).terminal) {
            expand(&CHILD(node, clust));
        }
    }
}

/***********************************************************************
gather(nodenumber) - put all nodes of subtree on free list
***********************************************************************/ gather(nodenumber)
int nodenumber;

{
    int i;

if (debug) fprintf(stderr, "entering gather(%d)\n", nodenumber);

for (i = 0; i < tree[nodenumber].nbrnch; i++) {
        gather (tree[nodenumber].child[i]);
    }
    nfree(nodenumber);
}

/***********************************************************************
nfree(nodenumber) - return nodenumber to the free list
***********************************************************************/ nfree(nodenumber)
int nodenumber;

{
    int temp;

if (debug) fprintf(stderr, "nfree(%d) ", nodenumber);

temp = nfreeptr;
    nfreeptr = nodenumber;
    tree[nodenumber].cdim = temp;
    tree[nodenumber].nbrnch = -1;
    nfreecount++;
}

/***********************************************************************
nalloc() - get nodenumber from the free list
***********************************************************************/ nalloc()

{
    register struct noderec *node;
    register temp;

if (debug) fprintf(stderr, "nalloc(%d) ", nfreeptr);

temp = nfreeptr;
    if(nfreeptr == -1)
        lerror("free list exhausted");
    else
        nfreeptr = tree[nfreeptr].cdim;
    nfreecount--;
    maxnode = MAX(maxnode, temp);
    node = &tree[temp];
```

```c
    node->nbrnch = node->label = node->parent = node->terminal = node->cdim =
    node->rotmode = node->splitflag = node->prob = node->nmemb =
    node->cutclass = 0;
    return(temp);
}

/*************************************************************************
reportnode() - traverse tree displaying node numbers and members for use
               in picking an edit node
*************************************************************************/
reportnode(node)
struct noderec *node;
{
    int allsame, i, nodenumber, lviscl;
    static int linecnt=0, level=0;

if(!level++){
        printf ("\n\n |node number| (*=incomplete)    list of members\n");
        linecnt = 0;
    }
    nodenumber = ((((int)node-(int)(&tree[0])) / sizeof (struct noderec)));
    printf ("\n");
    for (i = 1; i < level; i++)
        printf ("   ");
    if (linecnt++ > 44) {
        printf ("\n\nMore?(y/n)");
        if(cscan() != 'y'){
            linecnt = level = 0;
            longjmp(jmpbuf2);
        }
        linecnt = 0;
    }
    allsame = TRUE;
    if(node->nbrnch==0){
        lviscl = classmap[node->memb[0]].id;
        for (i = 0; i < node->nmemb; i++) {
            if (classmap[node->memb[i]].id != lviscl)
                allsame = FALSE;
        }
    }

/* '*' in printout means vis classes not all the same */
    printf (" |%2d|(%c%c) ",nodenumber, allsame ? 0:'*', node->label);
    for (i = 0; i < node->nmemb; i++)
        printf ("%c ",classmap[node->memb[i]].id);
    for (i = 0; i < node->nbrnch; i++)
        reportnode (&(CHILD(node, i)));
    level--;
}
/*************************************************************************
checktree(node) - returns 0 if there are incomplete nodes in tree.
*************************************************************************/
checktree(node)
struct noderec *node;
{
    int nodenumber, allsame, i, lviscl;
    nodesused++;
    allsame = TRUE;
    if(node->nbrnch==0){
        lviscl = classmap[node->memb[0]].id;
        for (i = 0; i < node->nmemb; i++) {
            if (classmap[node->memb[i]].id != lviscl)
                allsame = FALSE;
        }
    } if(node->nbrnch == -1){
```

```
        nodenumber = ((((int)node-(int)(&tree[0])) / sizeof (struct noderec)));
        fprintf(stderr, "WARNING: tree inconsistency at node %d\n", nodenumber);
    }
    for (i = 0; i < node->nbrnch; i++)
        allsame = checktree (&(CHILD(node, i))) && allsame;

return(allsame);
}

/********************************************************************
featupdate() - recursively traverses tree to update featused array

********************************************************************/
void featupdate(node)
struct noderec *node;
{
    int f, clust;

/* update list of features used in tree */
    for (f = 0; f < node->cdim; f++) {
        featused[node->flist[f]]++;
    } for (clust = 0; clust < node->nbrnch; clust++) {
        if (!CHILD(node, clust).terminal) {
            featupdate(&CHILD(node, clust));
        }
    }
}

/**********************************************************************
subtreesetup() - set up space for 4 subtrees first four are used at this time:
                        1 = full
                        2 = numeric
                        3 = letters
                        4 = smallsize
                        5-16 = unused NOTE: if number of sub-tree goes above 12, MAXCLUST
                      needs to be incremented
**********************************************************************/
subtreesetup()
{ int treenum, class;
    struct noderec *node;
    int mask;

printf ("\nsetting up sub-trees\n");
        mask = 0x1;
        for (treenum = 1; treenum < MAXSUBTREES+1; treenum++) {
            node = &tree[treenum];
            node->nmemb = 0;
            node->rotmode = 0;
            node->parent = 0;
            node->terminal = 0;
            tree[0].child[treenum-1] = nalloc();
            tree[0].nbrnch = MAXSUBTREES;
            for (class = 0; class < MAXCLASS; class++) {
                if ( (cl[class].cnt >= minnsamp ) &&       /* enough samps? */
                     (classmap[class].member & mask) ) {   /* in this subtree? */
                    node->memb[node->nmemb++] = class;
                    if (debug)
                        fprintf(stderr,"subtree=%d class=%d\n",treenum,class);
```

```
              }
           }
           mask = mask << 1;
       }
}

/************************************************************************
mainmenu() top-level interactive control;
*************************************************************************/
mainmenu()
{
    int filesize, class, editnode, i, loop=TRUE;
    struct noderec *node;
    char c, complete, confs=0;
    short treeform=TREEFORM;

setjmp(jmpbuf);
    if(logflag)
        fprintf(fplog, "# entering main menu\n");

/* if new tree, skip initial menu */
    if (!eflag) {
        node = &tree[0];
        if(nalloc())
            lerror("internal error-- root not at tree[0]");
        node->nmemb = 0;
        for (class = 0; class < MAXCLASS; class++)
            if (cl[class].cnt >= minnsamp)
                node->memb[node->nmemb++] = class;
        subtreesetup(); /* set up subtrees */
    eflag=1;
    for (i = 1; i < MAXSUBTREES+1; i++) {
        switch (i) {
          case 1:
                printf ("\n******** FULL TREE ********\n\n");
                break;

case 2:
                printf ("\n******** NUMERIC SUBTREE ********\n\n");
                break;

case 3:
                printf ("\n******** ALPHA SUBTREE ********\n\n");
                break;

case 4:
                printf ("\n******** SMALLSIZE SUBTREE ********\n\n");
                break;

default:
                break;
        }
        expand(&tree[i]);
    }
    } do {
        printf("\ne(edit node), c(continue), r(report), w(write), Q(write & quit)?");
        c = cscan();
        switch(c) {
        case('e'):
            printf("Enter node number:");
            editnode = nscan();
            if (editnode < 0 || editnode > maxnode){
                printf ("\nInvalid Node Number\n");
            }
            else if(tree[editnode].nbrnch == -1) {
```

```
            fprintf(stderr, "attempt to edit unallocated node\n");
        }
        else if(tree[editnode].terminal) {
            printf ("Can't edit terminal node; try adding a class.\n");
        }
        else {
            node = &tree[editnode];
            for (i = 0; i < node->nbrnch; i++)
                    gather (node->child[i]);
            node->nbrnch = 0;
            expand(node);
        }
        break;

case('c'):
    expand(&tree[0]);
    break;

case('r'):
    if(!setjmp(jmpbuf2))
        reportnode(&tree[0]);
    break;

case('Q'):
    system("rm screen.file");
    loop = FALSE;
case('w'):
    /* update feature used array */
    for (i = 0; i < NFEAT; i++)
        featused[i] = 0;
    featupdate(&tree[0]);
    nodesused=0;
    treesize = (maxnode + 1) * sizeof (struct noderec);
    if(!(complete=checktree(&tree[0])))
        printf("\nchecktree: tree contains incomplete nodes");
    printf("\n%d nodes used in tree. maxnode =%d\n", nodesused, maxnode);
    if(nodesused != MAXNODE-nfreecount)
        fprintf(stderr,
                "WARNING:inconsistent node count. nfreecount = %d\n",
                nfreecount);
    fdtree = creat (tfile, 0644);
    if (fdtree < 0)
        lerror("cant open tree output file");
    printf("Writing to file %s...\n\n", tfile);
    printf("   sizeof(complete)    %d\n", sizeof(complete));
    printf("      sizeof(confs)    %d\n", sizeof(confs));
    printf("   sizeof(treeform)    %d\n", sizeof(treeform));
    printf("    sizeof(datestr)    %d\n", sizeof(datestr));
    printf("    sizeof(copystr)    %d\n", sizeof(copystr));
    printf("      sizeof(nfeat)    %d\n", sizeof(nfeat));
    printf("   sizeof(treesize)    %d\n", sizeof(treesize));
    printf("   sizeof(featused)    %d\n", sizeof(featused));
    printf("         sizeof(cl)    %d\n", sizeof(cl));
    printf("   sizeof(confstat)    %d\n", sizeof(confstat));
    printf("       sizeof(tree)    %d\n", treesize);
    printf("   -------------------------\n");
    filesize = sizeof(complete) + sizeof(confs) + sizeof(treeform) +
               sizeof(datestr) + sizeof(copystr) + sizeof(nfeat) +
               sizeof(treesize) + sizeof(featused) + sizeof(confstat) +
               sizeof(cl) + treesize;
    printf("size of tree file    %d\n\n", filesize);
    if(logflag)
        fprintf(fplog, "# writing tree file size =  %d\n", filesize);

fppipe=popen("date", "r");
    fgets(datestr, 40, fppipe);
    pclose(fppipe);
    treeform = TREEFORM;
```

```c
            if ((write(fdtree, &complete, sizeof(complete)) != sizeof(complete)))
                fprintf(stderr, "error in writing completeflag to tree file.\n");
            if ((write(fdtree, &confs, sizeof(confs)) != sizeof(confs)))
                fprintf(stderr, "error in writing confsflag to tree file.\n");
            if ((write(fdtree, &treeform, sizeof(treeform)) != sizeof(treeform)))
                fprintf(stderr, "error in writing treeform to tree file.\n");
            if ((write(fdtree, datestr, sizeof(datestr)) != sizeof(datestr)))
                fprintf(stderr, "error in writing datestr to tree file.\n");
            if ((write(fdtree, copystr, sizeof(copystr)) != sizeof(copystr)))
                fprintf(stderr, "error in writing copystr to tree file.\n");
            if ((write(fdtree, &nfeat, sizeof(nfeat)) != sizeof(nfeat)))
                fprintf(stderr, "error in writing nfeat to tree file.\n");
            if ((write(fdtree, &treesize, sizeof(treesize)) != sizeof(treesize)))
                fprintf(stderr, "error in writing treesize to tree file.\n");
            if ((write(fdtree, featused, sizeof(featused)) != sizeof(featused)))
                fprintf(stderr, "error in writing out featused.\n");
            if ((write(fdtree, cl, sizeof(cl)) != sizeof(cl)))
                fprintf(stderr, "error in writing out cl.\n");
            if ((write(fdtree, confstat, sizeof(confstat)) != sizeof(confstat)))
                fprintf(stderr, "error in writing out confstat.\n");
            if ((write(fdtree, tree, treesize) != treesize))
                fprintf(stderr, "error in writing out tree.\n");
            close(fdtree);
            break;

}
    }
    while(loop);
}

/************************************************************************
 main()
************************************************************************/ main(argc, argv)
int argc;
char *argv[];
{
    int i;

linit();
    opfile(argc, argv);

/* set up free list */
    for (i = MAXNODE-1; i >= 0; i--)
        if(tree[i].nbrnch == -1)
            nfree (i);

mainmenu();
    printf( "quitting crbuild\n\n");

}
static char sccsid[] = "@(#)cruser.c    2.39";

/************************************************************************
 *
 * Character Recognition
 *      Version 1.0
 *
 * (C) Copyright 1986 GTX Corporation
 *
 ************************************************************************/

/************************************************************************
cruser.c - file containing interact() and supporting routines for crbuild contains routines:
```

```
                gcorrelate()
                correlate()
                sortfeats()
                sortfeatmerit()
                savebest()
                getbest()
                snkeep()
                snrecover()
                snfree()
                sndel()
                dispnode()
                dispcorrel()
                addfeat()
                reduce()
                setrottype()
                geticlst()
                showscreen()
                display()
                interact()

***********************************************************************/ include "crdefs.h"
static char sccsid2[] = SCCSSTR;        /* from crdefs.h*/

/* from crbuild.c: */
extern int debug, logflag, randoption, fflag, fmerits[NFEAT];
extern int nfreecount, ovlp[MAXCLUST][MAXCLUST];
extern float perr, nstdevs, totalerr, zthresh;
extern struct fgrouptype fgroup[];
extern FILE *fplog;
extern char featname[NFEAT][20];
extern short sortfeat[NFEAT], r[NFEAT][NFEAT];
extern double lsqrt();
extern struct noderec tree[MAXNODE];
extern struct classrec cl[MAXCLASS];
extern void lerror(), fixseeds();
extern float fscan();
extern int nscan();
extern char cscan();

/* from crcluster.c: */
extern void seeds(), isodata(), overlap(), split(), delc(), combine();
extern void fmerit(), fmerit2();
extern float spread();

static short dontndx;                       /* index into dontlist */
static short dontlist[NFEAT];               /* list of removed features, not to be used */
static struct savenrec bestnode;            /* best node so far */
static int numsaved;                /* number of nodes currently saved */
static struct savenrec savenode[MAXSAVE];   /* save node linked list */
static struct savenrec *sfreeptr, *savehead;   /* pointers to save node lists */
static short tempmem[MAXMEMB];      /* array of members between 2 clusters */
static int metric;
static float rc[MAXDIM+1][MAXDIM+1];    /* global combined correlation matrix */
extern struct clmaptype classmap[];     /* from cridlib.c */
extern void exit(), qsort();
/*********************************************************************
gcorrelate(node, fno)

This routine calculates one row of the correlation matrix for the
features that are currently valid at this node. The correlation is done
using only feature values for the active members at this node (found in
array pointed to by memb). Notice that this Pierson's formula easily
overflows int temporary variables if the number of features is large.
Results go into global rc[][] symmetric array.
The value of rc[i][j] is computed from the NON-class-conditional correlation
between feature i and j (read in from the z-file) and the correlation
``` of the class means of classes active at this node. rc is weighted mean
of the absolute values of these correlations
*********************************************************************/
```c
gcorrelate(node, fno)
struct noderec *node;
int fno;
{
    register short f2, c, class;
    double  rdenom;
    double  rnum, temp, temp1, temp2;
    double  sumx, sumy, sumx2, sumy2, sumxy;
    double   fnov, f2v, fnop, f2p, fnom, f2m;
    short   rfno, rf2;

/* weight factor between global and node-specific correlation;
    depends on no. of members at node */ double weight;

rfno = node->flist[fno];                    /* real feature no. */
    rc[fno][fno] = 1.0;
    for (f2 = 0; f2 < node->cdim; f2++) {
       if(f2==fno)
          continue;
       rf2 = node->flist[f2];
       sumx = sumy = sumx2 = sumy2 = sumxy = 0;
       for (c = 0; c < node->nmemb; c++) {
       class = node->memb[c];
       fnov = cl[class].mean[rfno];
       fnop = cl[class].mean[rfno] + cl[class].sd[rfno];
       fnom = cl[class].mean[rfno] - cl[class].sd[rfno];
       f2v = cl[class].mean[rf2];
       f2p = cl[class].mean[rf2] + cl[class].sd[rf2];
       f2m = cl[class].mean[rf2] - cl[class].sd[rf2];
       sumx += fnov * (2.71828 + 1.6487 * 2);
       sumx += (fnop + fnom)* (2 + 1.6487);
       sumy += f2v * (2.71828 + 1.6487 * 2);
       sumy += (f2p + f2m)* (2 + 1.6487);
       sumx2 += fnov * fnov * (2.71828 + 1.6487 * 2);
       sumx2 += (fnop * fnop + fnom*fnom) * (2 + 1.6487);
       sumy2 += f2v * f2v * (2.71828 + 1.6487 * 2);
       sumy2 += (f2p * f2p + f2m * f2m) * (2 + 1.6487);
       sumxy += fnov * f2v * 2.71828;
       sumxy += 1.6487 * (fnop * f2v + fnom * f2v  + fnov * f2p + fnov * f2m);
       sumxy += fnop * (f2p + f2m);
       sumxy += fnom * (f2p + f2m);
       if (sumx2 > 3.0e+38)
          printf("Warning - sumx2 out of range\n");
       if (sumy2 > 3.0e+38)
          printf("Warning - sumy2 out of range\n");
       if (sumxy > 3.0e+38)
          printf("Warning - sumxy out of range\n");
    }
    rnum = node->nmemb * sumxy * 13.313;
    temp = sumx * sumy;
    rnum = rnum - temp;
    temp2 = node->nmemb * sumy2 * 13.313;
    temp2 = temp2 - (sumy * sumy);
    temp1 = node->nmemb * sumx2 * 13.313;
    temp1 = temp1 - (sumx * sumx);
    temp = temp1 * temp2;
    rdenom = lsqrt(temp);
    if (rdenom < 0.000001){
       temp = 0.0;
    }
    else {
       temp =(rnum / rdenom);
    }
```

```
        weight = (double)node->nmemb/(double)tree[0].nmemb;
        rc[fno][f2] = rc[f2][fno] = weight*ABS(r[rfno][rf2])/100.0 +
                                    (1.0-weight)*ABS(temp);
    }
}

/***********************************************************************
correlate(node)

This routine calculates a correlation matrix for the
features that are currently valid at this node.  The correlation is done
using only feature values for the active members at this node (found in
array pointed to by memb).  Notice that this Pierson's formula easily
overflows int temporary variables if the number of features is large.
Results go into global rc[][] symmetric array.
The value of rc[i][j] is computed from the class-conditional correlation
between feature i and j (read in from the z-file) and the correlation
of the class means of classes active at this node.  rc is the square root
of the product of the absolute values of these correlations
***********************************************************************/
correlate(node)
struct noderec *node;
{
    register short f2, c, class, f1;
    double rdenom;
    double rnum, temp, temp1, temp2;
    int sumx, sumy, sumx2, sumy2, sumxy, f1v, f2v;
    short rf1, rf2;

for (f1 = 0; f1 < node->cdim; f1++) {
        rf1 = node->flist[f1];                    /* real feature no. */
        rc[f1][f1] = 1.0;
        for (f2 = f1 + 1; f2 < node->cdim; f2++) {
            rf2 = node->flist[f2];
            sumx = sumy = sumx2 = sumy2 = sumxy = 0;
            for (c = 0; c < node->nmemb; c++) {
                class = node->memb[c];
                f1v = cl[class].mean[rf1];
                f2v = cl[class].mean[rf2];
                sumx += f1v;
                sumy += f2v;
                sumx2 += f1v * f1v;
                sumy2 += f2v * f2v;
                sumxy += f1v * f2v;
                if ((sumx2 > 2100000000) || (sumy2 > 2100000000))
                    printf("Warning - sumx2, sumy2 out of range\n");
            }
            rnum = (double)node->nmemb * (double)sumxy;
            temp = (double)sumx * (double)sumy;
            rnum = rnum - temp;
            temp2 = (double)node->nmemb * (double)sumy2;
            temp2 = temp2 - ((double)sumy * (double)sumy);
            temp1 = (double)node->nmemb * (double)sumx2;
            temp1 = temp1 - ((double)sumx * (double)sumx);
            temp = temp1 * temp2;
            rdenom = lsqrt(temp);
            if (rdenom < 0.000001)
                rc[f1][f2] = 0.0;
            else
                temp =((rnum / rdenom)*(double)r[rf1][rf2])/100.0;
                rc[f1][f2] = rc[f2][f1] = lsqrt(ABS(temp));
        }
    }
}

/***********************************************************************
sortfeats(node) - sort features, means, and std's
                  for use with mixed features at a node
                  means and csd are for each of this nodes childrens
***********************************************************************/
sortfeats(node)
```

```
struct noderec *node;

{
        int i, j, k;
        short temp1;
        FVALUE temp2, temp3;;

for (i = 0; i < node->cdim - 1; ++i) {
            for (j = i + 1; j < node->cdim; ++j )
                if ( node->flist[i] > node->flist[j] ) {
                    temp1 = node->flist[i];
                    node->flist[i] = node->flist[j];
                    node->flist[j] = temp1;
                    for (k = 0; k < node->nbrnch; k++) {
                        temp2 = CHILD(node,k).cmean[i];
                        temp3 = CHILD(node,k).csd[i];
                        CHILD(node,k).cmean[i] = CHILD(node,k).cmean[j];
                        CHILD(node,k).csd[i] = CHILD(node,k).csd[j];
                        CHILD(node,k).cmean[j] = temp2;
                        CHILD(node,k).csd[j] = temp3;
                    }
                }
        }
}

/***********************************************************************
sortfeatmerit(node) - sort features by merit in topfeat
                     for use with subterminal nodes
***********************************************************************/
sortfeatmerit(node)
struct noderec *node;

{
        int i, j, k;
        short temp1;

for (i = 0; i < node->cdim - 1; ++i) {
            for (j = i + 1; j < node->cdim; ++j )
                if (fmerits[node->topfeat[i]] < fmerits[node->topfeat[j]]) {
                    temp1 = node->topfeat[i];
                    node->topfeat[i] = node->topfeat[j];
                    node->topfeat[j] = temp1;
                }
        }
}

/***********************************************************************
savebest(node)   saves node if best gain so far
***********************************************************************/
savebest(node)
struct noderec *node;
{
    int n;

if (node->gain > bestnode.root.gain) { bestnode.perr = perr;
       bestnode.root = *node;
       for (n = 0; n < node->nbrnch; n++)
          bestnode.leaf[n] = CHILD(node, n);
    }
}

/***********************************************************************
getbest(node)   - recover node with highest gain from bestnode.
***********************************************************************/
```

```
getbest(node)
struct noderec *node;
{
    int n;

perr = bestnode.perr;
    *node = bestnode.root;
    for (n = 0; n < node->nbrnch; n++)
        CHILD(node, n) = bestnode.leaf[n];
}

/************************************************************************
snkeep(node) - save the current node
************************************************************************/
snkeep(node)
struct noderec *node;
{
int n;
struct savenrec *temp;

sfreeptr->perr = perr;
    sfreeptr->root = *node;
    for (n = 0; n < node->nbrnch; n++)
        sfreeptr->leaf[n] = CHILD(node, n);
    /* transfer the node from the free list to the save list. */
    temp = savehead;
    savehead = sfreeptr;
    sfreeptr = sfreeptr->next;
    savehead->next = temp;

}

/************************************************************************
snrecover(node) - restore a node from the save list
************************************************************************/
snrecover(node)
struct noderec *node;
{
    int n;
    struct savenrec *link;

/* copy head of save list to current node */
    perr = savehead->perr;
    *node = savehead->root;
    for (n = 0; n < node->nbrnch; n++)
        CHILD(node, n) = savenead->leaf[n];

link = savehead;

/* find last node in save list */
    while (link->next != NULL)
        link = link->next;

/* move recovered node to end of save list */
    link->next = savehead;
    link = savehead;
    savehead = savehead->next;
    link->next = NULL;
    printf("Node restored.\n");
    dispnode(link);
}

/************************************************************************
snfree() - delete a node from the save list
************************************************************************/
snfree()
{
```

```
   struct savenrec *link;
   char yesno;
   short delete;

delete = FALSE;

/* point link to last node in save chain */
   link = savehead;
   while(link->next != NULL)
      link = link->next;

/* stay in loop until user either quits or deletes a node */
   while(delete == FALSE) {
      dispnode(savehead);
      printf("Delete this saved node (y/n/q) ?");
      yesno = cscan();
      if(yesno == 'q')
         break;
      if(yesno == 'y') {
         delete = TRUE;
         sndel();   /* return saved node to free list */
      }
      else {
         /* move saved node to end of save list & point to next node*/
         link->next = savehead;
         link = savehead;
         savehead = savehead->next;
         link->next = NULL;
      }
   }
}
/******************************************************************
 sndel() - move a save node from save list to free list
******************************************************************/
sndel()
{
   struct savenrec *link;

link = savehead;
   savehead = savehead->next;
   link->next = sfreeptr;
   sfreeptr = link;
   numsaved--;
}

/******************************************************************
 dispnode(hptr) - display info about this node
******************************************************************/
dispnode(hptr)
struct savenrec *nptr;
{
   printf("\ngain: %8.3f    node error:%8.4f\n", hptr->root.gain, hptr->root.error);
   printf("entropy: %8.2f    overlap: %8.2f   %s\n\n",hptr->root.entropy,hptr->root.overlap, fgroup[hptr->root.rotmode].fgname);
}
/******************************************************************
dispcorrel(node) - display r[][] correlation matrix
******************************************************************/
void dispcorrel(node)
struct noderec *node;
{
   register short f1, f2;
   short rf1;

printf("\n      ");
   for (f1 = 0; f1 ( node->cdim; f1++)
      printf("%6d", node->flist[f1]);
   printf("\n      ---------------------------------------\n");
   for (f1 = 0; f1 ( node->cdim; f1++) {
      rf1=node->flist[f1];
      printf("%3d | ", rf1);
      for (f2 = 0; f2 ( node->cdim; f2++)
         printf("%6.2f", rc[f1][f2]);
      printf("\n");
   }
}

/******************************************************************
addfeat(node, ignorec) - add next feature. Don't add feature
   if merit is less than GOODMERIT. If ignorec is set, correlation is
   ignored; otherwise cthresh is computed as the limit above which a feature
   is considered "correlated" and is a function of the number of
   members at this node.
   The function is cthresh = [ 1 - (nmem * CTHRESHM) / 100 ] + CTHRESHA.
   Example: if CTHRESHA = 0.05, the effects of CTHRESHM are:

nmem -->  1   2   3   4   5   6   7   8   9   10   40
CTHRESHM
```

```
      1              1.04 1.03 1.02 1.01 1.00 0.99 0.98 0.97 0.96 0.95  0.65
      2              1.03 1.01 0.99 0.97 0.95 0.93 0.91 0.89 0.87 0.85  0.25
      3              1.02 0.99 0.96 0.93 0.90
```

Under no conditions will a cthresh be allowed to fall below 0.20.

```
*********************************************************************/
void addfeat(node, ignorec)
struct noderec *node;
int ignorec;
{
    int fcount, x, f, fp, nextf;
    register float cthresh;
    short found;

/* ignore correlations if ignorec is set */
    if (ignorec) {
       cthresh=1.1;
    }
    else if (zthresh == -1.) {
       cthresh = (1.0 - (((float)CTHRESHM * node->nmemb) / 100.0)) + CTHRESHA;
       if (cthresh < 0.20)
          cthresh = 0.20;                         /* minimum permissible */
    }
    else
       cthresh = zthresh; /* set threshold */ fcount = fgroup[node->rotmode].fgtotal;

if (node->rotmode == 2) /* rots */
       fcount = fgroup[node->rotmode].fgcount; /* only rots, not mixture */ for (f = 0; f < fcount+1; f++) {
       /* see if this feature is already in flist , and to flist if not */
       for (fp = 0; fp < node->cdim; fp++)
          if (node->flist[fp] == sortfeat[f])
             break;
       if (fp == node->cdim) {              /* if not in list */
          if (fmerits[sortfeat[f]] < GOODMERIT)
             break;
          nextf = node->cdim++;
          node->flist[nextf] = sortfeat[f];
          /* see if new feature # flist[nextf] is highly correlated */
          gcorrelate(node, nextf);        /* results in rc[][] */
          for (fp = 0; fp < nextf; fp++)
             if (fabs(rc[fp][nextf]) > cthresh)
                break;                    /* if so, stop loop */
             /* see if feature has already been removed, and is not to be used */
             found = FALSE;
             if (dontndx)
                for (x = 0;  x < dontndx; x ++)
                    if (node->flist[nextf] == dontlist[x])
                       found = TRUE;
             if (!node->flist[nextf])    /* dont use feature 0 */
                found = TRUE;
          if ( (fp == nextf) && !found ) /* if not correlated */
             f = NFEAT+1;                 /* stop outer loop */
          else
             node->cdim--;                /* take away that feature */
       }
    }
    fixseeds(node);

if ( (fflag) && (nextf < MAXDIM && nextf > -1) ) /* we have feature names */
       printf("Adding a dimension: feature #%d (%s)   merit: %d\n",
              node->flist[nextf], featname[node->flist[nextf]],
              fmerits[node->flist[nextf]] );
    else if (nextf < MAXDIM && nextf > -1)
```

```
        printf("Adding a dimension: feature #%d  merit: %d\n",
                node->flist[nextf], fmerits[node->flist[nextf]] );
    else printf("No more good features left\n");
}

/************************************************************************
reduce(node)   - reduces nodal dimensionality
************************************************************************/
void reduce(node)
struct noderec *node;
{
    int rf, f, f1;

printf("Feature number to remove ? (-1 for all) ");
    rf = nscan();

if(rf == -1) {
        node->cdim = 0;
        dontndx = 0;
    }
    else {
        if ((rf < 0) || (rf > NFEAT))
            return;
        dontlist[dontndx++] = rf;
        for (f = 0; f < node->cdim; f++)
            if (node->flist[f] == rf) {
                /* collapse */
                for (f1 = f; f1 < node->cdim - 1; f1++)
                    node->flist[f1] = node->flist[f1 + 1];
                node->cdim--;
                break;
            }
    }
}

/************************************************************************
setrottype(node)
    This routine is called to change the rottype of a node.
************************************************************************/
void setrottype(node)
struct noderec *node;
{
    int newrottype, feat, ok, firsttype, i;
    do{
        printf("Enter new rot/cut mode \n");
        printf("(0=no rot, 1=rot, 2=first cut):");
        newrottype = nscan();
        if(newrottype > 2 || newrottype < 0){
            printf("cut failed: mode out of range\n");
            return;
        }
        ok = TRUE;
        if(newrottype == 2 || newrottype == 3){
            firsttype=classmap[node->memb[0]].cuttype;
            for (i = 1; i < node->nmemb; i++) {
                if(classmap[node->memb[i]].cuttype != firsttype){
                    ok = FALSE;
                    printf("cut failed: All members must be of same cuttype\n");
                    break;
                }
            }
        }
    }while(!ok);

node->rotmode = newrottype;
    node->cutclass = classmap[node->memb[0]].cuttype;
    fmerit(0, node->nmemb, node->memb, node->rotmode);
```

```
    node->cdim = 0;
    for (feat = 0; feat < STARTDIM; feat++) {
        addfeat(node, 0);
    }
    seeds(node, MIN(STARTNC, node->nmemb), randoption, 1);
}

/************************************************************************
int geticlst(node,c1,class) - returns set of classes that are in cluster c1
************************************************************************/ int geticlst(node,c1,class)
struct noderec *node;
short c1,class[];
{
    short m;

for (m = 0;m < CHILD(node, c1).nmemb;m++) {
        class[m] = CHILD(node, c1).memb[m];
    }
    return (m);
}

/************************************************************************
showscreen() - actual display onto the screen.
************************************************************************/ void showscreen()
{
    system("cat screen.file");
}

/************************************************************************
display(node, nmem, memb)   - displays overlap table for user to see.
************************************************************************/ void display(node)
struct noderec *node;
{
    FILE *fpout, *fopen();
    short c1, c2, n, clust, m;
    int cut;     /* possible cut node */
    short tie;   /* possible tied off node */
    char lviscl; /* last visible class */
    int nodenumber, lcuttype;
    register float cthresh;

fpout = fopen("screen.file", "w");
    nodenumber = ((((int)node-(int)(&tree[0])) / sizeof (struct noderec)));

fprintf(fpout, "\n---------------------------- Node Number %4d ----------------------------\n\n", nodenumber);
    fprintf(fpout, "%d members: ", node->nmemb);
    tie = cut = TRUE;
    lviscl = classmap[node->memb[0]].id;
    lcuttype = classmap[node->memb[0]].cuttype;

for (n = 0; n < node->nmemb; n++) {
        if (classmap[node->memb[n]].id != lviscl){
            tie = FALSE; /* visual classes are not all the same */
        }
        if ( classmap[node->memb[n]].cuttype == 0 ||
            classmap[node->memb[n]].cuttype != lcuttype ){
            cut = FALSE;
        }
        fprintf(fpout, "%c  ", classmap[node->memb[n]].id);
    }
    fprintf(fpout, "\n            ");
    for (n = 0; n < node->nmemb; n++)
        fprintf(fpout, "%2d ",node->memb[n]);
    fprintf(fpout, "\n%d dimensions (features)   %d nodes left. mode is %s\n",
        node->cdim, nfreecount, fgroup[node->rotmode].fgname);

fprintf(fpout, "\n%d clusters \n", node->nbrnch);
    for (clust = 0; clust < node->nbrnch; clust++) {
        fprintf(fpout, "  %2d ", clust);
        for (m = 0; m < CHILD(node, clust).nmemb; m++)
            fprintf(fpout, "%c ", classmap[CHILD(node, clust).memb[m]].id);
        fprintf(fpout, "\n");
    }
```

```
/* display overlap table */ fprintf(fpout, "\n                              perr tolerance: %5.5f", perr);
   if (zthresh != -1.0)
      fprintf(fpout, "\n                              correlation threshold: %5.3f (set)\n", zthresh);
   else {
      cthresh = (1.0 - (((float)CTHRESHM * node->nmemb) / 100.0)) + CTHRESHA;
      if (cthresh < 0.20)
         cthresh = 0.20;                /* minimum permissible */
      fprintf(fpout, "\n                              correlation threshold: %5.3f (calculated)\n",cthresh);
   } fprintf(fpout, "\n      ");
   for (c2 = 0; c2 < node->nbrnch; c2++)
      fprintf(fpout, "%3d", c2);
   fprintf(fpout, "\n      ---------------------------------------\n");
   for (c1 = 0; c1 < node->nbrnch; c1++) {
      fprintf(fpout, "%3d | ", c1);
      for (c2 = 0; c2 < node->nbrnch; c2++)
         fprintf(fpout, "%3d", ovlp[c1][c2]);
      fprintf(fpout, "\n");
   } fprintf(fpout, "\ngain:    %8.3f    node error:%8.4f    label: %c\n", node->gain, totalerr, node->label);
   /* added for file reading purposes until lable: gets an input: */
   /* fprintf(fpout, "\n"); */
   fprintf(fpout, "entropy: %8.2f    overlap: %8.2f    parent: %c\n\n", node->entropy, node->overlap, node->parent);

if (tie)
      fprintf(fpout, "\nPOSSIBLE TIE-OFF NODE\n\n");

if(cut){
      if (classmap[node->memb[0]].ncuts > node->rotmode){
         fprintf(fpout, "\nPOSSIBLE CUT");
         fprintf(fpout, " )\n\n");
      }
   }
   fclose(fpout);
   showscreen();
}

/**********************************************************************
interact(node)

This is the user interface for the iso-entropy tree builder (crbuild.c).
   This routine waits for a single character input from the user to
   identify the function desired.  The legal commands are:

+   Turn on debug

-   Turn off debug a   add a dimension to the node's universe.  automatically adds
       the next best UNCORRELATED feature that is not in use.

A   add a dimension to the node's universe.  automatically adds
       the next best feature that is not in use. Correlation is
            ignored.

b   recover next node from save list,
``` c   combine two clusters.  Asks the user for the two cluster
    numbers.

C   add a class to this node.

d   delete a cluster.  Asks the user which cluster.

D   delete a class number from this node e   change perr overlap tolerance f   add a dimension to the node's universe.  Asks the user which
    feature to add.

g   GOOD clustering - save this one in save list.

h   recover node with highest gain so far.

j   just display clusters only.  Redisplays last reclustering screen;
    reads from file "screen.file".

K   add a class to a cluster l   Do specified number of random reseedings and clusterings.
    Asks user for number of times to reseed & cluster.

m   display all feature merits above a user chosen cutoff

M   change rot/cut mode at this node n   perform another reclustering

N   change nstdevs for merit calc o   Reseeds the clustering with new seed points.
    The user will be asked if he wants random or deterministic reseeding.

p   display cluster centerpoints and extents q   recomputes feature merits according to metric chosen by
    operator. 0 = Fisher test, 1 = GAP test, 2 = current cluster
    test (merits according to current clustering), 3 = one cluster
    test (merits according to members at specific cluster), 4 = merits
    with respect to clustering entered by user.

Q   Quit working on this node and return to main menu.

r   reduce dimensionality of node's universe by one dimension,
    the program then asks the user which dimension to eliminate.

s   split a cluster.  Asks the user which cluster.

T   tie off this node as a terminal node.

u   delete a node from the save list.  Steps through the save
    list, asking the user if the node should be deleted.

U   forget the current best-gain node.

x   good; go-ahead; clustering is ok.

z   display feature correlation matrix.

Z   set correlation threshold

*************************************************************************/

```c
int interact(node)
struct noderec *node;
{
    char c, yesno;
    int nclust, quit, dimptr, loop, addfeature;
    int clust, saveclust, nodenumber, line;
    int j, fint,c1,membot,seedmode, nseeds, iternum, i, cutoff;
    float maxspread, curspread;
    int clu, cla, k, cc, tie;
    short n, m;
    char lviscl;
    struct noderec tempnode;
    struct noderec *parent;

/* allocate max no. of nodes now; free unused nodes when interact exits */
    nodenumber = ((((int)node-(int)(&tree[0])) / sizeof (struct noderec)));
    for (i = 0; i < MAXCLUST; i++){
        node->child[i] = nalloc();
        CHILD(node, i).parent = nodenumber;
    }
    if(debug)
        fprintf(stderr, "entering interact() nodenumber=%d\n", nodenumber);
    if(logflag)
        fprintf(fplog, "# entering interact() for node number %d\n", nodenumber);

dontndx = 0;
    bestnode.root.gain = 0.0;
```

```
numsaved = 0;
sfreeptr = &savenode[0];
savehead = NULL;
for(i = 0;i < MAXSAVE - 1;i++)
    savenode[i].next = &savenode[i+1];
savenode[MAXSAVE - 1].next = NULL;

/* fill sortfeat[] and fmerit[]. */
metric = 0;
fmerit(metric, node->nmemb, node->memb, node->rotmode);

node->cdim = 0;
for (i = 0; i < STARTDIM; i++) {
    addfeat(node, 0);
}
seeds(node, MIN(STARTNC, node->nmemb), randoption, 1);
isodata(node);
overlap(node);
display(node);
savebest(node);

quit = FALSE;
loop = TRUE;
do {
    printf("Command? ");
    c = cscan();
    switch(c) { case '+':
            printf("debug turned on.\n");
            debug = 1;
            break;

case '-':
            printf("debug turned off.\n");
            debug = 0;
            break;

case 'A':
            if (node->cdim < MAXDIM) {
                addfeat(node, 1); /* ignore correlations */
                break;
            }
            else {
                printf("Cant add a dimension - too many.\n");
                break;
            }
        case 'a':
            if (node->cdim < MAXDIM) {
                addfeat(none, 0); /* add uncorrelated feature */
                break;
            }
            else {
                printf("Cant add a dimension - too many.\n");
                break;
            } case 'b':             /* recover a clustering */
            if(numsaved != 0)
                snrecover(node);
            else
                printf("No node saved yet.\n");
            break;

case 'c':             /* combine two clusters */
            combine(node);
            break;
```

```
case 'C':                    /* add a class */
   printf("Enter new class number: ");
   cc = nscan();
   if(cc < 0 || cc >= MAXCLASS)
      printf("Bad class number\n ");
   else
      node->memb[node->nmemb++] = cc;
      fmerit(metric, node->nmemb, node->memb, node->rotmode);
   break;

case 'd':             .       /* delete a cluster */
   .delc(node);
   break;

case 'D':                    /* delete a class */
   printf("Enter class number to be deleted: ");
   cc = nscan();
   for (i = 0; i < node->nmemb; i++) {
      if( cc == node->memb[i])
         break;
   }
   if(i == node->nmemb){
      printf("class %d not present\n", cc);
   }
   else{
      node->nmemb--;
      /* move classes up to fill hole */
      for(j=i; j<node->nmemb; j++)
         node->memb[j] = node->memb[j+1];
      metric = 0;
      fmerit(metric, node->nmemb, node->memb, node->rotmode);
   }
   break;

case 'E':
case 'e':                    /* change perr */
   printf("New PERR tolerance ? ");
   perr = fscan();
   printf("New perr: %f\n", perr);
   break;

case 'F':                    /* display features ans merits */
   fprintf (stdout, "\nFeatures Used:\n\n");
   fprintf (stdout, "     # name              merit\n");
   fprintf (stdout, "-----------------------------\n");
   for (k = 0; k < node->cdim; k++)
      fprintf (stdout,"%2d) %3d %-16s (%3d) \n", k+1, node->flist[k],
               featname[node->flist[k]],fmerits[node->flist[k]]);
   break;

case 'f':                    /* add a specific feature */
   if (node->cdim < MAXDIM) {
      printf("Which feature number to add ? ");
      fint = nscan();
      if ((fint < 0) || (fint > NFEAT)){
         printf("feature number out of range.\n");
         break;
      }
      addfeature = TRUE;              /* assume ok to add feature */
      for (i = 0; i < node->cdim; i++){  /* insure unique feature */
         if (node->flist[i] == fint)
            addfeature = FALSE;
      }
      if (addfeature) {
         dimptr = node->cdim++;
         node->flist[dimptr] = fint;
         fixseeds(node);
         if (fflag)     /* we have feature names */
```

```c
               printf("Adding a dimension: feature #%d (%s)  merit: %d\n",
                  node->flist[dimptr], featname[node->flist[dimptr]],
                  fmerits[node->flist[dimptr]] );
            else
               printf("Adding a dimension: feature #%d merit: %d\n",
                  node->flist[dimptr], fmerits[node->flist[dimptr]] );
         }
          else
             printf("Not a Unique Feature Number\n");
         break;
      }
      else {
         printf("Cant add a dimension - too many.\n");
         break;
      } case 'g':            /* save this one */
      if(numsaved < MAXSAVE-1) {
         snkeep(node);    /* save the node */
         printf("None saved.\n");
         numsaved++;
      }
      else
         printf("Save stack full.\n");
      break;

case 'h':            /* recover best clustering */
      getbest(node);
      printf("node restored\n");
      break;

case 'j':
      showscreen();
      break;

case 'K':            /* add a class to a cluster */
      printf("Enter cluster number: ");
      clu = nscan();
      if(clu > node->nbrnch || clu <0){
         printf("No such cluster at this node\n");
      }
      else{
         printf("Enter new class number: ");
         cla = nscan();
         if(cla >= MAXCLASS || cla < 0){
            printf("class number out of range\n");
         }
         else {
            CHILD(node, clu).memb[CHILD(node, clu).nmemb++] = cla;
         }
      }
      break;

case 'l':            /* Lots of random reseeding & reclustering */
      printf("Number of times to reseed and cluster ?");
      iternum = nscan();
      for(i = 1;i <= iternum;i++) {
         seeds(node, MIN(node->nmemb, MAXCLUST - 1),1,1, 0); /*random*/
         isodata(node);
         overlap(node);
         display(node);
         savebest(node);
      }
      break;

case 'L':            /* list clusters with classes */
      fprintf(stdout, "\n%d clusters \n", node->nbrnch);
      for (clust = 0; clust < node->nbrnch; clust++) {
```

```c
            fprintf(stdout, "  %2d  ", clust);
            for (m = 0; m < CHILD(node, clust).nmemb; m++)
                fprintf(stdout, "%c (%d) ",classmap[CHILD(node, clust).memb[m]].id,
                                    CHILD(node, clust).memb[m]);
            fprintf(stdout, "\n");
        }
        break;

case 'm':                /* feature merits */
        line = 1;
        printf ("Above what cutoff? ");
        cutoff = nscan();
        printf("\n feature merits\n 1) ");
        for (i = 0; i < NFEAT && fmerits[sortfeat[i]] > cutoff; i++) {
            printf("%3d=%6d; ", sortfeat[i], fmerits[sortfeat[i]]);
            if ((i + 1) % 6 == 0)
                printf("\n%2d) ",++line);
        }
        printf("\n");
        break;

case 'M':                /* change rot/cut mode at this node */
        setrottype(node);

case 'n':
        printf("Another reclustering...\n");
        isodata(node);
        overlap(node);
        display(node);
        savebest(node);
        break;

case 'N':                /* change nstdevs */
        printf("New NSTDEVS ? ");
        nstdevs = fscan();
        printf("New nstdevs: %f\n", nstdevs);
        break;

case 'o':                /* start over - new cluster seeds */
        printf("Enter seeding mode.\n");
        printf("(0=deterministic, 1=random, 2=interactive) --");
        seedmode = nscan();
        if ( (seedmode <0) || (seedmode > 2) ) {
            printf ("Not an allowable seed mode\n");
            break;
        }
        printf("How many seeds? (0 means max)--");
        nseeds = nscan();
        if ( (nseeds <0) || (nseeds )= MAXCLUST) ) {
            printf ("Not a good number of seeds\n");
            break;
        }
        if (seedmode == 1)
            printf("Choosing new random seed points for clustering.\n");
        else if(seedmode == 0)
            printf("Choosing new seed points for clustering.\n");

if(nseeds)
            seeds(node, MIN(node->nmemb, nseeds), seedmode,0);
        else
            seeds(node, MIN(node->nmemb, MAXCLUST-1), seedmode,1);
        break;

case 'P':
        if(node != tree){ /* root node has no means, stddevs */
            fprintf (stdout, "\n\n\n Cluster Parameters:");
            parent = &tree[node->parent];
            fprintf (stdout, "\n             Feature | Means | Std Dev\n");
            fprintf (stdout, "-------------------------|-------|-------\n");
```

```c
            for (n = 0; n < node->cdim; n++){
                fprintf (stdout, "%15s %3d | %5d | %5d \n",
                featname[node->flist[n]],
                    node->flist[n], node->cmean[n], node->csd[n]);
            }
        }
        break;

case 'p':
        printf("Cluster centers and stdevs:\n");
        maxspread = -9999999.0;
        for (clust = 0; clust < node->nbrnch; clust++) {
            curspread = spread(node, clust);
            if (curspread > maxspread){
                maxspread = curspread;
                saveclust = clust;
            }
            printf("%2d ctr: ", clust);
            for (i = 0; i < node->cdim; i++)
                printf("%6d", CHILD(node, clust).cmean[i]);
            printf("\n    std: ");
            for (i = 0; i < node->cdim; i++)
                printf("%6d", CHILD(node, clust).csd[i]);
            printf("\n");
        }
        printf("maximum spread is %f for cluster %d\n", maxspread, saveclust);
        break;

case 'q':               /* recomputes feature merits */
        printf("Metric to use? (0=fisher, 1=gap, 2=current cluster, 3=1 cluster test, 4=interacti\
        metric = nscan();
        if ( (metric < 0) || (metric > 4) ) {
            printf ("Not an allowable metric\n");
            break;
        }
        if ((metric < 2)) {
            fmerit(metric, node->nmemb, node->memb ,node->rotmode);
            break;
        }
        if (metric == 2) {  /* order merits based on current clustering*/
            fmerit2(node);
            break;
        }
        if (metric == 3) {  /* 1 cluster test */
            printf("Which cluster ? ");
            c1 = nscan();
            if ((c1 < 0) || (c1 >= node->nbrnch) )
                break;
            membot = geticlst(node, c1, tempmem);
            fmerit (metric, membot, tempmem, node->rotmode);
            break;
        }
        if (metric == 4) {
            printf("members at this node are:");
            for (i = 0; i < node->nmemb; i++) {
                printf(" %d", node->memb[i]);
            }
            printf("\n");
            printf("How many clusters for merit computation?");
            nclust = nscan();
            nclust = MAX(2, nclust);
            if (nclust > MAXCLUST)
                printf ("too many, using MAXCLUST\n");
            tempnode.nbrnch = nclust = MIN(nclust, MAXCLUST);
            tempnode.rotmode = node->rotmode;
            for (i = 0; i < nclust; i++) {
                tempnode.child[i] = nalloc();
                k = 0;
                printf("Enter member class numbers for cluster %d (-1 to end):", i);
                while((cc=nscan()) != -1)
                    CHILD(&tempnode, i).memb[k++] = cc;
                    CHILD(&tempnode, i).nmemb = k;
            }
            fmerit2(&tempnode);
            for (i = 0; i < nclust; i++)
                nfree(tempnode.child[i]);
            break;
        }
        break;
```

```
case 'Q':                   /* back to main menu */
   node->nbrnch = 0;
   loop = FALSE;
   quit = TRUE;
   break;

case 'r':                   /* reduce dimensionality */
   reduce(node);
   break;

case 's':                   /* split a cluster */
   split(node);
   break;

case 'T':
   tie = TRUE;
   for (i = 0; i < node->nmemb; i++) {
   if (!i) lviscl = classmap[node->memb[i]].id;
      else
      if (classmap[node->memb[i]].id !=-lviscl)
         tie = FALSE; /* visual classes are not all the same */
   }
   if (!tie){
      printf ("Visids not identical. ");
      printf("Are you sure you want to tie this node off? (y/n)");
      yesno = cscan();
      if(yesno != 'y') {
         printf ("Node not tied off\n");
         break;
      }
      do{
      printf("Enter 1-character label (a-z) for this node: ");
      lviscl = cscan();
      node->label = lviscl;
      } while(lviscl < 'a' || lviscl > 'z');
   }
   else {
      node->terminal = node->memb[0];
   }
   quit = FALSE;
   loop = FALSE;
   node->nbrnch = 0;
   printf ("Node tied off\n");
   break;

case 'U':
   /* delete saved bestnode */
   bestnode.root.gain = 0.0;
   break;

case 'u':                   /* delete a saved node */
   if(numsaved > 0)
      snfree();
   else
      printf("No node saved yet.\n");
   break;

case 'x':                   /* done with this node */
   printf("Are you sure (y/n) ?");
   if((yesno = cscan()) == 'y') {
      dontndx = 0;
      for (k = 0; k < node->cdim; k++) /* copy feats to topfeat */
         node->topfeat[k] = node->flist[k];
      sortfeatmerit(node); /* sort features by merit */
      sortfeats(node);     /* sort features by number */
      printf("Clustering at this node is complete.\n");
      /* mark terminal children */
      for(clust = 0; clust < node->nbrnch; clust++){
         if(CHILD(node, clust).nmemb ==1)
            CHILD(node, clust).terminal = CHILD(node, clust).memb[0];
```

```
                }
                quit = FALSE;
                loop = FALSE;
            }
            break;

case 'z':               /* display feature correlation mat */
            for(i=0; i<node->cdim; i++)
                gcorrelate(node, i);
            dispcorrel(node);
            printf("\n");
            break;

case 'Z':       /* set correlation threshold */
            printf ("Correlation threshold (or -1 to unset)? ");
            zthresh = fscan();
            if ( (zthresh <-1.0) || (zthresh >.99) )
                printf ("Not a valid threshold\n");
            break;

case '?':               /* get screen help */
            printf ("\n                          CRBUILD COMMAND SUMMARY\n");
            printf ("\na - auto add uncorrelated feature");
            printf ("\nA - auto add feature (corr ignored)  |T - tie off node as terminal");
            printf ("\nb - recover node from saved list     |u - delete node from saved list");
            printf ("\nc - combine two clusters             |x - good cluster, proceed to next level
            printf ("\nC - add a class                      |z - display correlation matrix");
            printf ("\nd - delete a cluster                 |Z - set or unset correlation threshold"
            printf ("\nD - delete a class                   |? - display help messages");
            printf ("\ne - change perr overlap tolerance    |+ - turn debug on");
            printf ("\nf - interactively add feature        |- - turn debug off");
            printf ("\nF - display chosen features/merits");
            printf ("\ng - good cluster, add to saved list");
            printf ("\nh - recover none with highest gain");
            printf ("\nj - display clusters only");
            printf ("\nK - add class to specified cluster");
            printf ("\nl - reseed/recluster specified times");
            printf ("\nL - display clusters and classes");
            printf ("\nm - display feature merits above cutoff");
            printf ("\nM - change split/cut mode");
            printf ("\nn - recluster");
            printf ("\nN - change nstdevs");
            printf ("\no - reseed with new seed points");
            printf ("\np - display cluster centers and extents");
            printf ("\nP - display current cluster parameters");
            printf ("\nq - recompute merits with chosen metric");
            printf ("\nQ - quit this node, go back to main menu");
            printf ("\nr - remove feature interactively");
            printf ("\ns - split a cluster");
            printf ("\n\n\n");
            break;

default:
            break;
        }
    } while (loop == TRUE);

/* release unused children */
    for (i = node->nbrnch; i < MAXCLUST; i++)
        nfree(node->child[i]);

return(quit);
} static char sccsid[] = "@(#)crcluster.c 1.8 Copyright 1986 GTX Corp";
/*************************************************************************
*
* Character Recognition
*       Version 1.0
*
* (C) Copyright 1986 GTX Corporation
*
*************************************************************************/
```

```
/************************************************************************
crcluster.c - file containing isodata clustering routines and
              merit calculation routines for crbuild.c contains routines:

nearest()
                      assign()
                      log2()
                      overlap()
                      seeds()
                      isodata()
                      fixseeds()
                      split();
                      spread()
                      delc()
                      combine()
                      compar()
                      fmerit1()
                      fmerit()
                      fmerit2()

************************************************************************/ include "crdefs.h"
static char sccsid2[] = SCCSSTR;        /* from crdefs.h*/ define vclass(c,f)   (cl[c].mean[node->flist[f]])
define vclasssd(c,f) (cl[c].sd[node->flist[f]])
#define vclust(c,f)   (CHILD(node, c).cmean[f])
#define vclustsd(c,f) (CHILD(node, c).csd[f])

/* from crbuild.c: */
extern int debug, fmerits[NFEAT];
extern int sumsd[NFEAT], summean[NFEAT], sumsq[NFEAT];
extern struct fgrouptype fgroup[];
extern float perr, prior[MAXCLASS], totalerr, nstdevs, zthresh;
extern short sortfeat[NFEAT], r[NFEAT][NFEAT];
extern double lsqrt();
extern struct noderec tree[MAXNODE];
extern struct classrec cl[MAXCLASS];
extern void lerror();
extern int rootclasses;
extern int ovlp[MAXCLUST][MAXCLUST];

extern void exit(), qsort();
extern struct clmaptype classmap[];     /* from cridlib.c */
/************************************************************************
nearest(node, class, cluster, dist, metric)

this function determines which cluster center at the given node is
nearest the class center given. the number of the nearest cluster center
is returned in cluster and the int-type distance is returned in dist.
metric=0 means a City block distance is used. metric=1 means a
Bhattacharyya distance is used.
************************************************************************/ void nearest(node, class, cluster, dist, metric)
struct noderec *node;
short class;
int *cluster;
int *dist;
int metric;
{
    float vnearest, det, sclass, sclust, meanvar, bdist;
    short nnearest;
    register short f, clust;
    float diff;
    float dsumsq, dsum;
```

```
vnearest = MAXINT;
if (debug && FALSE) fprintf(stderr, "entering nearest\n");
if (metric == 0) {
   /* City block distance */
   for (clust = 0; clust < node->nbrnch; clust++) {
       dsum = 0.0;
       for (f = 0; f < node->cdim; f++) {
           dsum += abs((int)(vclust(clust, f) - vclass(class, f)));
       }
       if (dsum < vnearest) {
           vnearest = dsum;
           nnearest = clust;
       }
   }
   *cluster = nnearest;                  /* return nearest cluster number */
   *dist = 100*vnearest;
}
else {

/* Bhattacharyya distance */
   for (clust = 0; clust < node->nbrnch; clust++) {
       det=1.0;
       dsumsq=0.0;
       for (f = 0; f < node->cdim; f++) {
           diff = (vclust(clust, f) - vclass(class, f));
           if( (sclass = vclasssd(class,f)) ==0 )
             sclass=1;
           if( (sclust = vclustsd(clust,f)) ==0 )
             sclust=1;
           meanvar=(sclust*sclust + sclass*sclass)/2.0;
           det *= meanvar/(sclust*sclass);
           dsumsq += (diff*diff)/meanvar;
       }
/* took det out of the calculation to conform with crclassify */
/*     bdist = 8 * ( 0.125*dsumsq + 0.5*log(det)); */
       bdist = dsumsq;
       if (bdist < vnearest) {
           vnearest = bdist;
           nnearest = clust;
       }
   }
   *cluster = nnearest;                  /* return nearest cluster number */
   *dist = 100*lsqrt(vnearest);
   }
 }
}

/*******************************************************************
assign(node)

This routine assumes the cluster centers and .csd[] extents at this
node have been properly chosen by some prior process.  This routine
will assign each of the members in the member list pointed to by memb to
the nearest cluster center and update the following for the child node:

nmemb    = number of members in the child cluster,
     memb[]    = list of members in the child cluster,
       prob    = a priori prob for this child cluster (*10000)

Note that this routine only updates member lists, and not cluster extents.
*******************************************************************/ void assign(node)
struct noderec *node;
{
   int dist, class, cluster, member;
   float totprob;
```

```c
   if (debug && FALSE) fprintf(stderr, "entering assign\n");
   for (cluster = 0; cluster < node->nbrnch; cluster++) {
      CHILD(node, cluster).nmemb = 0;
      CHILD(node, cluster).prob = 0;
   }

/* find total prob at this node */
   totprob = 0.0;
   for (member = 0; member < node->nmemb; member++) {
      class = node->memb[member];
      totprob += prior[class];
   }

/* assign each member to nearest cluster center (no overlaps yet) */
   for (member = 0; member < node->nmemb; member++) {
      class = node->memb[member];
      nearest(node, class, &cluster, &dist,1);
      if (debug && FALSE) fprintf(stderr, "class %d nearest node = %d, dist = %d\n",
         class, cluster, dist);
      CHILD(node, cluster).memb[ CHILD(node, cluster).nmemb++ ] = class;
      CHILD(node, cluster).prob += (prior[class]/totprob)*10000;
   }
}

/***********************************************************************
log2(n)    - returns log base 2 of n
***********************************************************************/
double log2(n)
double n;
{
   return(log10(n) / log10(2.0));
}

/***********************************************************************
overlap(node, nmem, memb)

This routine assumes that clustering is done, and class assignments
have been made to the clusters in this node with overlaps. Also assumed is
that the cluster centers are now fixed, but that cluster standard deviations
have not yet been determined. The variance of each cluster is estimated by
taking the usual maximum likelihood estimate for the variance based on the
means of the constituent classes, then adding the average variance of the
classes.  This accounts for the fact that each class is not just a point,
but has its own variance.  Then, for overlaps, the routine will make another
pass through all the clusters at this node and determine which clusters
overlap other clusters.  If any two clusters overlap, then an examination
is made of the members of the second cluster to see if any particular
member classes overlap the first cluster.
Overlap determinations are made by comparing an estimate of the
Bayes' error between the distributions in question with a given tolerance.
The error estimate is made by using the Bhattacharyya coefficient as well
as class-conditional correlation information in the r[][] array.
   this routine generates the new information:

ovlp[c1][c2],              overlap matrix
                  CHILD(node, c).csd[f]      for cluster std deviations
                  CHILD(node, c).nmemb       for new overlap members,
                  CHILD(node, c).memb[m]     for new overlap members

***********************************************************************/ void overlap(node)
struct noderec *node;
{
   register int f, class, sc;
```

```
int sm, f2, mdiff, m2, realfeat, mdiff1;
short m, c, c1, c2, clust, feat, mptr, nclasses;
int fsd, fm, oldfm, newsd, n, k, nj, sc2;
int sumfv[NFEAT], ssq[NFEAT];
float totmemc, errest, det, dist, rho, meanvar, det1, dist1;
float a, sument, corr,rho1, meanvar1;
float corrfact;             /* correction factor for correlated features */
float pc,pc2;       /* a priori cluster probs */
if (debug && FALSE) fprintf(stderr, "entering overlap()\n");

for (c1 = 0; c1 < MAXCLUST; c1++)
   for (c2 = 0; c2 < MAXCLUST; c2++)
      ovlp[c1][c2] = 0;

/* determine cluster standard deviations */ for (clust = 0; clust < node->nbrnch; clust++) {
   for (f = 0; f < node->cdim; f++){
      ssq[f] = 0;
      sumfv[f] = 0;
   }
   nclasses = CHILD(node, clust).nmemb;
   for (m = 0; m < nclasses; m++) {
      class = CHILD(node, clust).memb[m];
      for (f = 0; f < node->cdim; f++) {
         feat = node->flist[f];     /* real feature number for cl[] */
         fm = cl[class].mean[feat];
         fsd = cl[class].sd[feat];
         /* modified variance formula to account for variances of classes.
            standard formula would be ssq[f] += (fm*fm)              */
         ssq[f] += (fm*fm + fsd*fsd);
         sumfv[f] += fm;
      }
   } for (f = 0; f < node->cdim; f++) {
      oldfm = sumfv[f]/(float)nclasses;
      if (nclasses > 0)   /* nonempty cluster */
         newsd = lsqrt((float)ssq[f]/nclasses - oldfm*oldfm);
      else   /* empty cluster */
         newsd = 0;
      CHILD(node, clust).csd[f] = newsd;
      CHILD(node, clust).cmean[f] = oldfm;
   }
}

/* compute correction factor to account for correlations among features.
   this factor is 1 if the features are uncorrelated, and 1/n if they
   are perfectly correlated */ corrfact = 0;
for (f = 0; f < node->cdim; f++) {
   for (f2 = 0; f2 < node->cdim; f2++) {
      if(f != f2){
         corr = r[node->flist[f]][node->flist[f2]]/100.0;
         corrfact += 1.0 - ABS(corr);
      }
   }
}
corrfact = (corrfact + node->cdim) / (node->cdim * node->cdim);

/* now find and record overlapped memberships using the following algorithm:
      for each cluster C:
         for each cluster C2 (C2 != C) that overlaps C:
            for each member M of C2:
               if M overlaps C:
                  add M to C and bump cnild[C].nmemb
```

```
*/
    totalerr=0;
    for (c = 0; c < node->nbrnch; c++)
        for (c2 = 0; c2 < node->nbrnch; c2++)
            if (c2 != c) {

/* compute the Bhattacharyya coefficient between c and c2 */
                det=1.0;
                dist=0.0;
                for (f = 0; f < node->cdim; f++) {
                    mdiff = CHILD(node, c).cmean[f] - CHILD(node, c2).cmean[f];
                    sc = CHILD(node, c).csd[f];
                    if(sc ==0)
                       sc=1;
                    sc2 = CHILD(node, c2).csd[f];
                    if(sc2 ==0)
                       sc2=1;
                    meanvar=(sc*sc + sc2*sc2)/2.0;
                    det *= meanvar/(sc*sc2);
                    dist += (mdiff*mdiff)/meanvar;
                }
                rho = exp( corrfact * (-0.125*dist - 0.5*log(det)));
                pc = CHILD(node, c).prob / 10000.0;
                pc2 = CHILD(node, c2).prob / 10000.0;
                errest = rho*lsqrt(pc *pc2)/(pc+pc2);
                if ( errest > perr ) {      /* clusters overlap */
                    for (m = 0; m < CHILD(node, c2).nmemb; m++) {
                        /* compute the Bhattacharyya coefficient between c and m
                           and between c2 and m.  Call the former rho and the
                           latter rho1                                       */
                        det=det1=1.0;
                        dist=dist1=0.0;
                        for (f = 0; f < node->cdim; f++) {
                            class = CHILD(node, c2).memb[m];
                            realfeat = node->flist[f];
                            mdiff = cl[class].mean[realfeat] - CHILD(node, c).cmean[f];
                            mdiff1 = cl[class].mean[realfeat] - CHILD(node, c2).cmean[f];
                            sm = cl[class].sd[realfeat];
                            if(sm ==0)
                               sm=1;
                            sc = CHILD(node, c).csd[f];
                            if(sc ==0)
                               sc=1;
                            sc2 = CHILD(node, c2).csd[f];
                            if(sc2 ==0)
                               sc2=1;
                            meanvar=(sc*sc + sm*sm)/2.0;
                            meanvar1=(sc2*sc2 + sm*sm)/2.0;
                            det *= meanvar/(sc*sm);
                            det1 *= meanvar1/(sc2*sm);
                            dist += (mdiff*mdiff)/meanvar;
                            dist1 += (mdiff1*mdiff1)/meanvar1;
                        }
                        rho = exp( corrfact * (-0.125*dist - 0.5*log(det)));
                        rho1 = exp( corrfact * (-0.125*dist1 - 0.5*log(det1)));
                        errest = rho / (rho1 + rho);
                        if ( errest > perr) { /* overlapped member */

/* is m already a member of c? */ for (m2 = 0; m2 < CHILD(node, c).nmemb; m2++)
                                if (class == CHILD(node, c).memb[m2])
                                    break;

/* if m is not a member of c, add it */ if (m2 == CHILD(node, c).nmemb) {
```

```
                        mptr = CHILD(node, c).nmemb++;
                        if (mptr ) >= MAXMEMB)
                            lerror("overlap: too many members of a single cluster");
                        CHILD(node, c).memb[mptr] = class;
                        ovlp[c][c2]++;
                        ovlp[c2][c]++;
                    }
                }
                else {
                    /* classes do not overlap */
                    totalerr += errest;
                }
            }
        }
        else {
            /* clusters do not overlap */
            totalerr += errest * CHILD(node, c2).nmemb ;
        }
    }
    totalerr /= node->nmemb;

/* final calculations of gain, etc. */ n = node->nmemb;         /* no. of members starting at this node */
    k = node->nbrnch;        /* no. of clusters */
    a = (float)n/k;          /* avg. cut of starting members per cluster */ sument = totmemc = 0.0;
    for (clust = 0; clust < k; clust++) {
        nj = CHILD(node, clust).nmemb;
        totmemc += nj;
        sument += (nj * log2((double)nj));
    } node->entropy = log2((double)n) - (sument / totmemc);
    node->overlap = totmemc - n;
    node->gain = node->entropy / (node->overlap + OFACTOR);
    node->error = totalerr;
/* create diagonal of overlap table */ for (clust = 0; clust < node->nbrnch; clust++)
        ovlp[clust][clust] = CHILD(node, clust).nmemb;
}

/***********************************************************************
seeds(node, nseeds, modeflag, splitflag)

This routine picks nseeds starting points then perform SITERS passes
of rough clustering.

If modeflag is one, nseeds class centers are randomly chosen as initial
cluster centers; if modeflag is zero, the first nseeds class centers are
chosen as cluster centers if modeflag is 2, seed selection is interactive. If
splitflag is non-zero, additional clusters are formed as needed during
rough clustering.
***********************************************************************/
void seeds(node, nseeds, modeflag, splitflag)
struct noderec *node;
int nseeds, modeflag, splitflag;
{
    int class, newclust, cluster, niters, d1, midpt, dist, member, dim;

if (debug) fprintf(stderr, "entering seeds()\n");

node->nbrnch = nseeds;
    if (node->nbrnch >= MAXCLUST)
        lerror("seeds: too many clusters at a node");
```

```
if (modeflag == 1) {

/* In this case, pick nseeds randomly selected starting centers. It is
       important to ensure that the same class is not selected as center of
       more than one cluster.  Initially, all cluster centers have
       equal extents (.csd[] )   */ for(cluster=0;cluster<nseeds;cluster++)
        /* -1 means no center chosen yet for this cluster */
        CHILD(node, cluster).memb[0] = -1;

cluster=0;
    while ( cluster < nseeds ) {
        /* pick a class at random */
        class = ((rand() & 0x7fff) / 32768.0) * (float) node->nmemb;
        cluster=0;
        do {
            if ( CHILD(node, cluster).memb[0] == -1 ) {

/* found a cluster with no mean yet assigned.
                   make its mean that of randomly selected class */

CHILD(node, cluster).memb[0] = class;
                for (dim = 0; dim < (node->cdim); dim++) {
                    CHILD(node, cluster).cmean[dim] =
                        cl[node->memb[class]].mean[node->flist[dim]];
                    CHILD(node, cluster).csd[dim] = 1;
                }
            }
            /* keep going until it is determined that this randomly selected
               class has given its mean to some cluster. When this loop
               exits it may mean that the current class mean has just been
               given to a cluster, or it may mean that it has just been
               discovered that the current class has previously given its mean
               to some cluster. */
        } while ( CHILD(node, cluster++).memb[0] != class );
    }
}
else if(modeflag == 0){

/* In this deterministic case, pick nseeds starting centers equal
   to the first nseeds members. Initially, all cluster centers
   have equal extents (.csd[] )   */ for (cluster = 0; cluster < node->nbrnch; cluster++)
        for (dim = 0; dim < (node->cdim); dim++) {
            CHILD(node, cluster).cmean[dim] = cl[node->memb[cluster]].mean[node->flist[dim]];
            CHILD(node, cluster).csd[dim] = 1;
        }

}
else{       /* interactive case (modeflag ==2) */
    printf("classes :");
    for (cluster = 0; cluster < node->nmemb; cluster++) {
        printf(" %3d", node->memb[cluster]);
    }
    printf("\nvisids  :");
    for (cluster = 0; cluster < node->nmemb; cluster++) {
        printf("   %c", classmap[node->memb[cluster]].id);
    }
    printf("\nindices :");
    for (cluster = 0; cluster < node->nmemb; cluster++) {
        printf(" %3d", cluster);
    }
    printf("\n");
    for (cluster = 0; cluster < node->nbrnch; cluster++){
        do{
            printf("enter class index for cluster %d:", cluster);
            class = nscan();
        }while(class <0 || class >= node->nmemb);
        for (dim = 0; dim < (node->cdim); dim++) {
```

```
            CHILD(node, cluster).cmean[dim] = cl[node->memb[class]].mean[node->flist[dim]]
            CHILD(node, cluster).csd[dim] = 1;
        }
    }
}
/* now do rough clustering for SITERS passes */ for (cluster = 0; cluster < node->nbrnch; cluster++) {
    CHILD(node, cluster).nmemb = 0;
}
    niters = 0;
    while (niters <= SITERS) {
        for (member = 0; member < node->nmemb; member++) {
            class = node->memb[member];

/* find nearest cluster center to center of class # class; function
            nearest returns cluster = nearest cluster number, and dist = city
            block distance to cluster center from class */ nearest(node, class, &cluster, &dist, 0);

/* If splitflag is set, see if split is needed; new cluster center
            is midway between class vector and nearest cluster center only if
            dist is not too great.  If dist is larger than SDTHRESH, we create
            a new cluster center if possible */ if ((dist )>= SDTHRESH) && (node->nbrnch < MAXCLUST) && splitflag) {
                newclust = node->nbrnch++;
                CHILD(node, newclust).nmemb=1;
                for (dim = 0; dim < node->cdim; dim++){
                    CHILD(node, newclust).cmean[dim] = cl[class].mean[node->flist[dim]];
                    CHILD(node, newclust).csd[dim] =1;
                }
            }
            else {              /* if no need to make new cluster center */
                for (dim = 0; dim < node->cdim; dim++) {
                    d1 = vclust(cluster, dim);             /* value of dimension #dim */
                    midpt = (d1*(CHILD(node, cluster).nmemb) + vclass(class, dim)) / (CHILD(node, cluster).nmemb + 1);
                    dist = abs(d1 - midpt);
                    CHILD(node, cluster).cmean[dim] = midpt;
                }
                CHILD(node, cluster).nmemb++ ;
            }
        }
        niters++;
    }
}

/*****************************************************************
isodata(node)

This routine assumes that node->nbrnch cluster centers have already been
roughly defined in the node record.  This routine applies up to ITERS passes
of isodata clustering to finely resolve the cluster centers.  The membership
lists for each cluster are set up. No overlaps are recorded in this routine.
    This routine stores new cluster centers (means) but not cluster
extents (stdevs).
    If, after assigning class memberships, a cluster is left without any
members, this routine will delete that empty cluster.

This routine requires the following for input:

node->nbrnch         no. of clusters
               ->cdim          no. of dimensions
               ->flist[f]      feature list
            CHILD(node, c).cmean[f]     cluster centers;

This routine updates:

node->iters            no. clusters iterations
                    .memb[m]         membership list
                    .cmean[f]        new cluster centers
                    .prob            probabilities
            CHILD(node, c).nmemb         no. members in cluster

*****************************************************************/
void isodata(node)
struct noderec *node;
{
    short class, c2, clust, f, m, feat;
    int niters, stable;
    int mfsum, newmeanf, newsdf, nclasses, ssq, fm, fsd;

if (debug) fprintf(stderr, "entering isodata()\n");

niters = 1;     /* init count of passes */
    stable = FALSE;
```

```
while ((!stable) && (niters <= ITERS)) {
    assign(node);              /* assign class memberships & probs */
    stable = TRUE;             /* until proven otherwise */
    for (clust = 0; clust < node->nbrnch; clust++) {
        nclasses = CHILD(node, clust).nmemb;
        if (nclasses > 0) {
            for (f = 0; f < node->cdim; f++) {
                feat = node->flist[f];    /* real feature number for cl[] */
                mfsum = 0;
                ssq=0;
                for (m = 0; m < nclasses; m++) {
                    class = CHILD(node, clust).memb[m];
                    fm = cl[class].mean[feat];
                    fsd = cl[class].sd[feat];
                    /* modified variance formula to account for variances of
                       classes. standard formula would be ssq[f] += (fm*fm) */
                    ssq += (fm*fm + fsd*fsd);
                    mfsum += fm;
                }
                newmeanf = (mfsum / nclasses);
                newsdf = lsqrt(ssq/(float)nclasses - newmeanf*newmeanf);
                if(debug && FALSE)fprintf(stderr, "clust %d feat %d gets sd %d; oldsd=%d\n", clust, f, newsdf, CHILD(node, clust).csd[f]);
                if (newmeanf != CHILD(node, clust).cmean[f])
                    stable = FALSE;
                if (newsdf != CHILD(node, clust).csd[f])
                    stable = FALSE;
                if(debug && FALSE)fprintf(stderr, "clust %d feat %d gets mean %d; oldm=%d\n", clust, f, newmeanf, CHILD(node, clust).cmean[f])
                CHILD(node, clust).cmean[f] = newmeanf;
                CHILD(node, clust).csd[f] = newsdf;
            }
        }
    }
    niters++;
}
assign(node);              /* final class assignments */

/* look for empty clusters */ for (c2 = 0; c2 < node->nbrnch; c2++)
    if (CHILD(node, c2).nmemb == 0) {
        /* delete cluster # c2 */
        for (clust = c2; clust < node->nbrnch-1; clust++)
            CHILD(node, clust) = CHILD(node, clust+1);
        node->nbrnch--;
        c2--;               /* so we won't skip new cluster at c2 */
    }
}

/*************************************************************************
fixseeds(node)
    This routine is called after adding a feature to a node and sets
    up a mean and standard deviation for that feature for each of the
    clusters at that node.
*************************************************************************/
void fixseeds(node)
struct noderec *node;
{
    float sum, sumsq, mean;
    int class, m, clust, lastfeat, nclasses, fm, fsd;

if (debug) fprintf(stderr, "entering fixseeds()\n");

for (clust = 0; clust < node->nbrnch; clust++) {
        nclasses = CHILD(node, clust).nmemb;
        sum=sumsq=0;
        for (m = 0; m < nclasses; m++) {
            class = CHILD(node, clust).memb[m];
            lastfeat = node->flist[node->cdim - 1];
            fm = cl[class].mean[lastfeat];
            fsd = cl[class].sd[lastfeat];
            sum += fm;
            /* sum of squares for modified variance formula */
            sumsq += (fm*fm + fsd*fsd);
        }
        CHILD(node, clust).cmean[node->cdim-1] = mean = sum / nclasses;
        CHILD(node, clust).csd[node->cdim-1] = lsqrt(sumsq/nclasses - mean*mean);
    }
}
```

```
/************************************************************************
split(node)
    Split a cluster.  New cluster center is a given number of standard
    deviations (SPLITND) to each side of the old center.
************************************************************************/
void split (node)
struct noderec *node;
{
    int fm, fsd, flo, fhi, nclasses, m, f, newcl, c;

if (node->nbrnch < MAXCLUST-1) {      /* room for two new clusters */
        printf("Split which cluster ? ");
        c = nscan();
        if ((c < 0) || (c >= node->nbrnch))
            return;

newcl = node->nbrnch++;
        CHILD(node, newcl).nmemb = CHILD(node, c).nmemb;
        nclasses = CHILD(node, c).nmemb;
        for (m = 0; m < nclasses; m++) {
            CHILD(node, newcl).memb[m] = CHILD(node, c).memb[m];
        }
        for (f = 0; f < node->cdim; f++) {
            fm = CHILD(node, c).cmean[f];
            fsd = CHILD(node, c).csd[f];
            if (fsd) {
                flo = fm - (SPLITND * fsd);
                fhi = fm + (SPLITND * fsd);
            }
            else {
                flo = fm - (SPLITND * fm);
                fhi = fm + (SPLITND * fm);
            }
            CHILD(node, newcl).cmean[f] = flo;
            CHILD(node, newcl).csd[f] = (fsd / 2) + 1;
            CHILD(node, c).cmean[f] = fhi;
            CHILD(node, c).csd[f] = (fsd / 2) + 1;
        }
    }
    else
        printf("Cant split - too many clusters.\n");
}

/************************************************************************
delc(node) - delete a cluster
************************************************************************/
void delc(node)
struct noderec *node;
{
    int c2, clust;

printf("Delete which cluster ? ");
    c2 = nscan();
    if ((c2 < 0) || (c2 >= node->nbrnch))
        return;
    for (clust = c2; clust < node->nbrnch - 1; clust++)
        CHILD(node, clust) = CHILD(node, clust+1);
    node->nbrnch--;
}

/************************************************************************
float spread(node, clust)

find the intra-cluster spread of a cluster (average Bhattacharyya
    distance between members)
```

```
/******************************************************************/
float spread (node, clust)
struct noderec *node;
int clust;
{
    float bdist, det, dsumsq, meanvar, sclass, sclass2, diff;
    int nclasses, class, class2, f, m, m2;
    bdist = 0.0;
    nclasses = CHILD(node, clust).nmemb;
    if(nclasses <= 1)
       return(0.0);
    for (m = 0; m < nclasses; m++) {
        class = CHILD(node, clust).memb[m];
        for (m2 = m+1; m2 < nclasses; m2++) {
            class2 = CHILD(node, clust).memb[m2];
            det=1.0;
            dsumsq=0.0;
            for (f = 0; f < node->cdim; f++) {
                diff = (vclass(class2, f) - vclass(class, f));
                if( (sclass = vclasssd(class,f)) ==0 )
                    sclass=1;
                if( (sclass2 = vclasssd(class2,f)) ==0 )
                    sclass2=1;
                meanvar=(sclass2*sclass2 + sclass*sclass)/2.0;
                det *= meanvar/(sclass2*sclass);
                dsumsq += (diff*diff)/meanvar;
            }
            bdist += 8 * ( 0.125*dsumsq + 0.5*log(det));
        }
    }
    return( bdist / ((nclasses * (nclasses-1) ) / 2.0) );
}

/************************************************************************
  combine(node) - combine two clusters
 ************************************************************************/ void combine(node)
struct noderec *node;
{
    int f, clust, c1, c2, c1f, c2f, c1sd, c2sd;

printf("Combine which two clusters ? ");
    c1 = nscan(); c2 = nscan();
    printf("Combine clusters %d and %d.\n", c1, c2);

if ((c1 < 0) || (c1 >= node->nbrnch) || (c2 < 0) || (c2 >= node->nbrnch))
       return;

/* change point of c1 to weighted average of c1 and c2 */ for (f = 0; f < node->cdim; f++) {
        c1f = CHILD(node, c1).cmean[f];
        c1sd = CHILD(node, c1).csd[f];
        c2f = CHILD(node, c2).cmean[f];
        c2sd = CHILD(node, c2).csd[f];
        CHILD(node, c1).cmean[f] =
            (c1f*CHILD(node, c1).nmemb + c2f*CHILD(node, c2).nmemb) /
            (CHILD(node, c1).nmemb + CHILD(node, c2).nmemb);
        CHILD(node, c1).csd[f] = (c1sd + c2sd) / 2;
    }
    CHILD(node, c1).prob += CHILD(node, c2).prob;

/* remove cluster c2 by shifting all clusters after c2 into hole created
   by removing c2. */
```

```c
        for (clust = c2; clust < node->nbrnch - 1; clust++) {
            CHILD(node, clust) = CHILD(node, clust+1);
        }
        node->nbrnch--;
}
/************************************************************************
compar(ptr1, ptr2) - used with the system routine qsort(3C) called from
    cluster to sort list of feature merits.  Arguments are two pointers
    to elements in sortfeat[] array.  Function returns <0, =0 or >0
    according to whether the first element is .lt., .eq., or .gt. the
    second.
************************************************************************/ int compar(ptr1, ptr2)
short *ptr1, *ptr2;
{
    if (fmerits[*ptr1] < fmerits[*ptr2])
        return(1);
    else
        if (fmerits[*ptr1] > fmerits[*ptr2])
            return(-1);
        else
            return(0);
}

/************************************************************************
  fmerit1(nmem, memb, rottype)

This routine evaluates all the features using the membership at this
node.  The nmem class members are listed in the array memb[].   The list
of features in order of merit is returned in global sortfeat[].  The
merits of the feature by feature number is returned in global fmerits[].
Several metrics may be used as feature evaluators.
    The merit test used here is based on projections of a single feaure
onto the FVMIN-FVMAX number line.  The merit is the number of units
of gap divided by the the number of gaps, normalized to the dynamic
range of the feature.  See the Character Recognition Logbook (R. Miller)
for more details.  This merit test takes into account the current setting
of nstdevs, and with high values for nstdevs, it is not unusual for
all features to come out with a merit of zero.

************************************************************************/ void fmerit1(nmem, memb, rottype)
int nmem, rottype;
short *memb;
{
    short f, clptr, class;
    FVALUE mean, sd, range, fline[FVMAX+1-FVMIN];
    int gaps, fstart, fend ,fnostart, fnoend, gapcnt, n, start, end;
    float merit;

/* range of features for this rottype */
    fstart = fgroup[0].fgbase;
    fend = fgroup[rottype].fgbase+fgroup[rottype].fgcount;

if (rottype == 3) {   /* dont allow mixing of cut1 and cut2 features */
        fnostart = fgroup[2].fgbase;
        fnoend = fgroup[2].fgbase+fgroup[2].fgcount;
    } for (f = fstart; f < fend; f++) {
        if ( (rottype == 3) && ( (f)=fnostart) && (f(=fnoend) ) )
            continue;
        for (n = 0; n <= FVMAX-FVMIN; n++)
            fline[n] = 0;                              /* init number line */
```

```
    for (clptr = 0; clptr < nmem; clptr++) {
        class = *(memb + clptr);
        mean = cl[class].mean[f];
        sd = cl[class].sd[f];
        start = MAX(FVMIN, (int)RND(mean - (nstdevs * sd)));
        end = MIN((int)FVMAX, (int)RND(mean + (nstdevs * sd)));
        for (n = start; n <= end; n++)
            fline[n-FVMIN]++;
    }
    for (start = 0; start <= FVMAX-FVMIN; start++)
        if (fline[start] != 0)
            break;                      /* here's where to start */
    for (end = FVMAX-FVMIN; end >= 0; end--)
        if (fline[end] != 0)
            break;                      /* here's where to end */

/* between points start and end, count the number of gaps, and the
   total number of units of gapped space on the number line */ if (start >= end)
        merit = 0;
    else {
        range = (end - start) + 1;
        gaps = 0;
        gapcnt = 0;
        for (n = start; n < end; n++)
            if (fline[n] == 0)
                gapcnt++;
            else
                if (fline[n + 1] == 0)
                    gaps++;
        if (gaps > 0)
            merit = (gapcnt / (float)range) / gaps;
        else
            merit = 0;
    }
    if (merit > 1e5)
        merit = 1e5;
    fmerits[f] = merit * 10000;
    }
}
/**********************************************************************
 fmerit(metric, nmem, memb, rottype)

This routine evaluates all the features using the membership at this
 node. The nmem class members are listed in the array memb[]. The list
 of features in order of merit is returned in global sortfeat[]. The
 merits of the feature by feature number is returned in global fmerits[].
 Several metrics may be used as feature evaluators.
 **********************************************************************/ void fmerit(metric, nmem, memb, rottype)
int metric, nmem, rottype;
short *memb;
{
    short f, clptr, class;
    int diff, fstart, fend, fnostart, fnoend;  /* fno* are range of non-allowed
                                                                features */
    double meritfactor;

if (debug) fprintf(stderr, "entering fmerit()\n");

/* merit scale factor */
    meritfactor = 100 * sqrt((double)rootclasses/(double)nmem);

for (f = 0; f < NFEAT; f++)
        fmerits[f] = 0;
```

```c
    /* range of features for this rottype */
    fstart = fgroup[0].fgbase;
    fend = fgroup[rottype].fgbase+fgroup[rottype].fgcount;

if (rottype == 3) {   /* dont allow mixing of cut1 and cut2 features */
        fnostart = fgroup[2].fgbase;
        fnoend = fgroup[2].fgbase+fgroup[2].fgcount;
    } for (f = fstart; f < fend; f++) {
        if ( (rottype == 3) && ( (f)=fnostart) && (f(=fnoend) ) )
            continue;
        sumsd[f] = 0;                      /* initialize summation */
        for (clptr = 0; clptr < nmem; clptr++) {
            class = *(memb + clptr);       /* an active class at this node */
            sumsd[f] += cl[class].sd[f];   /* sum up stdevs of this feature */
        }
        sumsd[f] = sumsd[f] / nmem;        /* mean of stdevs */
    }

/* next, find sd of means.  as follows:
        summean[f] = means of means,
        sumsq[f] = sqrt( sum( (mean[f] - summean[f]) ^ 2 ] / nmem )   */ for (f = fstart; f < fend; f++) {
        if ( (rottype == 3) && ( (f)=fnostart) && (f(=fnoend) ) )
            continue;
        summean[f] = 0;
        for (clptr = 0; clptr < nmem; clptr++) {
            class = *(memb + clptr);       /* a class at this node */
            summean[f] += cl[class].mean[f];
        }
        summean[f] = summean[f] / nmem;
    }
    for (f = fstart; f < fend; f++) {
        if ( (rottype == 3) && ( (f)=fnostart) && (f(=fnoend) ) )
            continue;
        sumsq[f] = 0;
        for (clptr = 0; clptr < nmem; clptr++) {
            class = *(memb + clptr);
            diff = cl[class].mean[f] - summean[f];
            sumsq[f] += (diff * diff);
        }
        sumsq[f] = lsqrt( (float)sumsq[f] / (float)nmem);

fmerits[f] = meritfactor * (((float)sumsq[f]) / (((float)sumsd[f]) + 1));
    }
    if (metric == 1)
        fmerit1(nmem, memb, rottype);

for (f = 0; f < NFEAT; f++)
        sortfeat[f] = f;
    qsort((char *)sortfeat, NFEAT, sizeof(*sortfeat), compar);

}

/**************************************************************************
fmerit2 - calculate improved merits based on current clustering
**************************************************************************/ void fmerit2(node)
struct noderec *node;
{
int fm,fsd,ssq,nm,diff,mfsum,nclusters;
int newmean[MAXCLUST][NFEAT];
    int newsd[MAXCLUST][NFEAT];
    int fstart, fend, fnostart, fnoend;
    short f,i,nclasses,m,class;
    double meritfactor;
```

```c
    meritfactor = 100 * sqrt((double)rootclasses/(double)node->nmemb);

for (f = 0;f < NFEAT; f++)
        fmerits[f] = 0;

/* for each feature, find new merit based on current clustering */ fstart = fgroup[node->rotmode].fgbase;
    fend = fgroup[node->rotmode].fgbase+fgroup[node->rotmode].fgcount;

if (node->rotmode == 3) {   /* dont allow mixing of cut1 and cut2 features */
        fnostart = fgroup[2].fgbase;
        fnoend = fgroup[2].fgbase+fgroup[2].fgcount;
    } for (f = fstart;f < fend; f++) {
        if ( (node->rotmode == 3) && ( (f)=fnostart) && (f(=fnoend) ) )
            continue;
        sumsd[f] = 0;
        summean[f] = 0;

/* calculate mean of means and new variance based on classes at
           each cluster, i.e. treat each cluster of classes as a single
           class.   */
        nclusters = node->nbrnch;
        for (i = 0; i < nclusters; i++) {
          ssq = 0;
          mfsum = 0;
          nclasses = CHILD(node,i).nmemb;
          for (m = 0; m < nclasses;m++) {
             class = CHILD(node,i).memb[m];
             fm = cl[class].mean[f];    /* mean of this class */
             fsd = cl[class].sd[f];     /* std. of this class */
             ssq += (fm*fm + fsd*fsd);  /* running total of variances */
             mfsum += fm;               /* running total of means */
          }
          newmean[i][f] = (mfsum/(int)nclasses);  /* mean of this cluster */
          nm = newmean[i][f];
          newsd[i][f] = lsqrt((float)ssq/(float)nclasses - nm*nm); /*new dev*/
          sumsd[f] += newsd[i][f];   /* sum new std. deviations of clusters */
          summean[f] += newmean[i][f]; /* sum means of each cluster */
        }
        sumsd[f] = sumsd[f]/nclusters; /* mean of deviations of clusters */
        summean[f] = summean[f]/nclusters; /* mean of means of clusters */
}

/* now calculate fischer merit */
    for (f=fstart;f < fend;f++) {
        if ( (node->rotmode == 3) && ( (f)=fnostart) && (f(=fnoend) ) )
            continue;
        sumsq[f] = 0;
        for(i=0;i < nclusters;i++) {
            diff = newmean[i][f] - summean[f];
            sumsq[f] += (diff*diff);
        }
        sumsq[f] = lsqrt((float)sumsq[f]/(float)nclusters);

fmerits[f] = meritfactor * (((float)sumsq[f]) / (((float)sumsd[f]) + 1));
    }

/* optional gap test here*/
    for(f=0;f < NFEAT;f++)
        sortfeat[f] = f;
    qsort((char *)sortfeat,NFEAT,sizeof(*sortfeat),compar);

}
```

```
/************************************************************************
 *
 * Character Recognition
 *      Version 1.0
 *
 * (C) Copyright 1986 GTX Corporation
 *
 ************************************************************************/ static char sccsid[] = "@(#)crclassify.c      2.90 Copyright 1986 GTX Corp";

/************************************************************************ crclassify.c
        subordinates:
                criclib.c

This file contains the routines to classify unknown character patterns.
The invocation is:

crclassify -i -a -r(conft) -m(ratthresh) -hrunnumber
                -j -d -t treefile [-p priorfile] -ntree -f where treefile is the iso-entropy tree build using the crbuild.c routines.
    conft is the rejection confidence threshold (oconf) (0 is default)

The input is taken from the standard input and is a concatenation
of ".f" feature files files of the following format:

- for each sample:
      - a line containing the sample number, class number, visual
        id, and id string of the sample in "%5d%4d %c %8s" format.
      - until all feature values are written out for this sample:
          - a line containing 10 feature values in the format %7d The feature values are limited to 10 per line so that the line lengths
do not exceed the capacity of the editor vi and other ASCII-oriented
utilities.

the optional "priorprohfile" is a file of prior probabilities for each
class.  Each line of this file has a class number and a
probability in %5d %f7.4 format. If this option is not given, but there
is a single file in the current directory with the .p suffix, that
file is used.

the -n option tells crclassify which subtree to use. 1=full (default),
2=numeric, 3=letters, 4=smallsize The -i option tells crclassify to interact with the user, when deciding
on tree routes.

The -a option reports all distances, as in the interaction mode, but takes
all default nodes (smallest distance). The out put report contains all the
normal classify output, plus the distance to each node information.
The -m option let you set the maxrat ratio, at which you will traverse other
paths.

The -h option updates the sample history records in /u/tec/crsampnist.

The -f option will pick the first call path as the 1st choice. The
default is the choice with the highest confidence.

The output is a classification report.

If DEVELOPMENT is turned off, this file provides no main program, but
supplies classification routines for use by crtarget.c
```

```c
#include "crdefs.h"
static char sccsid2[] = SCCSSTR;        /* from crdefs.h*/

/* on target, must fill at init time */
struct confstruct confstat[2][CONFTYPES];

int confdim[CONFTYPES] = {3, 5};

#ifdef STANDALONE
#define EXTERN
#else
#define EXTERN extern
endif int purge;      /* purge subtree & conf info */
short trueclass;
float maxd, maxrat, meand;
float confsave[CONFDIM];
int cutflag;                    /* 1 if current char has been cut */
int savecut;                    /* 1 if first char has been cut */
/* the following structure is for saving nodes to be expanded later */
struct {
    short node;  /* node number */
    short level; /* level of none in tree */
    float savedist;     /* distance from unknown to this node */
} visitlist[MAXNODE];           /* list of nodes to traverse */ ifdef DEVELOPMENT
/* for accumulating stats on how well subnodes do */
short subtest[4][MAXNODE];
endif int visitndx;                   /* index into visitlist */ float ratthresh;                /* visit list ratio threshhold */
ifdef DEVELOPMENT
struct fconfstruct{
    long prior;
    float mean[CONFDIM];
    float sd[CONFDIM];
};
struct fconfstruct fconfstat[2][CONFTYPES];
int nodecount0, nodesused;
int maxnode = -1;       /* highest node used */
int nfreecount;         /* no. of nodes on free list */
int nfreeptr = -1;      /* next free node */
int nodesused;          /* used to count nodes used in tree */
static trained[MAXCLASS];
static short tietab[26][MAXCLASS];
static char tieclass[MAXCLASS];
static char tiencde[26];
static int anyties;
int interact;                   /* true, if interaction is desired */
int report;                     /* all distance report */

FILE *fpscreen;                 /* get input from screen */
FILE *fphistold;                /* old history file (/u/tec/crsamphist)    */
FILE *fphistnew;                /* new history file (/u/tec/crsamphist.new) */
FVALUE features[NFEAT];
float prior[MAXCLASS];          /* prior probabilities */
#else
extern short scale();
extern FLOAT extract();
```

```
extern int cutfailflag;
endif long nfeatused;                    /* number of features used in tree */
short conft;                       /* oconf threshold */
EXTERN short debug;                /* nonzero for debug option on (-d) */
EXTERN short usetree;              /* use which subtree  (-n option)*/
extern void qsort();
extern void exit();
EXTERN struct noderec *node;
struct noderec *tadr;              /* adr of tree */
struct classrec *cadr;             /* adr of cl */
char *fadr;                        /* adr of featused */
extern struct clmaptype classmap[]; /* from cridlib.c */
short route[100];                  /* records tree search route */
short routendx;                    /* index into route[] */
short firstndx;                    /* index into route[], where first
                                   /* classification ends */
short badnode[MAXNODE];            /* compilation of wrong paths in tree */

/* the following structure keeps information on tne CURRENT path being
taken in the tree-- not cumulative, like route */
static struct {
   short node;
   short badcut;
   float dist1, dratio;
   } pathinfo[100];
int pathindex;

/* the following array contains information about the set of decisions
obtained by backtracking */ struct {
   short termnode;  /* term node of this path */
   short cl;        /* class of term node */
   short idc;       /* id of term node */
   short conf;      /* conf before subclassification */
   /* the following are 0 if there is no subclassification at this node */
   short subcl;     /* class after subclassification */
   short subid;     /* id after subclassification */
   short subconf;   /* conf after subclassification */ short badcut;    /* wrong cut (development) or cut failure (target) */
} choicelist[MAXCLASS];

int chindex;

/* the topchoice array contains all the choice candidates,
    sorted by confidence */
struct {
   short cl;        /* class */
   short idt;       /* id */
   short conf;      /* highest conf (before or after subclassification */
   short subpick;   /* 1=subterminal picked, 0=not sub pick */
} topchoice[MAXCLASS];

short rejoff;                      /* switch to turn rejection off */
char complete, confs;

#if (defined(SUN) && defined(STANDALONE))
int fdtree;                        /* file des. of tree file */
char tfile[40];
struct noderec tree[MAXNODE];
char featused[NFEAT+(NFEAT & 0x1)]; /* 1 = feature used; even size */
struct classrec cl[MAXCLASS];       /* class descriptor array */
char datestr[40];
long treesize;
char copystr[30];
```

```c
    short result[MAXTOTSAMP];
    short histflag; /* update history records */
    short fcallflag; /* pick first path choice as best answer */
    short runnum;   /* run number */
    short treeform;
    int nfeat;
#else
    extern long *stermadr, *sfactadr; /* ptrs to scaling info */
    extern long gettadr(); /* assembly routine to get addr of tree */
endif define FILENO 5 /* for use by IERROR */
define USEDIM 4 /* no. of feats to use for subclassification */
#define PERNODESUBF 5
        /* no. of feats to save per node for subclassification */
#define MAXSUBFEAT 40 /* max no of feat values to be saved in one path */

/* used as args to functions; tells if subtree classification took place */
#define SUBCLASS 1
#define NOSUBCLASS 0
int savefeat[MAXSUBFEAT]; /* used to save feat values in path */
int maxsaved;    /* TRUE if MAXSUBFEAT feat vals have been saved */
int nsaved;      /* number of feat vals that have been saved */
int createsubc;  /* TRUE means subclass data being collected */
int createconf;  /* TRUE means conf data being collected */
#ifdef DEVELOPMENT
int npruned;
float merit[MAXSUBFEAT];

/* struct to overlay noderec for temporary gathering of stats. size must not
exceed size of noderec */
struct substruct {
    short sbclass;
    short snvisclass;
    short sbparent;
    short sbcount;
    float sbsum[MAXSUBFEAT];
    float sbsumsq[MAXSUBFEAT];
};

/************************************************************************
 lerror(message) - local error handler
************************************************************************/ void lerror(msg)
char *msg;
{
    fprintf(STDERR, "\ncrclassify: %s\n", msg);
    exit(1);
} endif

/************************************************************************
 linit - local initialization of stuff and things
************************************************************************/ void linit()
{
    long maxc;
    int i;

maxc = MAXWX;
    if (MAXWY > maxc)
        maxc = MAXWY;
    rejoff = FALSE;
    ratthresh = 500.; /* default .5*/
```

```
#ifdef STANDALONE
    usetree = 0;  /* full tree is default */
#endif
ifdef DEVELOPMENT
    interact = FALSE;
    if(sizeof(struct noderec) ( sizeof(struct substruct))
        ierror("substruct record too large");
/* mark all nodes unused for later gathering onto free list */
    for (i = 0; i ( MAXNODE; i++)
            tree[i].nbrnch = -1;
endif ifdef STANDALONE
    conft = 0;
#endif
                    \
}

/*************************************************************************
  adrinit() - sets up pointers tadr, cadr, fadr, radr
*************************************************************************/ void adrinit()
{
#if (defined(SUN) && defined(STANDALONE))

/* under UNIX, pointers refer to arrays read in */
    tadr = &tree[0];
    cadr = &cl[0];
    fadr = &featused[0];

#else

/* otherwise pointers refer to external data. The format of the data
       is the same as the format of the tree file (see crbuild.c)
       followed by isterm[NFEAT] and isfactor[NFEAT].  */ register char *baseadr, *s, *d;
    char   *confadr;                    /* adr of confstat */
    char complete;
    long fsize, csize, nfeatl, treesize, confsize;
    short treeform, i;

baseadr = (char *)gettadr();
#ifdef DEBUG
    if(debug)
        fprintf(STDERR, "in adrinit, gettadr() returned %lx\n", (long)baseadr);
#endif
    complete = *baseadr;
    confs = *(baseadr +1);
    if(!complete)
        IERROR(11, 1);
    treeform = *(short *)(baseadr+2);
    if(treeform != TREEFORM)
        IERROR(12, 1);
    baseadr += (sizeof(confs) + sizeof(complete) + sizeof(treeform) + 70);
    nfeatl = *(long *)baseadr;
    if(nfeatl != NFEAT)
        IERROR(10, 1);
    treesize = *(long *)(baseadr+(long)sizeof(nfeatl));
    fsize = (long)(NFEAT+(NFEAT & 0x1));
    csize = (long)MAXCLASS *(long) sizeof(struct classrec);
    confsize = (long) sizeof(confstat);
    fadr = baseadr + (long)sizeof(nfeatl) + (long)sizeof(treesize);
    cadr = (struct classrec *) ((long)fadr + fsize);
    confadr = (char *)  ((long)cadr + csize);
    d = (char *)confstat;
    s = (char *)confadr;
```

```
    for(i=0; i<sizeof(confstat); i++)
        *d++ = *s++;
    tadr = (struct noderec *) ((long)confadr + confsize);
    stermadr = (long *) ((long)tadr + treesize);
    sfactadr = (long *) ((long)stermadr + NFEAT*sizeof(long));

#ifdef DEBUG
    if(debug){
        fprintf(STDERR, "        nfeat1=%ld\n", nfeat1 );
        fprintf(STDERR, "        treesize=%ld, fadr=%lx, cadr=%lx, tadr=%lx\n",
        treesize, (long)fadr, (long)cadr, (long)tadr);
        fprintf(STDERR, "        stermadr=%lx, sfactadr=%lx\n",
        (long)stermadr, (long)sfactadr);
    }
endif endif
} ifdef DEVELOPMENT

/**********************************************************************
opfile - decipher command line arguments, open file
**********************************************************************/ void opfile(argc, argv)
int argc;
char *argv[];
{
    short c;
    extern int optind;
    extern char* optarg;
    int class, n, priorflag=FALSE, tflag=FALSE;
    FILE *fppipe, *fpprior;
    char priorfile[40], dummy[80];
    float equal;

/* check command line arguments */ while ((c = getopt(argc, argv, "CPSo:t:n:m:h:jfciadp:r:X:")) != EOF)
        switch(c) { case 't':                   /* tree file */
            strncpy(tfile, optarg, 39);
            tflag=TRUE;
            break;

case 'd':                   /* -d turns debug option on */
            debug = TRUE;

break;

case 'S':                   /* -S collects subclass data */
            createsubc = TRUE;
            break;

case 'P':                   /* -P purges subterm info and confs */
            purge = TRUE;
            break;

case 'C':                   /* -C creates conf statistics */
            createconf = TRUE;
            break;

case 'f':                   /* -f picks first path char as top choice */
            fcallflag = TRUE;
            break;
```

```
        case 'j':                /* -j turns all rejection off */
           rejoff = TRUE;
           break;

case 'n':                /* -n selects nonalpha tree if present */
           usetree = (atoi(optarg));
           usetree--;
           break;

case 'm':                /* maxrat threshold */
           ratthresh = (atof(optarg));
           break;

case 'h':                /* run number for history update */
           runnum = (atoi(optarg));
           histflag = TRUE;
           break;

case 'r':                /* reject confidence */
           conft = (atoi(optarg));
           break;

case 'a':                /* all distances reported */
           report = TRUE;
           break;

case 'i':                /* turn interaction on */
           interact = TRUE;
           fpscreen = fopen ("/dev/tty","r"); /* open screen for input */
           break;

case 'p':                /* file of prior probs */
           strncpy(priorfile, optarg, 39);
           priorflag = TRUE;
           break;

default:
           lerror
              ("usage: -d -f -p -S -C -m -j -r(rej) -t tree -i [-p prile] (ffile");
           break;
        }

/* open ASCII file of prior probs; if none available, assume equal priors.
   at the present time, these priors are not used-- a priori probabilities
   are obtained from the p-file read in by crbuild and passed along in the
   tree file (node->child[cluster].prob) for each cluster. If it is believed
   that the a priori probs for a particular classification run are
   significantly different from those read in by crbuild, it will be
   necessary to recompute the values of node->child[cluster].prob based
   on the prior[] data read in below. NOTE: node->child[cluster].prob is
   a short and is 10000 times the probability. Probabilities are
   conditional probabilities of a cluster being chosen  given that we are
   at a particular node, i.e. the sum of probs at any node is 10000. */
/*
   if(!priorflag) {
      if(!system("test -r *.p")) {
         fppipe=popen("echo *.p", "r");
         fscanf(fppipe, "%13s", priorfile);
         if(fscanf(fppipe, "%13s", dummy) == 1)
            lerror("more than 1 .p file in current directory. specify one.");
         pclose(fppipe);
         priorflag=TRUE;
      }
   }
   if(priorflag){
      fpprior=fopen(priorfile, "r");
      if(fpprior != NULL){
```

```
        while((fscanf(fpprior, "%d", &class)!=EOF) &&
              (fscanf(fpprior, "%f", &nrior[class])!=EOF));
        printf("reading in prior probabilities from file %s\n", priorfile);
        fclose(fpprior);
    }
  }
  else {
*/
        printf("assuming equal prior class propabilities \n\n\n");

equal = 1.0/(MAXCLASS);
        for (n=0; n < MAXCLASS; n++) {
            prior[n]=equal;
        }

/* open tree file */ if(!tflag) {
        if(!system("test -r *.t")) {
            fppipe=popen("echo *.t", "r");
            fscanf(fppipe, "%13s", tfile);
            if(fscanf(fppipe, "%13s", dummy) == 1)
                lerror("more than 1 .t file in current directory. specify one.");
            pclose(fppipe);
            tflag=TRUE;
        }
}
if(tflag){
        fdtree = open(tfile, 0);
    if(fdtree != NULL){
        printf("reading tree from file %s\n", tfile);
        read (fdtree, &complete, sizeof(complete));
        if(!complete)
            fprintf(stderr, "WARNING: tree contains unexpanded nodes\n");
        read (fdtree, &confs, sizeof(confs));
        if(!confs)
            fprintf(stderr, "WARNING: tree contains no confidence info\n");
        read (fdtree, &treeform, sizeof(treeform));
        if(treeform != TREEFORM)
            fprintf(stderr, "WARNING: Inconsistent treeform code!\n");
        read (fdtree, datestr, sizeof(datestr));
        read (fdtree, copystr, sizeof(copystr));
        read(fdtree, &nfeat, sizeof(nfeat));
        read(fdtree, &treesize, sizeof(treesize));
        maxnode = ((treesize / sizeof (struct noderec)) - 1);
        if(treesize > (long)MAXNODE*sizeof(struct noderec) )
            lerror("tree size exceeds max");
        if(nfeat != NFEAT)
            lerror("inconsistent feature count in tree");

read (fdtree, featused, sizeof(featused));
        read (fdtree, cl, sizeof(cl));
        read (fdtree, confstat, sizeof(confstat));

if ((read(fdtree, tree, treesize) != treesize))
            lerror("cant read tree input file");
        if ( read(fdtree, &n, 1) != 0)
            lerror("improper tree input file");
        close(fdtree);
        nodesused = 0;
        nodecounter(&tree[0]);
        nodecount0=nodesused;

if(purge){
            confs = 0;
            subdel(&tree[0]);
        }
```

```
            /* clean out subnodes so we can rebuild them */
            if(createsubc)
                subdel(&tree[0]);
        }
    }
    else {
        lerror("no tfile found");
    }

}
/**********************************************************************
nfree(nodenumber) - return nodenumber to the free list
**********************************************************************/
nfree(nodenumber)
int nodenumber;

{
    int temp;

#ifdef DEBUG
    if (debug) fprintf(stderr, "nfree(%d) ", nodenumber);
endif temp = nfreeptr;
    nfreeptr = nodenumber;
    tree[nodenumber].cdim = temp;
    tree[nodenumber].nbrnch = -1;
    nfreecount++;
}

/**********************************************************************
nalloc() - get nodenumber from the free list
**********************************************************************/ nalloc()

{
    register struct noderec *node;
    register temp;

#ifdef DEBUG
    if (debug) fprintf(stderr, "nalloc(%d) ", nfreeptr);
endif temp = nfreeptr;
    if(nfreeptr == -1)
        lerror("free list exhausted");
    else
        nfreeptr = tree[nfreeptr].cdim;
    nfreecount--;
    maxnode = MAX(maxnode, temp);
    node = &tree[temp];
    node->nbrnch = node->label = node->parent = node->terminal = node->cdim =
    node->rotmode = node->splitflag = node->prob = node->nmemb =
    node->cutclass = 0;
    return(temp);
} endif
ifdef DEBUG

/**********************************************************************
nodecheck() - checks validity of this node - for debugging
**********************************************************************/ void nodecheck()
{
    if ((node < tadr ) || (node > tadr + MAXNODE))
        fprintf(STDERR, "nodecheck: node pointer out of range.");
```

```
}
endif ifdef DEVELOPMENT
/*************************************************************************
reportdist(fp,clust,dist) - report on distances at each node
            interact (-i option) reports to STDERR (screen) and STDOUT
            report (-a ontion) reports to stdout
**************************************************************************/
reportdist(fp,clust,dist)
FILE *fp;
short clust;
float dist;
{ int nodenumber;
    short n;

if (!clust)
                fprintf (fp,"\n\n");
            fprintf (fp,"    CLUSTER #%2d|  dist is %10.3f",clust+1,dist);
            nodenumber = ((((long)(&(CHILD(none,clust)))-(long)(&tree[0])) /
                      sizeof (struct noderec)));
            if (!CHILD(node,clust).terminal) { /* if not a terminal none */
                fprintf (fp,"| (node #%2d) ",nodenumber);
                for (n = 0; n < CHILD(node,clust).nmemb; n++)
                    fprintf (fp,"%c ",classmap[CHILD(node,clust).memb[n]].id);
                fprintf (fp,"\n");
            }
            else                              /* terminal node */
                fprintf (fp,"| (node '%c' #%d)\n",
                    classmap[CHILD(node,clust).memb[0]].id, nodenumber);

}
endif

/************************************************************************ getfeat()
    this routine returns a scaled feature value of feature number fn.
    In the DEVELOPMENT environment, this just accesses the array
    features[]. In a non-development environment, it actually
    calls functions to extract the feature value and scale it.
*************************************************************************/ short getfeat(orient, cuttype, fn)
short fn, orient, cuttype;
{
    short fval;

if(fn )= NRIFEAT + NRDFEAT)
        cutflag = 1;
#ifdef DEVELOPMENT
    fval = features[fn];
#else
    fval = scale(extract(fn, orient, cuttype), fn);
endif ifdef DEBUG
    if(debug)
        fprintf(STDERR, "about to return from getfeat fn=%d, fval=%d\n",
            fn, fval);
endif return(fval);
}
```

```
/****************************************************************** fsaver(orient, nodenumber)
    saves up to PERNODESUBF features at a node into the array savefeat for
    use by the subclassifier.

******************************************************************/ fsaver(orient, nodenumber)
short orient;
int nodenumber;
{
    int i;
    struct noderec *node;
    node = tadr + nodenumber;
    for(i=0; i<PERNODESUBF; i++){
        if(node->cdim > i){
            savefeat[nsaved++] = getfeat(orient,
                                    node->cutclass, node->topfeat[i]);
            if(nsaved == MAXSUBFEAT){
                maxsaved = 1;
                nsaved = 0;
            }
        }
        else {
            break;
        }
    }
}

/****************************************************************** float vdist(orient, node, child)
    takes as arguments: orient(0-23), equivalence class of cut, *node that
    points to node and *child that points to the child clust under question
    Returns floating distance to that child cluster. distance is Mahalanobis:

d(x,m) = (x-m)CINVERSE(x-m) / (number of features)

where x is the pattern vector, C is the inverse of the covariance matrix,
    and m is the cluster mean vector. The covariance matrix is assumed to
    be diagonal, i.e. the features are class-conditionally independent.

******************************************************************/ float vdist(orient, node, pchild)
struct noderec *node;
struct noderec *pchild;
short orient;
{
    float sumsq, dist;
    register short f;
    register long stddev;
    short fno;
    FVALUE fvalue;
    long diff;

sumsq = 0.0;
    for (f = 0; f < node->cdim; f++) {
        fno = node->flist[f];
        fvalue = getfeat(orient, node->cutclass, fno);

#ifdef DEBUG
        if(debug)
            fprintf(STDFRK, "  getting feature %d = %d,  m=%d, s=%d\n",
                            fno, fvalue, pchild->cmean[f], pchild->csd[f]);
#endif
```

```
        diff = fvalue - pchild->cmean[f];
        stddev = pchild->csd[f];
        if(stddev == 0)
            stddev = 1;
        sumsq += (1.0/((float)(stddev * stddev))) * (diff * diff);
    } dist = sumsq;
    dist = dist / node->cdim;  /* normalize by # of feats used at each node */
    return(dist);
}

/************************************************************************
passiclass()

this routine attempts to classify the unknown sample using the
    tree from crbuild.  Return value is the class number chosen.
    terminal node for this path is returned in termnode.
    passiclass() is called by dotreeclassify().

************************************************************************/ short passiclass(orient, termnode)
short orient, *termnode;
{
    float mind, nextd;          /* smallest and next smallest dist */
    short termnlc, clust, minci, n;
    int nclust, nodenumber;
    float d, dratio, rat;
    float dist[MAXDIM];
    struct noderec *childn;

#ifndef DEVELOPMENT
    cutfailflag = 0;
#endif
    cutflag = 0;

while(!(termnlc = node->terminal)) {
#ifdef DEBUG
        if (debug) nodecheck();
#endif
ifdef DEVELOPMENT
        if(node->label )= 'a' && node->label <= 'z')
            return(node->label + 200);
endif mind = nextd = MAXFLOAT;
        route[routendx++] = pathinfo[pathindex++].node =
                ((((long)(node)-(long)(tadr)) / sizeof (struct noderec)));
        for (clust = 0; clust < node->nbrnch; clust++) {
            childp = &(CHILD(node, clust));
            d = vdist(orient, node, childp);
            dist[clust] = d;

#ifdef DEBUG
            if (debug) fprintf(STDERR,"dist to cluster %d is %f\n",clust,d);
endif ifdef DEVELOPMENT
            if (report || interact)
                reportdist(STDERR,clust,d);

if (interact)
                reportdist (STDERR,clust,d);
endif if (d < nextd){
                if (d < mind) {
```

```
                nextd = mind;
                mind = d;
                mincl = clust;
            }
            else{
                nextd = d;
            }
        }
    }
ifdef DEVELOPMENT
    if (interact) {
        fprintf (STDERR,"\n minimum cluster=%d",mincl+1);
        fprintf (STDERR,"\n Which cluster next? (0=default) ",mincl+1);
        fscanf (fpscreen, "%d",&nclust);
        if (nclust  < 1 || nclust > node->nbrnch)
            nclust = 0;
        if (nclust) {
            mincl = nclust - 1;
            mind = dist[nclust - 1];
        }
    }
endif
    /* Compute ratio of dist/minimum dist to each cluster */ for (n = 0; n < node->nbrnch; n++) {
        if (n != mincl) {
            d = dist[n];
            if((d) > MAXFLOAT)
                rat = 0.0;
            else if(ABS(d) < 1e-10)
                rat = 1.0;
            else
                rat = mind/d;
#ifdef DEBUG
            if (debug)
                fprintf (STDERR, "\nrat=%7.2f",rat);
#endif
            if (rat > rattnresn) {
                visitlist[visitndx].level = pathindex;
                visitlist[visitndx].savedist = d;
                nodenumber =
                    ((((long)(&(CHILD(node,n)))-(long)(&tree[0])) /
                    sizeof (struct noderec)));
                visitlist[visitndx++].node = nodenumber;
            }
        }
    } node = childp = &(CHILD(node, mincl));              /* nearest child */ if((nextd) > MAXFLOAT)
        dratio = 0.0;
    else if(ABS(nextd) < 1e-10)
        dratio = 1.0;
    else
        dratio = mind/nextd;
    pathinfo[pathindex-1].dist1 = mind;
    pathinfo[pathindex-1].dratio = dratio;

/* record cut problems */ ifdef DEVELOPMENT
    pathinfo[pathindex-1].badcut = (node->rotmode > 1) &&
                            (classmap[trueclass].cuttype != node->cutclass);
#else
    pathinfo[pathindex-1].badcut = cutfailflag;
#endif
```

```c
    }
    *termnode = ((((long)((node))-(long)(&tree[0])) / sizeof (struct noderec)));
    maxd = maxrat = -MAXFLOAT;
    meand = 0;
    maxsaved = nsaved = 0;
    for(n=0; n<pathindex; n++){
       fsaver(orient, pathinfo[n].node);
       maxd = MAX(maxd, pathinfo[n].dist1);
       meand += pathinfo[n].dist1;
       if(pathinfo[n].dratio > maxrat)
           maxrat = patninfo[n].dratio;
    }
    confsave[0] = MIN(10.0, maxd);
    confsave[1] = MIN(10.0, maxrat);
    confsave[2] = MIN(10.0, meand/pathindex);
#ifdef DEVELOPMENT
    if(createconf)
        confgather(classmap[trueclass].id==classmap[termnlc].id, NOSUBCLASS);
#endif
    return(termnlc);
}

/*********************************************************************
doconf()
    computes the confidence for a classification

*********************************************************************/
doconf(subclassflag)
int subclassflag;
{
    int i, j, oconf;
    float var, mm, temp, d[2];

if(!confs)
       return 0;
    for(i=0; i<2; i++){
       d[i] = -confstat[i][subclassflag].prior/1e5;
       for(j=0; j<confdim[subclassflag]; j++){
           var = confstat[i][subclassflag].sd[j]/1e5;
           mm = confstat[i][subclassflag].mean[j]/1e5;
           temp = (confsave[j] - mm)/var;
           d[i] += 0.5*temp*temp;
       }
    }
    /* scale to fit 0-10000 */
    oconf = (((d[0] - d[1]) + 50.0)/62.0)*10000;
    if(oconf <0)
       oconf = 0;
    if(oconf > 10000)
       oconf = 10000;
    return(oconf);
}

/*********************************************************************
 sortchoices()
     sort choice candidates by confidence
*********************************************************************/
sortchoices()
{
  int i, j, newndx;
  short temp1, temp2, temp3, temp4;

/* first, copy choicelist into topchoice      */
  /* pick subterminal confidence, if it exists */
  /* dont use if badcut is TRUE                 */
```

```
    newndx = chindex;
    for (i = 0, j = 0; i < chindex; i++) {
        if (!choicelist[i].badcut) {      /* not a badcut */
            if (choicelist[i].subconf) {    /* use subterminal if it exists */
                topchoice[j].cl = choicelist[i].subcl;
                topchoice[j].conf = choicelist[i].subconf;
                topchoice[j].idt = choicelist[i].subid;
                topchoice[j].subpick = 1;
            }
            else {
                topchoice[j].cl = choicelist[i].cl;
                topchoice[j].conf = choicelist[i].conf;
                topchoice[j].idt = choicelist[i].idc;
                topchoice[j].subpick = 0;
            }
            j++;
        }
        else /* yes, badcut, dont consider */
            newndx--;

} chindex = newndx;

if (!chindex)   /* all choices were badcuts */
        return;

/* now sort the choices */ for (i = 0; i < chindex - 1; ++i) {
        for (j = i + 1; j < chindex; ++j )
            if (topchoice[i].conf < topchoice[j].conf) {
                temp1 = topchoice[i].conf;
                temp2 = topchoice[i].cl;
                temp3 = topchoice[i].idt;
                temp4 = topchoice[i].subpick;
                topchoice[i].conf= topchoice[j].conf;
                topchoice[i].cl = topchoice[j].cl;
                topchoice[i].idt = topchoice[j].idt;
                topchoice[i].subpick = topchoice[j].subpick;
                topchoice[j].conf = temp1;
                topchoice[j].cl = temp2;
                topchoice[j].idt = temp3;
                topchoice[j].subpick = temp4;
            }
    }

}

/************************************************************************
dosubclassify()
   performs subterminal classification, returns class no.
************************************************************************/ dosubclassify(termnode)
int termnode;
{
    int j, jj, i, nclasses, choose, usedim;
    float mind, nextd, d;
    float temp, mean, var, dratio;
    int choice;
    struct noderec *node;
```

```
    mind = nextd = 1e9;
    node = &tree[termnode];
    usedim = node->cdim;
    nclasses = node->nbrnch;
    if(nclasses == 0 || createsubc){
        return(0);
    }
    for(i=0; i<nclasses; i++){
        /* the following is in two steps to work around alcyon compiler bug */
        d = CHILD(node,i).prob/1024.0;
        d = -d;
        for(j=0; j<usedim; j++){
            jj = node->flist[j];
            var = CHILD(node, i).csd[jj]* CHILD(node, i).csd[j];
            mean = CHILD(node, i).cmean[j];
            temp = savefeat[jj] - mean;
            d += 0.5*temp*temp/var;
        }
        if (d < nextd){
            if (d < mind) {
                nextd = mind;
                mind = d;
                choose = i;
            }
            else{
                nextd = d;
            }
        }
    }
    confsave[3] = MIN(10.0, mind);
    if(ABS(nextd) < 1e-10)
        dratio = 1.0;
    else
        dratio = mind/nextd;
    confsave[4] = MIN(10.0, dratio);
    choice = CHILD(node, choose).terminal;
#ifdef DEVELOPMENT
    if(createconf)
        confgather(classmap[trueclass].id==classmap[choice].id, SUBCLASS);
#endif
    return(choice);
}.

/******************************************************************
checkcuts()

checks the last path taken to see whether the bad cut flag was set anywhere
    along the path.

****************************************************************** */
checkcuts()
{
    int i;

if (!cutflag) {
        return(FALSE);
    } for (i=0; i < pathindex; i++)
        if (pathinfo[i].badcut)
            return(TRUE);

return(FALSE);

}
```

```
/******************************************************************
dotreeclassify()

performs classification on the unknown sample and returns the results.

******************************************************************/ dotreeclassify(orient)
short orient;
{
    short nextnode, termnode;
    int choice, i;

node = &tadr[usetree+1];      /* init for root node of proper subtree*/
    visitndx = chindex = routendx = pathindex = 0;

choice = passiclass(orient, &termnode);
    choicelist[0].termnode = termnode;
    choicelist[0].cl = choice;
    choicelist[0].idc = classmap[choice].id;
    choicelist[0].conf = doconf(NOSUBCLASS);
    choice = dosubclassify(termnode);
    choicelist[0].subcl = choice;
    if(choice){
        choicelist[0].subid = classmap[choice].id;
        choicelist[0].subconf = doconf(SUBCLASS);
    }
    else {
        choicelist[0].subid = choicelist[0].subconf = 0;
    } choicelist[0].badcut = checkcuts();

ifdef DEVELOPMENT
    if(createsubc && !choicelist[0].badcut)
        addtosub(trueclass, termnode, maxsaved?MAXSUBFEAT:nsaved);
#endif
    chindex++;

firstndx = routendx;      /* save first route */
    while (visitndx) {
        nextnode = visitlist[--visitndx].node;
        pathindex = visitlist[visitndx].level;
        pathinfo[pathindex-1].dist1 = visitlist[visitndx].savedist;
        node = tadr + nextnode;
        choice = passiclass (orient, &termnode);
        choicelist[chindex].termnode = termnode;
        choicelist[chindex].cl = choice;
        choicelist[chindex].idc = classmap[choice].id;
        choicelist[chindex].conf = doconf(NOSUBCLASS);
        choice = dosubclassify(termnode);
        choicelist[chindex].subcl = choice;
        if(choice){
            choicelist[chindex].subid = classmap[choice].id;
            choicelist[chindex].subconf = doconf(SUBCLASS);
        }
        else {
            choicelist[chindex].subid = choicelist[chindex].subconf = 0;
        } choicelist[chindex].badcut = checkcuts();

chindex++;

}
    sortchoices();
```

```c
#ifdef DEBUG
    if (debug) {
        fprintf (STDERR,"\nchindex=%d\n",chindex);
        fprintf (STDERR,"choicelist");
        fprintf (STDERR,"\ncl, id, conf, subcl, subid, subconf, badcut\n");
        for (i = 0; i < chindex; i++)
            fprintf (STDERR,"%d %d %d %d %d %o %d\n",choicelist[i].cl,
                                                    choicelist[i].idc,
                                                    choicelist[i].conf,
                                                    choicelist[i].subcl,
                                                    choicelist[i].subid,
                                                    choicelist[i].subconf,
                                                    choicelist[i].badcut);

fprintf (STDERR,"topchoices\n");
        for (i = 0; i < chindex; i++)
            fprintf (STDERR,"%d %d %d %d\n",topchoice[i].cl,
                                            topchoice[i].idt,
                                            topchoice[i].conf,
                                            topchoice[i].subpick);

}
debug=0;
endif return;
} ifndef DEVELOPMENT
/***********************************************************************
 doclassify()
    non-development mode interface to dotreeclassify, dosubclassify, doconf.
    in development mode, main calls those routines individually.
***********************************************************************/ doclassify(orient, oconf, reject, class,
                   oconf2, class2, id2,    /* second choice */
                   oconf3, class3, id3 )   /* third choice */ int orient, *oconf, *reject, *oconf2, *oconf3;
short *class, *class2, *class3, *id2, *id3;
{
    int i, cid;
    for(i=0; i<CONFDIM; i++)
        confsave[i] = 0;
    *reject = *oconf = maxsaved = nsaved = *oconf2 = 0;
    dotreeclassify(orient);

cid = topchoice[0].idt;
    *class = topchoice[0].cl;
    *oconf = topchoice[0].conf;
    *id2 = topchoice[1].idt;
    *class2 = topchoice[1].cl;
    *oconf2 = topchoice[1].conf;
    *id3 = topchoice[2].idt;
    *class3 = topchoice[2].cl;
    *oconf3 = topchoice[2].conf;

if (!chindex) {        /* all choices had bad cuts */
        cid = choicelist[0].idc;
        *class = choicelist[0].cl;
        *oconf = choicelist[0].conf;
    } if(*oconf < conft && !rejoff || !chindex)
        *reject = TRUE;
    return(cid);
}
endif
```

```c
#ifdef DEVELOPMENT

/************************************************************************
 compar()
        comparison routine used by qsort for merit calc
*************************************************************************/ int compar(ptr1, ptr2)
int *ptr1, *ptr2;
{
    if (merit[*ptr1] < merit[*ptr2])
        return(1);
    else
        if (merit[*ptr1] > merit[*ptr2])
            return(-1);
        else
            return(0);
}

/************************************************************************
 substat1()
    adds subterminal nodes to a terminal node and computes the means
    and standard deviations for these new nodes.
*************************************************************************/ substat1(node)
struct noderec *node;
{
    int dim, i, j, nclasses=0, nsamp=0;
    struct substruct t, *pt;
    float temp;
    float mm, msd, sdm;
    int sj, ii, childnum;
    int nodenumber, usedim, sortlist[MAXSUBFEAT], holdlist[MAXSUBFEAT];

dim = node->cdim;
    usedim = MIN(USEDIM, dim);
    nodenumber = ((((long)(node)-(long)(&tree[0])) / sizeof (struct noderec)));

for(i=0; i<node->nbrnch; i++){
        pt = (struct substruct *)(&CHILD(node, i));
        if(pt->sbcount >= MINSBCNT){
            nclasses++;
            nsamp += pt->sbcount;
        }
    }

/* if less than two non-trivial classes, forget it */ if(nclasses <2){
        for(i=0; i<node->nbrnch; i++){
            childnum = node->child[i];
            nfree(childnum);
        }
        node->nbrnch = 0;
        return;
    }

/* compute means and sd's of subterminal features for each class */ for(i=0; i<node->nbrnch; i++){
        pt = (struct substruct *)(&CHILD(node, i));
        if(pt->sbcount >= MINSBCNT){
            for(j=0; j<dim; j++){
                pt->sbsum[j] /= pt->sbcount;
                temp = pt->sbsumsq[j]/pt->sbcount - pt->sbsum[j]*pt->sbsum[j];
                pt->sbsumsq[j] = sqrt(ABS(temp));
```

```
            if(pt->sbsumsq[j] < 1.001)
                pt->sbsumsq[j] = 1.001;
        }
    }
}

/* compute merits */ for(j=0; j<dim; j++){
    msd = mm = sdm = 0;
    for(i=0; i<node->nbrnch; i++){
        pt = (struct substruct *)(&CHILD(node, i));
        if(pt->sbcount < MINSBCNT)
            continue;
        msd += pt->sbsumsq[j];
        mm += pt->sbsum[j];
        sdm += pt->sbsum[j]*pt->sbsum[j];
    }
    msd /= nclasses;
    mm /= nclasses;
    sdm = sdm/nclasses - mm*mm;
    sdm = sqrt(ABS(sdm));
    merit[j] = sdm/msd;
}
for(j=0; j<dim; j++){
    sortlist[j] = j;
} qsort((char *)sortlist, dim, sizeof(*sortlist), compar);

ifdef DEBUG
    if(debug){
        printf("usedim=%d, node=%d", usedim, nodenumber);
        printf("merits ");
        for(j=0; j<dim; j++)
            printf(" %f", merit[sortlist[j]]);
        printf("\n");
    }
endif /* remove redundant entries in sortlist. for now, assume that if two merits
       are equal, they represent the same feature */
    for(j=0; j<dim; j++){
        holdlist[j] = sortlist[j];
    }
    sj = 0;
    for(j=1; j<dim; j++){
        if((merit[holdlist[j]] != merit[sortlist[sj]])){
            sortlist[++sj] = holdlist[j];
        }
    }
    usedim = MIN(usedim, sj+1);

node->cdim = usedim;
    for(j=0; j<usedim; j++){
        node->flist[j] = sortlist[j];
    }

/* put information into subterminal nodes */ ii=0;
    for(i=0; i<node->nbrnch; i++){
        t = *(struct substruct *)(&CHILD(node, i));
        childnum = node->child[i];
        if(t.sbcount >= MINSBCNT){
            tree[childnum].nbrnch = 0;
            tree[childnum].terminal = t.sbclass;
            tree[childnum].rotmode = -1;
```

```
            tree[childnum].memb[0] = t.sbclass;
            tree[childnum].nmemb = 1;
            tree[childnum].parent = t.sbparent;
            tree[childnum].prob = 1024*log((float)t.sncount/nsamp);
            node->child[ii++] = childnum;
            for(j=0; j<usedim; j++){
               tree[childnum].cmean[j] = t.sbsum[sortlist[j]];
               tree[childnum].csd[j] = t.snsumsq[sortlist[j]];
            }
         }
         else{
            nfree(childnum);
         }
      }
      node->nbrnch = nclasses;
#ifdef DEBUG
      if(debug){
         printf("node=%d dim=%d nbrnch=%d cdim=%d sort=%d %d %d %d\n",
                 nodenumber, dim, node->nbrnch, node->cdim, sortlist[0],
                 sortlist[1], sortlist[2], sortlist[3]);
         for(i=0; i<node->nbrnch; i++){
            printf("term=%d prob=%d parent=%d\n",
                CHILD(node,i).terminal, CHILD(node,i).prob, CHILD(node,i).parent);
            for(j=0; j<node->cdim; j++)
               printf("%d ", CHILD(node, i).cmean[j]);
            printf("\n");
            for(j=0; j<usedim; j++)
               printf("%d ", CHILD(node, i).csd[j]);
            printf("\n");
         }
         printf("\n");
      }
endif
}

/**************************************************************************
 subdel()
    recursively walks tree, deleting subterminal nodes
**************************************************************************/ subdel(node)
struct noderec *node;
{
   int i, nchild;

if(node->terminal){
      for(i=0; i<node->nbrnch; i++){
         nchild = ((((long)(&CHILD(node, i))-(long)(&tree[0])) /
               sizeof (struct noderec)));
         nfree(nchild);
      }
      node->nbrnch = node->cdim = 0;
   }
   else{
      for(i=0; i<node->nbrnch; i++){
         subdel(&CHILD(node, i));
      }
   }
}

/**************************************************************************
 confgather()
    accumulates conf statistics
**************************************************************************/ confgather(correct, subclassflag)
int subclassflag, correct;
{
```

```
    int i;
    fconfstat[correct][subclassflag].prior++;
    for(i=0; i<CONFDIM; i++){
        fconfstat[correct][subclassflag].mean[i] += confsave[i];
        fconfstat[correct][subclassflag].sd[i] += confsave[i]*confsave[i];
    }
}
/*************************************************************************
 prunesubs()
    recursively walks tree, pruning subterminal nodes that do more harm than
    good.
 *************************************************************************/ prunesubs(node)
struct noderec *node;
{
    int i, nchild, nodenumber;

nodenumber = ((((long)(node)-(long)(&tree[0])) / sizeof (struct noderec)));
    if(node->terminal && subtest[1][nodenumber] < subtest[2][nodenumber]){
        for(i=0; i<node->nbrnch; i++){
            npruned++;
            nchild = ((((long)(&CHILD(node, i))-(long)(&tree[0])) /
                sizeof (struct noderec)));
            nfree(nchild);
        }
        node->nbrnch = node->cdim = 0;
    }
    else{
        for(i=0; i<node->nbrnch; i++)
            prunesubs(&CHILD(node, i));
    }
}
/*************************************************************************
 confmake()
    finishes conf computation
 *************************************************************************/ confmake()
{
    int i, j, k, count, sumcount;
    float m, s, p, det;

confs = TRUE;
    for(j=0; j<2; j++){
        for(k=0; k<CONFTYPES; k++){
            det = 1;
            count = fconfstat[j][k].prior;
            if(count == 0)
                count = 1;
            sumcount = (fconfstat[0][k].prior + fconfstat[1][k].prior);
            if(sumcount)
                p = (float)count / sumcount;
            else
                p = 1;
            for(i=0; i<CONFDIM; i++){
                m = fconfstat[j][k].mean[i] / count;
                s = fconfstat[j][k].sd[i];
                s = s/count - m*m;
                s = sqrt(ABS(s));
                det *= s;
                confstat[j][k].mean[i] = m*1e5;
                confstat[j][k].sd[i]   = s*1e5;
                if(confstat[j][k].sd[i] == 0)
                    confstat[j][k].sd[i] = 1;
            }
            if(det <1e-7)
                det = 1e-7;
```

```
            confstat[j][k].prior = (log(p) - log(det) )*1e5;
        }
    }
    prunesubs(&tree[0]);
}
/************************************************************************
 substat()
    recursively walks tree, looking for terminal nodes, calls substat1 for each
 ************************************************************************/ substat(node)
struct noderec *node;
{
    int i;

if(node->terminal)
        substat1(node);
    else
        for(i=0; i<node->nbrnch; i++)
            substat(&CHILD(node, i));
}
/************************************************************************
 addtosub()
    called for each sample, after classification, to accumulate
    statistics(sum, sum of squares, count) for each terminal node.
    statistics are stored by allocating subterminal nodes and
    overlaying each noderec with a more appropriate struct substruct.
    when final processing takes place in substat1, nodes are converted
    back to noderec format.
 ************************************************************************/ addtosub(class, termnode, nsaved)
int class, termnode, nsaved;
{
    int id, i, child, j;
    id = classmap[class].id;
#ifdef DEBUG
    if(debug){
        printf("in addtosub: id=%c, termnode=%d, nsaved=%d nbrnch=%d",
                id, termnode, nsaved, tree[termnode].nbrnch);
        for(i=0; i<nsaved; i++){
            printf(" %d ", savefeat[i]);
        }
        printf("\n");
    }
endif /* find subnode for this vis class */ for(i=0; i<tree[termnode].nbrnch; i++){
        if(id == ((struct substruct *)&CHILD(&tree[termnode], i))->sbvisclass){
            child = tree[termnode].child[i];
            break;
        }
    }
    /* create a new subnode if possible */ if(i == tree[termnode].nbrnch){
        if(tree[termnode].nbrnch == MAXCLUST)
            return;
        tree[termnode].child[tree[termnode].nbrnch++] = child = nalloc();
        tree[termnode].cdim = nsaved;
        ((struct substruct *)(&tree[child]))->sbvisclass = id;
        ((struct substruct *)(&tree[child]))->sbclass = class;
        ((struct substruct *)(&tree[child]))->sbparent = termnode;
        ((struct substruct *)(&tree[child]))->sbcount = 0;
        for(j=0; j<MAXSUBFEAT; j++){
            ((struct substruct *)(&tree[child]))->sbsum[j] = 0;
```

```
        ((struct substruct *)(&tree[child]))->sbsumsq[j] = 0;
      }
    }

/* accumulate stats */

((struct substruct *)(&tree[child]))->sbcount++;
    for(j=0; j<nsaved; j++){
       ((struct substruct *)(&tree[child]))->sbsum[j] += savefeat[j];
       ((struct substruct *)(&tree[child]))->sbsumsq[j] +=
                  savefeat[j]*savefeat[j];
    }
}

/************************************************************************
    nodecounter()
        traverses tree counting nodes

*************************************************************************/
nodecounter(node)
struct noderec *node;
{
    int i;

nodesused++;
    for (i = 0; i < node->nbrncn; i++)
        nodecounter(&(CHILD(node, i)));
    return;
}
/************************************************************************
findwrong()
   attempt to find node at which wrong path was taken
*************************************************************************/
findwrong()
{
    struct noderec *node;
    int x, n;

for (x = firstndx; x > 0; x--) { /* traverse route backwards */
        node = &tree[route[x]];
        for (n = 0; n < node->nmemb; n++)
            if (trueclass == node->memb[n]) {
                badnode[route[x]] = badnode[route[x]] + 1;
                return(route[x]);
            }
    }
    return (-1); /* must be error, no matching class found in path */
}

/************************************************************************
printbadnodes - print nodes where wrong turns were made in tree
*************************************************************************/
printbadnodes()
{
    int x;

fprintf (stdout,"\nError Nodes\n\n");
    for (x = 1; x < MAXNODE; x++)
        if (badnode[x])
            fprintf (stdout,"Node #%3d - %2d\n",x,badnode[x]);
}

/************************************************************************
    histupdate()
        reads file /u/tec/crsamphist and updates with classification results
*************************************************************************/
histupdate()
{
```

```
char line[400];
int i;
short idnum;
char jidstr[9];

char hridstr[9];          /* character id string      */
int hrclass;              /* sample class             */
char hrdrafter[3];        /* draftpersons initials    */
int hrdocnum;             /* original document number */
int hrquality;            /* overall quality (0-9) 9=best */
int hruseflag;            /* 0=trained, 1=untrained, 3=test */
int hrscancode;           /* 0=nec, 1=tec             */
int hrthickness;          /* (0-9), 0=thinnest, 9=thickest */
int hrxmin;               /* coordinate from orig document */
int hrxmax;               /* coordinate from orig document */
int hrymin;               /* coordinate from orig document */
int hrymax;               /* coordinate from orig document */
int hrrunuse;             /* used in how many runs    */
int hrruns[100][2];       /* run number, 1=correct, 0=miss */ fphistold = fopen ("/u/tec/crsamphist","r");
        if (fphistold == NULL)
            fprintf (STDERR,"Cant open history file\n");

fphistnew = fopen ("/u/tec/crsamphist.new","w");
        if (fphistnew == NULL)
            fprintf (STDERR,"Cant create new history file\n");

while (fgets(line,200,fphistold) != NULL) {
            sscanf (line,"%s %d",hridstr,&hrclass);
            fgets(line,200,fphistold);
            sscanf (line,"%s %d %d %d %d %d %d %d %d %d %d",
                    hrdrafter,&hrdocnum,&hrquality,&hruseflag,
                    &hrscancode,&hrthickness,&hrxmin,&hrxmax,
                    &hrymin,&hrymax,&hrrunuse);
            strcpy (jidstr,hridstr);
            jidstr[5] = NULL;
            sscanf (jidstr,"%hd",&idnum);
            if (hrrunuse) {
                for (i = 0; i < hrrunuse; i++) {
                    fgets(line,200,fphistold);
                    sscanf(line,"%d %d",&hrruns[i+1][0],&hrruns[i+1][1]);
                }
            }
            if (result[idnum]) { /* used in this run */
                hrrunuse++;
                hrruns[hrrunuse][0] = runnum;
                hrruns[hrrunuse][1] = result[idnum] - 1;
            }
            fprintf (fphistnew,"%s %d\n",hridstr,hrclass);
            fprintf (fphistnew,"%s %d %d %d %d %d %d %d %d %d %d\n",
                    hrdrafter,hrdocnum,hrquality,hruseflag,
                    hrscancode,hrthickness,hrxmin,hrxmax,
                    hrymin,hrymax,hrrunuse);
            for (i = 1; i < hrrunuse + 1; i++)
                fprintf(fphistnew,"%d %d\n",hrruns[i][0],hrruns[i][1]);
        }
}

/************************************************************************
    writetree()

************************************************************************/
writetree()
{
    int filesize;
    nodesused = 0;
```

```
    nodecounter(&tree[0]);
    treesize = ((long)maxnode + 1) * sizeof (struct noderec);
    fdtree = creat (tfile, 0644);
    if (fdtree < 0)
        lerror("cant open tree output file");
    printf("\n\n%d nodes added to tree\n", nodesused-nodecount0);
    fprintf(STDERR,"Writing to file %s...\n\n", tfile);
    fprintf(STDERR,"    sizeof(complete)    %d\n", sizeof(complete));
    fprintf(STDERR,"       sizeof(confs)    %d\n", sizeof(confs));
    fprintf(STDERR,"    sizeof(treeform)    %d\n", sizeof(treeform));
    fprintf(STDERR,"     sizeof(datestr)    %d\n", sizeof(datestr));
    fprintf(STDERR,"     sizeof(copystr)    %d\n", sizeof(copystr));
    fprintf(STDERR,"       sizeof(nfeat)    %d\n", sizeof(nfeat));
    fprintf(STDERR,"    sizeof(treesize)    %d\n", sizeof(treesize));
    fprintf(STDERR,"    sizeof(featused)    %d\n", sizeof(featused));
    fprintf(STDERR,"          sizeof(cl)    %d\n", sizeof(cl));
    fprintf(STDERR,"    sizeof(confstat)    %d\n", sizeof(confstat));
    fprintf(STDERR,"        sizeof(tree)    %d\n", treesize);
    fprintf(STDERR,"    --------------------------\n");
    filesize = sizeof(complete) + sizeof(confstat) + sizeof(treeform) +
               sizeof(datestr) + sizeof(copystr) + sizeof(nfeat) +
               sizeof(treesize) + sizeof(featused) + sizeof(confs) +
               sizeof(cl) + treesize;
    fprintf(STDERR,"size of tree file    %d\n\n", filesize);

if ((write(fdtree, &complete, sizeof(complete)) != sizeof(complete)))
        fprintf(stderr, "error in writing completeflag to tree file.\n");
    if ((write(fdtree, &confs, sizeof( confs)) != sizeof( confs)))
        fprintf(stderr, "error in writing  confs to tree file.\n");
    if ((write(fdtree, &treeform, sizeof(treeform)) != sizeof(treeform)))
        fprintf(stderr, "error in writing treeform to tree file.\n");
    if ((write(fdtree, datestr, sizeof(datestr)) != sizeof(datestr)))
        fprintf(stderr, "error in writing datestr to tree file.\n");
    if ((write(fdtree, copystr, sizeof(copystr)) != sizeof(copystr)))
        fprintf(stderr, "error in writing copystr to tree file.\n");
    if ((write(fdtree, &nfeat, sizeof(nfeat)) != sizeof(nfeat)))
        fprintf(stderr, "error in writing nfeat to tree file.\n");
    if ((write(fdtree, &treesize, sizeof(treesize)) != sizeof(treesize)))
        fprintf(stderr, "error in writing treesize to tree file.\n");
    if ((write(fdtree, featused, sizeof(featused)) != sizeof(featused)))
        fprintf(stderr, "error in writing out featused.\n");
    if ((write(fdtree, cl, sizeof(cl)) != sizeof(cl)))
        fprintf(stderr, "error in writing out cl.\n");
    if ((write(fdtree, confstat, sizeof(confstat)) != sizeof(confstat)))
        fprintf(stderr, "error in writing confstat to tree file.\n");
    if ((write(fdtree, tree, treesize) != treesize))
        fprintf(stderr, "error in writing out tree.\n");
    close(fdtree);

} define ICORRECT 1
define IACCEPTED 1
#define ITRAINED 1

/************************************************************************
 main()
*************************************************************************/ main(argc, argv)
int argc;
char *argv[];
{
    short orient, n, j, k;
    short oconf, reject, badpath;
    char  id, vcl, idstr[9], jidstr[9], pick;
    int   subchoice, suboconf, fe, nf, i, nmem, choice, stree;
    int   correct, saveusetree, subid, stats[2][2][2];
```

```
short idnum, fid, fchoice, fconf; /* first choice id and choice */ adrinit();                              /* initialize tadr, cadr, fadr */
linit();                                /* local initializations */ idstr[8]=0;
stats[0][0][0] = stats[0][1][0] = stats[1][0][0] = stats[1][1][0] = 0;
stats[0][0][1] = stats[0][1][1] = stats[1][0][1] = stats[1][1][1] = 0;

fprintf (STDERR,"\nCharacter Recognition\n");
fprintf (STDERR,"\n(C) Copyright 1986 GTX Corporation\n\n");

opfile(argc, argv);         /* cmd line args and open input file */
ratthresh = ratthresh/1000;

pick = ' ';
/* set up free list */
for (i = MAXNODE-1; i )= 0; i--)
   if(tree[i].nbrnch == -1)
      nfree (i);

for (i = 0; i ( NFEAT; i++)
   if (*(fadr + i)) nfeatused++;

fprintf(stdout, "%d features used in tree\n\n",nfeatused);
if (rejoff)
   fprintf (stdout,"_Rejection has been turned off\n");
   else
   fprintf (stdout,"_Rejection Threshold of %d\n",conft);

fprintf (stdout,"_Visit List Threshold of %f\n",ratthresh);

if (fcallflag || !confs) {
   fprintf(stdout,"_Using First path as top choice \n");
   fprintf(stdout,"         true               sub      ");
   fprintf(stdout,"sub    +AT    decision || backtrack\n");
   fprintf(stdout," idstr   class   call    conf  term   ");
   fprintf(stdout,"conf   -RU   path         class(conf)\n");
}
   else {
   fprintf(stdout,"_Using Choice with highest confidence\n");
   fprintf(stdout,"         true                    first    ");
   fprintf(stdout,"first  +AT    decision || backtrack\n");
   fprintf(stdout," idstr   class   call    conf  call    ");
   fprintf(stdout,"conf   -RU   path         class(conf)\n");
} for(i=0; i(78; i++)
   putc('-', stdout);
fprintf(stdout, "\n");

node = tadr; /* point to tree */
nmem = node->nmemb;
for (j = 0; j ( nmem; j++)
   trained[node->memb[j]] = 1;

while( scanf("%hd%*c%c", &trueclass, &vc) != EOF){
   scanf("%*c%c%c%c%c%c%c%c%c", &idstr[0],
      &idstr[1], &idstr[2], &idstr[3], &idstr[4],
      &idstr[5], &idstr[6], &idstr[7]);

if(trueclass ) MAXCLASS || trueclass(=0)
      lerror("class no. out of range");
   if(vcl != classmap[trueclass].id){
      fprintf(STDERR, "\nWARNING: visid(%c) expected to be %c\n",
                  vcl, classmap[trueclass].id);
      fprintf(STDERR,"class=%d vcl=%c idstr=%s\n", trueclass, vcl, idstr);
   }
```

```
   /* get orient from idstring */
if(sscanf(&idstr[6], "%hd", &orient) <= 0) orient = 0;
   /* get features for this sample */
nf = NRIFEAT + NRDFEAT + classmap[trueclass].ncuts*NCUTFEAT;
for (fe = 0; fe < nf; fe++){
    scanf("%hd", &features[fe]);
}

/* begin printing line of table */
if (report || interact)
    fprintf (stdout,"\n");
if (interact)
    fprintf(STDERR, "\n\n%8s %3d(%c) ", idstr, trueclass, vcl);
fprintf(stdout, "%8s %3d(%c) ", idstr, trueclass, vcl);

/* perform the classification and return the chosen class */
reject = FALSE;

for(i=0; i<CONFDIM; i++)
    confsave[i] = 0;
oconf = maxsaved = nsaved = 0;
dotreeclassify(orient);
if(!chindex)
    reject = TRUE;
if(choicelist[0].cl ) 200){
    /* tied-off internal node */
    id = choicelist[0].cl-200;
    tietab[id-'a'][trueclass]++;
    anyties=tieclass[trueclass]=tienode[id-'a']=1;
} if (fcallflag || !confs) {  /* Use first path call */
    subchoice = choicelist[0].subcl;
    subid = choicelist[0].subid;
    suboconf = choicelist[0].subconf;

choice = choicelist[0].cl;
    id = choicelist[0].idc;
    oconf = choicelist[0].conf;
    if (!choicelist[0].subconf)
        fconf = choicelist[0].conf; /* first path conf */
    else
        fconf = choicelist[0].subconf;
}
else {          /* Use highest confidence choice */
    choice = topchoice[0].cl;
    id = topchoice[0].idt;
    oconf = topchoice[0].conf;
    if (topchoice[0].subpick)
        pick = 'S';
    else
        pick = ' ';

fid = choicelist[0].idc;    /* first path call */
    fchoice = choicelist[0].cl;

if (!choicelist[0].subconf)
        fconf = choicelist[0].conf; /* first path conf */
    else
        fconf = choicelist[0].subconf;
    if (choicelist[0].subid && (id!=choicelist[0].subid)) {
        fid = choicelist[0].subid;
        fchoice = choicelist[0].subcl;
    }
}
```

```c
/* keep track of stats to determine how well the subterminal phase is doing.
   for a terminal node, subtest[0][node] is the count of times both
   ordinary and subterm classification fails, subtest[1][node] is count
   of times ordinary fails, subterm succeeds, subtest[2][node] is times
   ordinary succeeds, sub fails, subtest[3][node] is times both
   succeed. */ if(subchoice)
        subtest [((id==vcl)((1) | (subid==vcl)] [choicelist[0].termnode] ++;

if (fcallflag || !confs)
        correct = ( (subid == vcl) || (subchoice == 0) && (id == vcl));
    else
        correct = (id == vcl); /* use highest confidence */ badpath = -1;
    if (!correct)
        badpath = findwrong();

if (histflag) {            /* update history records */
        strcpy (jidstr,idstr);
        jidstr[5] = NULL;
        sscanf (jidstr,"%hd",&idnum);
        if (!correct)
            result[idnum] = 1; /* missed */
        else
            result[idnum] = 2; /* correct */
    }
    if (fcallflag && (fconf ( conft) && !rejoff)
        reject = TRUE;

if(!fcallflag && oconf ( conft && !rejoff)
        reject = TRUE;

/* finish printing line of table */
    if (chindex || fcallflag)
        fprintf(stdout, "  %2d(%c)%c %5d", choice, id, pick, oconf);
    else
        fprintf(stdout, "                  ");
    if (fcallflag || !confs) {
        if(subid && (id!=subid))
            fprintf(stdout, " %2d(%c)   %5d ", subchoice,subid,suboconf);
        else
            fprintf(stdout, "                ");
    }
    else {
        fprintf(stdout, " %2d(%c)   ",fchoice, fid);
        fprintf(stdout, "%5d   ",fconf);
    } fprintf(stdout, "%c", correct ? '+' : '-');
    fprintf(stdout, "%c", reject ? 'R' : 'A');
    fprintf(stdout, "%c ", trained[trueclass] ? 'T' : 'U');
    if (!chindex)
        fprintf(stdout,"C"); /* cut failure */
    else
        fprintf(stdout," ");
    for (n = 0; n ( firstndx; n++) {   /* route through tree */
        fprintf(stdout, "%3d", route[n]);
        if (!correct && (route[n] == badpath) )
            fprintf (stdout, "W");   /* place where wrong turn made */
        forintf (stdout,",");
    }
    fprintf(stdout, " %c||", id);
    if (fcallflag || !confs)
        for (n = 1; n ( chindex; n++)
            fprintf(stdout," %c (%d),",choicelist[n].idc,choicelist[n].conf);
```

```
      else
        for (n = 1; n < chindex; n++)
            fprintf(stdout, " %c (%d),", topchoice[n].idt,topchoice[n].conf);

fprintf(stdout, "\n");

/* increment stats for this sample */
    stats[correct][!reject][trained[trueclass]]++;

/* also take subtree, if appropriate, for subterminal training */ saveusetree = usetree;
    if(createsubc || createconf){
        for (stree=1; stree <= MAXSUBTREES+1; stree++)
            if ((classmap[trueclass].member >> stree) &1) {
               maxsaved = nsaved = 0;
           usetree =  stree;
               dotreeclassify(orient);
               subid = choicelist[0].subid;
               id = choicelist[0].idc;
               subchoice = choicelist[0].subcl;
               if(subchoice)
               subtest[((id==vcl)<<(1)  |
                          (subid==vcl)] [choicelist[0].termnode] ++;
            }
     }
     usetree = saveusetree;
} if(createsubc)
    substat(&tree[0]); /* perform stat calcs for all sub-terminal nodes */
if(createconf)
    confmake();               /* finish confidence calcs */ printbadnodes();

fprintf(stdout, "\n          SUMMARY STATISTICS                  \n");
fprintf(stdout, "number of correct, trained, non-rejects = %d\n",
    stats[ICORRECT][IACCEPTED][ITRAINED]);
fprintf(stdout, "number of trained non-rejects = %d\n",
    stats[ICORRECT][IACCEPTED][ITRAINED] +
    stats[!ICORRECT][IACCEPTED][ITRAINED] );
fprintf(stdout, "percentage correct among trained, non-rejects = %3.2f\n",
    (float)stats[ICORRECT][IACCEPTED][ITRAINED] /
        (stats[ICORRECT][IACCEPTED][ITRAINED] +
        stats[!ICORRECT][IACCEPTED][ITRAINED]) * 100.0);
fprintf(stdout, "%d incorrect decisions were rejected (wrong cuts).\n",
    stats[!ICORRECT][!IACCEPTED][ITRAINED]);
fprintf(stdout, "%d   correct decisions were rejected.\n",
    stats[ICORRECT][!IACCEPTED][ITRAINED]);
fprintf(stdout, "\n\n\n         TIE-NODE STATISTICS                    \n\n");
if(anyties){
   fprintf(stdout, "class ");
   for(j=0; j<26; j++){
      if(tienode[j])
         fprintf(stdout,"    %c", j+'a');
   }
   fprintf(stdout, "\n\n");
   for(i=0; i<MAXCLASS; i++){
      if(tieclass[i]){
         fprintf(stdout, "%4d ", i);
         for(j=0; j<26; j++){
            if(tienode[j])
               fprintf(stdout," %4d", tietab[j][i]);
         }
         fprintf(stdout, "\n");
      }
```

```
        }
    }
    else{
        fprintf(stdout, "no prematurely tied-off nodes\n");
    }
#ifdef DEBUG
    if (debug)
        fprintf(stdout, "npruned=%d\n", npruned);
endif if (histflag)
        histupdate();
    if(createsubc || createconf || purge)
        writetree();
}
endif static char sccsid[] = "@(#)crstat.c    2.5 Copyright 1986 GTX Corp";

/**********************************************************************
 *
 * Character Recognition
 *      Version 1.0
 *
 * (C) Copyright 1986 GTX Corporation
 *
 **********************************************************************/

/********************************************************************** crstat.c subordinates:
                cridlib.c

This is the part of the character recognition package that
reads in a set of integer-valued feature measurements, and
produces a file of class statistics from these measurements.
The input is taken from the standard input and is a concatenation
of files of the following format:

- for each sample:
        - a line containing the class number, visual
          id, and id string of the sample in "%4d %c %8s" format.
        - until all feature values are read in for this sample:
            - a line containing 10 feature values in the format %7d The feature values are limited to 10 per line so that the line lengths
do not exceed the capacity of the editor vi and other ASCII-oriented
utilities.

The output file is in the following format:

- for each class:
        - a line containing the class number and number of samples
          and visible class id for this class in "%5d%5d %c" format.
        - until all feature means are written out for this class:
            - a line containing 10 feature means in the format %7d
        - an empty line separating the means from the std devs.
        - until all feature std. devs. are written out for this class:
            - a line containing 10 feature std. devs. in the format %7d This program is called as follows:
``` crstat [-d] [-z zfile] (feature-file )stat-file

The options are:

-d turns on the debugging option - causes extra output to be
appended to the standard output.

-z zfile writes out a file of pooled within-class correlation data for
use by crbuild. Format of the file is:

- for each feature i $0 \leq i <$ NFEAT
                - a line containing the feature number i in %5d
                -as many lines as necessary to print out the
correlations $z(i,j)*100$, $i<j<$NFEAT, 16 per line in
format %5d.

```
*********************************************************************/ include "crdefs.h"
static char sccsid2[] = SCCSSTR;        /* from crdefs.h*/

/* global declarations */ int   fcount[NFEAT];       /* no. of samples with given feature */
int   totalcount;          /* total no. of samples (should = fcount[0]) */
short debug;               /* nonzero for debug option on (-d) */
short oldflag = FALSE;     /* nonzero for new corr. file output */
float mean[MAXCLASS] [NFEAT];
float sumsq[MAXCLASS] [NFEAT];
float gmean[NFEAT];        /* global means by feature */
float z[NFEAT][NFEAT];     /* correlations */
FILE *zfilefp;
char  zfilename[40];
short zfileflag=FALSE;
short count[MAXCLASS];
short feat[NFEAT];

extern struct clmaptype classmap[];     /* from cridlib.c */ extern void exit();

/***********************************************************************
 lerror(message) - local error handler
**********************************************************************/ lerror(msg)
char *msg;
{
   fprintf(stderr, "\ncrstat: %s\n", msg);
   exit(1);
}
/***********************************************************************
opfile - decipher command line arguments
**********************************************************************/ void opfile(argc, argv)
int argc;
char *argv[];
{
   short c;
   extern int optind;
   extern char* optarg;
```

```c
/* check command line arguments */ while ((c = getopt(argc, argv, "doz:X:")) != EOF)
        switch(c) { case 'X':                   /* sample */
            c = atoi(argv[optind - 1] + 2);
            break;

case 'z':                   /* write correlation file */
            strncpy(zfilename, optarg, 39);
            zfileflag = TRUE;
            break;

case 'o':                   /* writes corr. file in old format */
            oldflag = TRUE;
            break;

case 'd':                   /* -d turns debug ontion on */
            debug = TRUE;
            break;

default:
            lerror("usage: crstat [-d] [-o] [-z zfile] (feature-file )statfile");
            break;
        }

}

/*************************************************************************
 writezfile()

compute and print correlations as cov(x,y) / (std(x)*std(y))
        where both the covariances and std deviations are pooled, i.e., cov(x,y) = (mean of products xy) - average product of class means and std(x) = sqrt((mean of squares xx) - average square of class means mx)

**************************************************************************/
writezfile()
{
    register snort fe, fe2, class;
    int rho;
    double pstd[NFEAT];
    double t, ps, pcov;

zfilefp=fopen(zfilename, "w");
    if(zfilefp == NULL)
        lerror("can't open correlation file for outnut");

/* compute pooled sd for each feature */
    for (fe = 0; fe ( NFEAT; fe++) {
        ps = 0;
        for(class=0; class ( MAXCLASS; class++){
            if(count[class]){
                t = mean[class][fe];
                ps += t*t*count[class];
            }
        }
        t = (z[fe][fe] - ps) / (double)fcount[fe];
        ps = sqrt( ABS(t));
        pstd[fe] = (ps ( 1.0)? 1.0 : ps;
        if(debug)
            fprintf(stderr,"pooled sd for feature %d is %f\n", fe,ps);
    }
```

```c
    for (fe = 0; fe < NFEAT-1; fe++) {
       fprintf(zfilefp, "%5d", fe);
       for (fe2 = fe+1; fe2 < NFEAT; fe2++) {
          if(((fe2-fe-1) & 0xf ) == 0)
              fprintf(zfilefp, "\n");
          /* compute pooled covariance for this feature pair */
          pcov = 0.0;
          for(class=0; class < MAXCLASS; class++){
              if(count[class])
                  pcov += count[class]*mean[class][fe]*mean[class][fe2];
          }
          pcov = ((z[fe][fe2] - pcov)/MIN(fcount[fe], fcount[fe2]));

rho = 100.0 *( pcov /(pstd[fe] * pstd[fe2]));
          if (rho )-5000 && rho <-100)
              fprintf(stderr, "%3d & %3d = %5d\n", fe, fe2, rho);
          if (rho > 100 && rho < 5000)
              fprintf(stderr, "%3d & %3d = %5d\n", fe, fe2, rho);
          if (rho <-100 || rho >100) rho = 0;
          fprintf(zfilefp, "%5d", rho);
       }
       fprintf(zfilefp, "\n");
    } fprintf(zfilefp, "\n");
    fclose(zfilefp);

}

/*******************************************************************************
 writegzfile()

compute and print correlations as cov(x,y) / (std(x)*std(y)) i.e., cov(x,y) = (mean of products xy) - product of means of x & y and std(x) = sqrt((mean of squares xx) - square of means of x)

*******************************************************************************/ writegzfile()
{
    register short fe, fe2;
    int rho;
    double gstd[NFEAT];
    double t, gs, gcov;

zfilefp=fopen(zfilename, "w");
    if(zfilefp == NULL)
        lerror("can't open correlation file for output");

/* compute global sd for each feature */
    for (fe = 0; fe < NFEAT; fe++) {
        gs = 0.0;
        t = (z[fe][fe] / (double)fcount[fe] - gmean[fe] * gmean[fe]);
        gs = sqrt( ABS(t));
        gstd[fe] = (gs < 1.0)? 1.0 : gs;
        if(debug)
            fprintf(stderr,"global sd for feature %d is %f\n", fe,gs);
    } for (fe = 0; fe < NFEAT-1; fe++) {
       fprintf(zfilefp, "%5d", fe);
       for (fe2 = fe+1; fe2 < NFEAT; fe2++) {
          if(((fe2-fe-1) & 0xf ) == 0)
```

```c
            fprintf(zfilefp, "\n");
        /* compute global covariance for this feature pair */
        gcov = 0.0;
        gcov = (z[fe][fe2] / MIN(fcount[fe], fcount[fe2])  -
                            gmean[fe] * gmean[fe2]);
        rho = 100.0 * (gcov / (gstd[fe] * gstd[fe2]));
        if (rho )-5000 && rho (-100)
            fprintf(stderr, "%3d & %3d = %5d\n", fe, fe2, rho);
        if (rho ) 100 && rho ( 5000)
            fprintf(stderr, "%3d & %3d = %5d\n", fe, fe2, rho);
        if (rho (-100 || rho )100) rho = 0;
        fprintf(zfilefp, "%5d", rho);
    }
    fprintf(zfilefp, "\n");
}
    fprintf(zfilefp, "\n");
    fclose(zfilefp);

}

/****************************************************************************
 main()
 ****************************************************************************/ main(argc, argv)
int argc;
char *argv[];
{ register short  fe, fe2;
    register short value, class;
    short iclass;
    char viscl, idstr[9];
    double s, m, msq, v;
    int nfeat;

fprintf (stderr,"\nCharacter Recognition\n");
    fprintf (stderr,"\n(C) Copyright 1986 GTX Corporation\n\n");

opfile(argc, argv);

/* read input, accumulate, and write stats */ while( scanf("%hd%*c%c", &iclass, &viscl) != EOF){
        class = iclass;
        scanf("%*c%c%c%c%c%c%c%c%c", &idstr[0],
            &idstr[1], &idstr[2], &idstr[3], &idstr[4],
            &idstr[5], &idstr[6], &idstr[7]);
        fprintf(STDERR, "id=%s \n", idstr);

if(class )= MAXCLASS |1 class ==0 ){
            fprintf(stderr, "\nWARNING:class no. out of range;class 1 assumed\n");
            fprintf(stderr,"class=%d  viscl=%c count=%d idstr=%s\n", class, viscl, totalcount, idstr)
            class = 1;
        }
        if(viscl != classmap[class].id){
            fprintf(stderr, "\nWARNING: visid(%c) expected to be %c\n", viscl, classmap[class].id);
            fprintf(stderr,"class=%d  viscl=%c count=%d idstr=%s\n", class, viscl, totalcount, idstr)
        }
        count[class]++;
        totalcount++;
        nfeat = NRIFEAT + NRDFEAT + classmap[class].ncuts*NCUTFEAT;
        for (fe = 0; fe ( nfeat; fe++){
            fcount[fe]++;
            scanf("%hd", &feat[fe]);
            value = feat[fe];
            gmean[fe] += value;
            mean[class][fe] += value;
            sumsq[class][fe] += (long)value*value;

}

/* compute cross-products for correlations if requested */ if(zfileflag){
```

```c
        for .(fe = 0; fe < nfeat; fe++) {
            for (fe2 = fe; fe2 < nfeat; fe2++) {
                z[fe][fe2] += (long)feat[fe]*feat[fe2];
            }
        }
      }
    }
    for (fe = 0; fe < NFEAT; fe++){
        gmean[fe] = gmean[fe] / fcount[fe];
    } for(class = 0; class < MAXCLASS; class++){
        if(count[class] > 0) {
            printf( "%5d%5d %c", class, count[class], classmap[class].id);
            nfeat = NRIFEAT + NRDFEAT + classmap[class].ncuts*NCUTFEAT;
            for (fe = 0; fe < nfeat; fe++) {
                if(fe%10 == 0)
                    printf( "\n");
                mean[class][fe] /= (float)count[class] ;
                printf( "%7d", (int)mean[class][fe] );
            }
            printf( "\n");
            for (fe = 0; fe < nfeat; fe++) {
                if(fe%10 == 0)
                    printf( "\n");
                m = mean[class][fe];
                msq = sumsq[class][fe] / count[class];
                v = msq-m*m;
                if(v < 0)
                   v=0;
                s = sqrt(v);
                printf( "%7d", (short)s);
            }
            printf( "\n\n");
        }
    }
    if ((zfileflag) && (oldflag))
        writezfile();
    if ((zfileflag) && (!oldflag))
        writegzfile();
} static char sccsid[] = " @(#)cridlib.c  2.58  Copyright 1986 GTX Corp";

/***********************************************************************
*
* Character Recognition
*     Version 1.0
*
* (C) Copyright 1986 GTX Corporation
*
***********************************************************************/ include "crdefs.h"
static char sccsid2[] = SCCSSTR;         /* from crdefs.h*/

/*
   In the data initialization below, the number in the comment is the
   class number.  first data entry is ASCII visible id corresponding
   to the class (field name id).  The second entry is number of
   cuts possible for this class (field name ncuts). The third number
   represents the "cut equivalence class".  All classes with the same
   "cut equivalence class" are cut the same way(s). The fourth number
   represents the sub-tree bitmap mask.  The LSB (bit 0) indicates
   membership in the full tree, bit 1 means numeric tree, bit 2 means
   alpha tree, and bit 4 is punctuation (small) tree.
*/
```

```
struct clmaptype classmap[MAXCLASS] = {
    /*  0 */        {'\0', 0, 0, 0x0},
    /*  1 */        {'0',  1, 1, 0x7},
    /*  2 */        {'0',  0, 0, 0x3},
    /*  3 */        {'1',  0, 0, 0xF},
    /*  4 */        {'1',  0, 0, 0x3},
    /*  5 */        {'-',  0, 0, 0xF},
    /*  6 */        {'2',  0, 0, 0x3},
    /*  7 */        {'3',  0, 0, 0x3},
    /*  8 */        {'0',  1, 1, 0x7},
    /*  9 */        {'4',  0, 0, 0x3},
    /* 10 */        {'4',  1, 4, 0x3},
    /* 11 */        {'5',  1, 3, 0x3},
    /* 12 */        {'6',  0, 0, 0x3},
    /* 13 */        {'7',  0, 0, 0x3},
    /* 14 */        {'/',  0, 0, 0x7},
    /* 15 */        {'8',  1, 5, 0x3},
    /* 16 */        {'W',  0, 0, 0x5},
    /* 17 */        {'E',  0, 0, 0x5},
    /* 18 */        {'U',  0, 0, 0x5},
    /* 19 */        {'3',  0, 0, 0x3},
    /* 20 */        {'A',  1, 4, 0x5},
    /* 21 */        {'J',  0, 0, 0x5},
    /* 22 */        {'B',  1, 5, 0x5},
    /* 23 */        {'C',  0, 0, 0x5},
    /* 24 */        {'D',  1, 1, 0x5},
    /* 25 */        {'E',  0, 0, 0x5},
    /* 26 */        {'F',  0, 0, 0x5},
    /* 27 */        {'G',  0, 0, 0x5},
    /* 28 */        {'H',  0, 0, 0x5},
    /* 29 */        {'I',  0, 0, 0x5},
    /* 30 */        {'J',  0, 0, 0x5},
    /* 31 */        {'K',  0, 0, 0x5},
    /* 32 */        {'W',  0, 0, 0x5},
    /* 33 */        {'M',  0, 0, 0x5},
    /* 34 */        {'N',  0, 0, 0x5},
    /* 35 */        {'P',  0, 0, 0x5},
    /* 36 */        {'Q',  0, 0, 0x5},
    /* 37 */        {'R',  0, 0, 0x5},
    /* 38 */        {'S',  1, 3, 0x5},
    /* 39 */        {'T',  0, 0, 0x5},
    /* 40 */        {'Z',  1, 2, 0x5},
    /* 41 */        {'9',  0, 0, 0x3},
    /* 42 */        {'M',  0, 0, 0x5},
    /* 43 */        {'X',  0, 0, 0x7},
    /* 44 */        {'Y',  0, 0, 0x5},
    /* 45 */        {'Y',  0, 0, 0x5},
    /* 46 */        {'W',  0, 0, 0x5},
    /* 47 */        {'Z',  0, 0, 0x5},
    /* 48 */        {'7',  0, 0, 0x3},
    /* 49 */        {'+',  0, 0, 0xF},
    /* 50 */        {'9',  0, 0, 0x3},
    /* 51 */        {'1',  0, 0, 0x3},
    /* 52 */        {'D',  0, 0, 0x5},
    /* 53 */        {'B',  0, 0, 0x5},
    /* 54 */        {'P',  0, 0, 0x5},
    /* 55 */        {'*',  0, 0, 0x5},
    /* 56 */        {'B',  0, 0, 0x5},
    /* 57 */        {'R',  0, 0, 0x5},
    /* 58 */        {'B',  0, 0, 0x5},
    /* 59 */        {'.',  0, 0, 0xF},
    /* 60 */        {',',  0, 0, 0xF},
    /* 61 */        {'6',  0, 0, 0x3},
    /* 62 */        {'A',  0, 0, 0x5},
    /* 63 */        {'2',  1, 2, 0x3},
    /* 64 */        {'4',  0, 0, 0x3},
    /* 65 */        {'9',  0, 0, 0x3},
    /* 66 */        {'L',  0, 0, 0x5},
```

```
/* 67 */        {'8',   0,  0,  0x3},
/* 68 */        {'V',   0,  0,  0x5},
/* 69 */        {'D',   1,  1,  0x5},
/* 70 */        {'J',   0,  0,  0x5},
/* 71 */        {')',   0,  0,  0x0},
/* 72 */        {'(',   0,  0,  0x0},
/* 73 */        {'J',   0,  0,  0x5},
/* 74 */        {'#',   0,  0,  0x5},
/* 75 */        {'\\',  0,  0,  0x7},
/* 76 */        {'P',   0,  0,  0x5},
/* 77 */        {'Q',   0,  0,  0x5},
/* 78 */        {'Q',   0,  0,  0x5},
/* 79 */        {'R',   0,  0,  0x5},
/* 80 */        {'0',   1,  1,  0x7},
/* 81 */        {'D',   1,  1,  0x5},
/* 82 */        {'B',   0,  0,  0x5},
/* 83 */        {'A',   1,  4,  0x5},
/* 84 */        {'D',   1,  1,  0x5},
/* 85 */        {'Q',   0,  0,  0x5},
/* 86 */        {'V',   0,  0,  0x5},
/* 87 */        {'W',   0,  0,  0x5},
/* 88 */        {'O',   1,  1,  0x7},
/* 89 */        {'F',   0,  0,  0x5},
/* 90 */        {'G',   0,  0,  0x5},
/* 91 */        {'5',   1,  3,  0x3},
/* 92 */        {'S',   1,  3,  0x5},
/* 93 */        {'G',   0,  0,  0x5},
};
```

I claim:

1. A method of statistical pattern recognition comprising the steps of:
  (a) training first and second classifier components with elements of a training set by performing the steps of
    (1) selecting the first classifier component,
    (2) extracting features from elements of the training set,
    (3) operating on extracted features of the training set with the first classifier component to determine classes in which the elements of the training set are classified,
    (4) producing a first set of training elements of the training set which the first classifier component classifies into a first class,
    (5) determining whether all of the first set of training elements are labeled as being included in the first class,
    (6) if the determination of step (5) is affirmative, setting a decision indicator in the first classifier component to indicate that the first classifier component can make a final decision that any of the training elements in the first set is in the first class,
    (7) if the determination of step (5) is negative, setting the decision indicator to point to the second classifier component and recursively repeating steps (1) through (7) for the second classifier component, wherein the repetition of step (2) includes extracting the features from the first set of training elements;
  (b) reading an unknown pattern;
  (c) extracting features from the unknown pattern;
  (d) operating on extracted features with the first classifier component and making a first decision that the unknown pattern is within the first class;
  (e) determining if the first decision is a final decision that the unknown pattern is within the first class, and if it is, determining that the unknown pattern is in the first class, and if it is not, selecting a second classifier component;
  (f) if the first decision is not a final decision, operating on extracted features of the unknown pattern with the second classifier component and making a second decision whether the unknown pattern is within the first class, and recursively repeating steps (e) and (f) for the second decision.

2. The method of claim 1 wherein the pattern includes a handwritten character.

3. The method of claim 1 including repeating steps (a) through (e) for additional unknown patterns.

4. The method of claim 1 including repeating steps (3) through (7) for a plurality of other sets of training elements and a plurality of other classes.

5. The method of claim 4 wherein one of the first and second classifier components is a decision tree component and the other is a Gaussian discriminant component.

6. The method of claim 5 wherein, if the first classifier is a decision tree classifier, the step of making the first decision includes finding a child cluster with a least Mahalanobis distance to a mean of extracted features of the unknown pattern.

7. The method of claim 5 wherein if the first classifier is a Gaussian discriminant classifier, the step of making the first decision includes computing a posterior probability that the unknown pattern is in each of a plurality of classes, respectively, and selecting as the first decision the decision that the unknown character is likely to be in the class corresponding to the highest posterior probability.

8. The method of claim 4 wherein if one of the first and second classifier components is a decision tree component, step (3) includes performing isodata clustering on classes of features extracted from the training set, computing cluster overlaps, and interactively building a decision tree for that decision tree component on the basis of the cluster overlaps.

9. A statistical pattern recognition system comprising in combination:
- (a) means for reading an unknown pattern;
- (b) means for extracting features from the unknown pattern;
- (c) means for operating on extracted features with a first classifier component and making a first decision that the unknown pattern is within a first class;
- (d) means for determining if the first decision is a final decision that the unknown pattern is within the first class; and
- (e) means for determining that the unknown pattern is in the first class if the first decision is a final decision, and if it is not, selecting a second classifier component;
- (f) means for operating on extracted features of the unknown pattern with the second classifier component and making a second decision whether the unknown pattern is within the first class if the first decision is not a final decision;
- (g) means for training the first and second classifier components with elements of a training set, the training means including
  - (1) means for selecting the first classifier component,
  - (2) means for extracting features from elements of the training set,
  - (3) means for operating on extracted features of the training set with the first classifier component to determine classes in which the elements of the training set are classified,
  - (4) means for producing a first set of training elements of the training set which the first classifier component classifies into the first class,
  - (5) means for determining whether all of the first set of training elements are labeled as being included in the first class,
  - (6) means for setting a decision indicator in the first classifier component to indicate that the first classifier component can make a final decision that any of the training elements in the first set is in the first class if all of the first set of training elements are labelled as being included in the first class.

10. The system of claim 9 wherein the pattern includes a handwritten character.

11. The system of claim 9 wherein one of the first and second classifier components is a decision three classifier component.

12. The system of claim 11 wherein one of the first and second classifier components is a Gaussian discriminant classifier component.

13. The system of claim 12 wherein the unknown character is a handwritten alphanumeric character.

* * * * *